United States Patent [19]
Newman et al.

[11] Patent Number: 5,978,940
[45] Date of Patent: Nov. 2, 1999

[54] SYSTEM METHOD AND ARTICLE OF MANUFACTURE FOR TEST OPERATIONS

[75] Inventors: Craig Newman, Richardson; Brian Badger; Eugene Williams, both of Dallas, all of Tex.; Chris Fry, Monument; Mark Dierbeck, Colorado Springs, both of Colo.

[73] Assignee: MCI Communications Corporation, Washington, D.C.

[21] Appl. No.: 08/915,440

[22] Filed: Aug. 20, 1997

[51] Int. Cl.[6] .................................................. G06F 11/00
[52] U.S. Cl. ............................................................. 714/712
[58] Field of Search .................................... 714/712, 713, 714/715, 716, 717

[56] References Cited

U.S. PATENT DOCUMENTS 5,867,494  2/1999  Krishnanswamy et al. ............ 370/389

*Primary Examiner*—Vincent P. Canney

[57] ABSTRACT

A system software solution for testing various network elements/entities and processes in a telecommunications network is provided. A network under test contains network entities which save data to a common database that is associated with processing particular test cases. A server correlates database data from the network under test and compares it to anticipated test case results. A disposition of the test cases is determined. Various elements of the invention interface appropriately, and process accordingly, to accomplish the testing and test result(s) disposition. In addition, the test system provides a means to verify billing records within the telecommunications network.

21 Claims, 16 Drawing Sheets

| AVANTELNER | FIELD NAME | EXPECTED VALUE |
|---|---|---|
| CDR | | |
| DSENER | A | 7037221001AAAA------- |
| ECDR | AC | 3 |
| EOSR | ACIF | 15 |
| EPNR | CC | % |
| EPOSR | CD | 0 |
| FMSADF | CLI | 40@7654006 |
| FMSNER | CN | 0@22 |
| GRSNER | D | 2154510007------- |
| GSEADF | DE | 0 |
| GSECIS | DO | 0 |
| OSR | DT | 0 |
| PNR | EC | 006 |
| POSR | FC | 0 |
| SER | ID | 27 |
| T2000NER | NAT | 3 |
| TOLLTCDR | NCIDLOC | 0 |
| | NOCLI | 12 |
| | ONACC | 0 |
| | OTC | 1 |
| | OTG | 133@ |
| | PD | 2 |
| | PP | 0 |
| | RS | 0 |
| | SC | 0 |
| | SS7_RELEASE_CODE | 16 |
| | TNACC | 0 |
| | TP3Q | 0 |
| | TP6Q | 0 |
| | TP7Q | 0 |
| | TTC | 1 |
| | TTG | 1271 |
| | XC | 0 |

SYSTEM METHOD AND ARTICLE OF MANUFACTURE FOR TEST OPERATIONS

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

The preferred embodiment relates generally to telecommunication test systems and more specifically to an automated telecommunications test system for testing telecommunication networks that include intelligent network elements such as automated response units and manual network elements such as manual operator consoles.

BACKGROUND OF THE INVENTION

Testing telecommunication services can be a laborious and time-consuming task. This is especially true in today's environment where a wide variety of new telecommunication services are being deployed on a rapid basis. Further, the increased use of intelligent network elements including automation devices such as audio response units (ARUs), and intelligent switches such as automatic call distributors, complicate the task of testing new telecommunication services. Telecommunication services are typically tested and re-tested at various stages throughout the development process.

For example, as new services are being developed they are typically modified and refined on a frequent basis. The modifications are generally based on several factors including marketing studies, customer feedback, hardware and software design changes, and network element changes. To implement such modifications during the development cycle, product development organizations modify the software that drives the various network elements used to support the new service. The modified software versions are then released to testing organizations that are responsible for verifying the functionality and performance of the new service. Accordingly, during a typical product development cycle, many different software versions may be released to the testing organizations as the features and functions of the new service evolve.

Thus, testing organizations typically perform many iterations of various test activities to verify that new services operate as designed and do not adversely affect existing telecommunication services. The dynamic nature of the development of new services, and the time-to-market pressures imposed upon the telecommunications industry, drive the need for timely and efficient test procedures.

Often these requirements are met by automating test procedures. Once test cases are automated they can be repeated with minimal effort. This automation facilitates regression testing, which verifies common features among different software versions. In addition, automated test cases are generally more reliable than manual test cases due to the reduction of human factor errors. Further, automated test systems are more efficient and reliable because they execute test cases repeatedly in exactly the same manner.

However, in order to gain the maximum benefit from automation, test cases must be designed for execution without human interaction. This not only reduces test staff requirements, but also enables one to run test cases continuously during the day or night. In order for test cases to run unattended, they must be able to verify the correct operation of telecommunication services and they must be able to detect errors when they occur. Typically, test cases are designed to accomplish this by dynamically comparing the test case results against predefined expected results. Alternatively, test cases can be programmed to generate test result logs or the like, which can be analyzed at a later time.

In addition, in order for test cases to run unattended, the telecommunication service under test must not require human interaction. For example, telecommunication services such as voice mail systems, automated collect call services and the like, generally require human interaction. Human interaction can be in the form of speech and/or telephone keypad input. As such, testing these types of telecommunication services are conventionally performed manually.

Another difficulty arises when testing telecommunication services that include the use of manual operators. Typically such services involve human operators interacting with customers from manual operator consoles. The very nature of such human interaction makes the testing of such service inherently difficult to automate. Thus, these types of services are also conventionally tested manually. Moreover, today's hardware is increasingly dependent upon and tightly coupled with software that enables many of the features that consumer's demand. As the software and hardware are joined, the complexity of the software components and the difficulty of testing the union of the software and the hardware has increased in complexity.

Former software and hardware development tools included editors, debuggers and a lot of programmer sweat time. With the complexity of modern software and hardware, and the many possible scenarios that must be tested to assure proper system function, it is necessary to replace older, primitive tools with a testing system that is flexible and capable of testing many, diverse permutations of software enabled hardware features.

SUMMARY OF THE INVENTION

The foregoing problems are overcome in an illustrative embodiment of the invention in which a system for testing various network elements/entities and processes in a telecommunications network is provided. A network under test contains network entities which save data to a common database that is associated with processing particular test cases. A server correlates database data from the network under test and compares it to anticipated test case results. A disposition of the test cases is determined. Various elements of the invention interface appropriately, and process accordingly, to accomplish the testing and test result(s) disposition that include intelligent network elements such as automated response units, and manual network elements such as manual operator consoles. The test system can be used to test services in an automated fashion that have traditionally been very difficult or impossible to automate due to the requirement of human interaction.

The system of the preferred embodiment comprises a means for communication between a test call controller and one or more Intelligent Service Platforms within an Intelligent Services Network (ISN), such as Operator Network Centers (ONCs), and the like. ONCs are used to provide human and automated operator services to customers through the use of manual operator consoles, and Audio Response Unit (ARU)s. The test system of the preferred embodiment provides two way communications between the network elements within ONCs and the test call controller. The communication means is used to facilitate automation of test calls for products that use such operator services.

For example, the communication means of the preferred embodiment can be used to send keystrokes to a manual operator console. The keystrokes sent during a test call are received by the manual operator console and used as input to the console. In this manner, the controller emulates a live operator typing on an operator console.

Similarly, the communication means of the preferred embodiment can be used to send status information from the manual operator console to the controller. In this manner, the controller receives the same information as a live operator would receive from the console's display screen. This includes caller information, such as a caller's name or the called number, as well as signaling information such as call ringing, call answering, etc.

In a similar fashion, the controller of the preferred embodiment receives status information from ARUs. Such information includes for example the identification of a particular vocal script that is being played to a caller, or status information such as call received and call ringing messages. In a preferred embodiment, the communication means comprises a message protocol such as the User Datagram Protocol/Internet Protocol (UDP/IP). Both the controller of the preferred embodiment and each element within the ONC contain UDP/IP communication components.

A preferred embodiment also comprises a test call generator used to generate test calls in the communication network. The controllers operate in accordance with instructions in a test call script that controls the test call generator. The test call script also provides the commands pertaining to the previously mentioned two-way communication means between the controller and the various elements within the ONC.

In addition, the system of the preferred embodiment comprises a means for verifying billing records within the telecommunications network. The controller of the preferred embodiment creates a billing template that comprises expected billing information for each test call. The billing template is then compared against data from a billing verification system that reflects actual billing results from the communications network.

The controller of the preferred embodiment also comprises an audio generation and capturing device. This device is used to generate speech output and/or capture speech input. The speech capabilities of the preferred embodiment are used to interact with telecommunication services under test in an automated fashion. Thus, for example, the controller may cause the audio generator to generate a particular speech signal in response to a particular script from an ARU.

Accordingly, the preferred embodiment provides a means for automated test cases to interact, in an unattended fashion, with telecommunication products that use intelligent network services such as operator network centers and the like.

BRIEF DESCRIPTION OF THE DRAWINGS

The above and further advantages of the invention may be better understood by referring to the following description in conjunction with the accompanying drawings, in which:

FIG. 3A illustrates other records that appear in respective tables of the SQL DB in accordance with a preferred embodiment;

FIG. 3B describes a simple example of an anticipated results section of a test case in accordance with a preferred embodiment;

DETAILED DESCRIPTION

The preferred embodiment provides a system and method for automating the testing of telecommunication services that are traditionally difficult or impossible to automate. The system of the preferred embodiment comprises a means for communication between a test call controller and one or more intelligent service platforms within an ISN such as an ONC, an automated facsimile service, a call forwarding service, and the like. ONCs are used throughout in the examples below to illuminate novel and unique aspects of a preferred embodiment. However, other ISN platforms can also be used to implement the preferred embodiment. As such, ONCs are used for exemplary purposes and should not be construed to limit the scope and breadth of the preferred embodiment.

A preferred embodiment of a system in accordance with the preferred embodiment is preferably practiced in the context of a personal computer or workstation such as an IBM, Apple Macintosh or UNIX based computer. A representative hardware environment is depicted in FIG. 1A, which illustrates a typical hardware configuration of a workstation in accordance with a preferred embodiment having a central processing unit 10, such as a microprocessor, and a number of other units interconnected via a system bus 12.

Figure 1A:
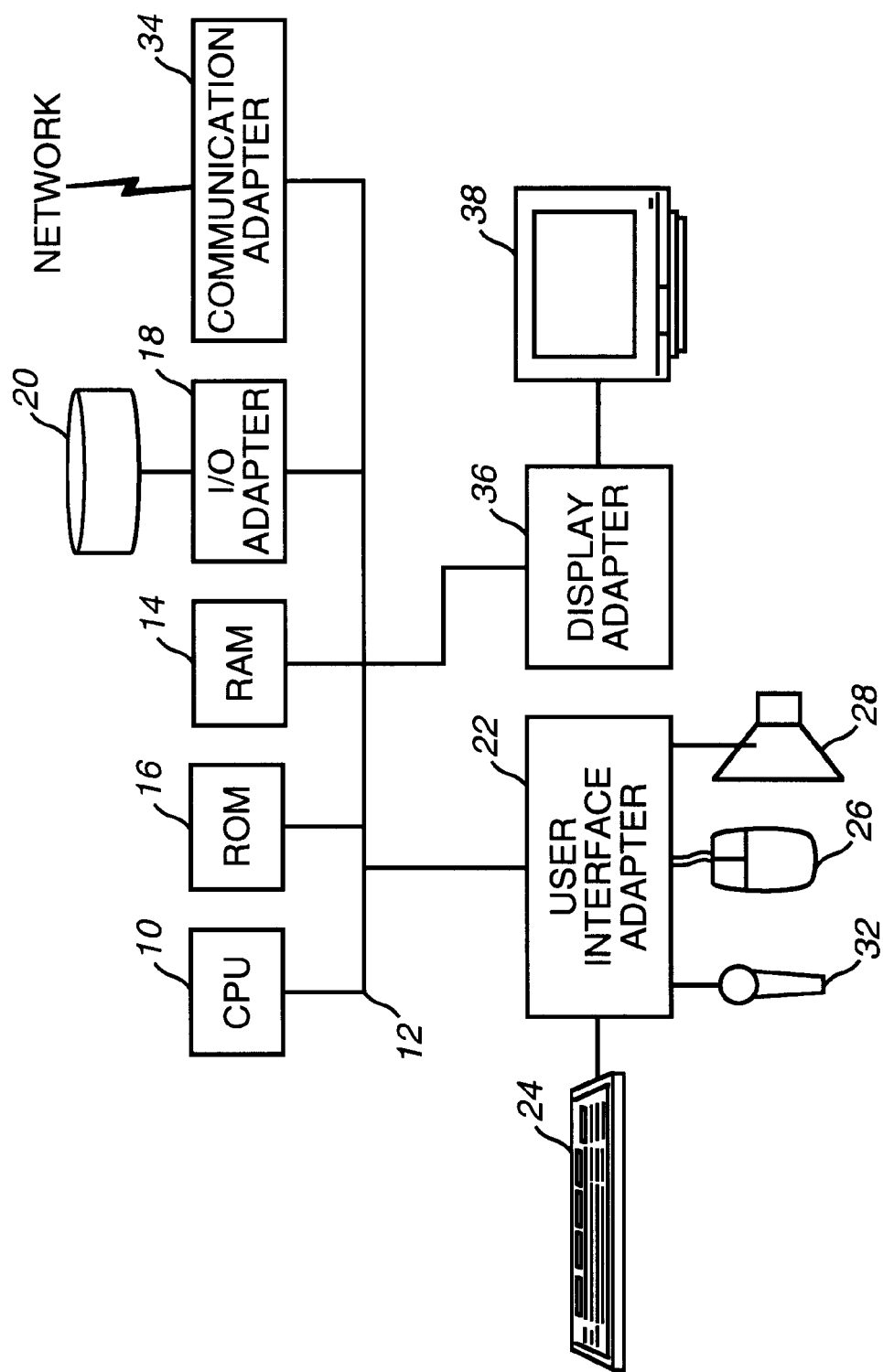
FIG. 1A is a block schematic diagram of a computer system, for example, a personal computer system on which the inventive object information tester operates.

The workstation shown in FIG. 1A includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows Operating System (OS), the IBM OS/2 operating system, the MAC OS, or UNIX operating system. Those skilled in the art appreciate that the preferred embodiment may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object that can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop that monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it is called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It is possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages.

ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX could be substituted for JAVA without undue experimentation to practice the invention.

The Common Object Request Broker Architecture (CORBA) is a standard promulgated by computer manufactures and software developers . The standard defines Application Programmer Interfaces (API)s which ease the development of object applications such as a system test application in accordance with a preferred embodiment. The system test application performs tests of hardware and software processes, for example, switches, billing, transmission, signaling, ACD (Automatic Call Distributor), ARU/VRU (Automatic Response Units/Voice Response Unit), OS (Operator Services), MTOC (Manual Telecommunications Operator Console), ATOC (Automatic Telecommunications Operator Console), DAP (Data Access Path) accesses, databases accesses, various service applications, bridges, routers or various other communication links.

A preferred embodiment discloses a system test platform for testing various network entities and processes in a telecommunications network. A network under test contains network entities which save data to a common database that is associated with processing particular test cases. A server correlates database data from the network under test and compares it to anticipated test case results. A disposition of the test cases is determined. Automatically comparing actual results with anticipated results stored as part of a test case, and for every type of test case that can be performed.

The system includes a first user interface for the input of test case information for the creation of at least partially complete test case outlines. The test case outlines are stored in a test case outline storage. A lab data database contains laboratory data. The system includes a process for searching the database of laboratory data and creating completed test case outlines from partially completed test case outlines. A rules database contains rules for generating test case output data from test case outlines. The system includes a process for applying rules from the rules database to test case outlines to generate test case output data.

Figure 1B:
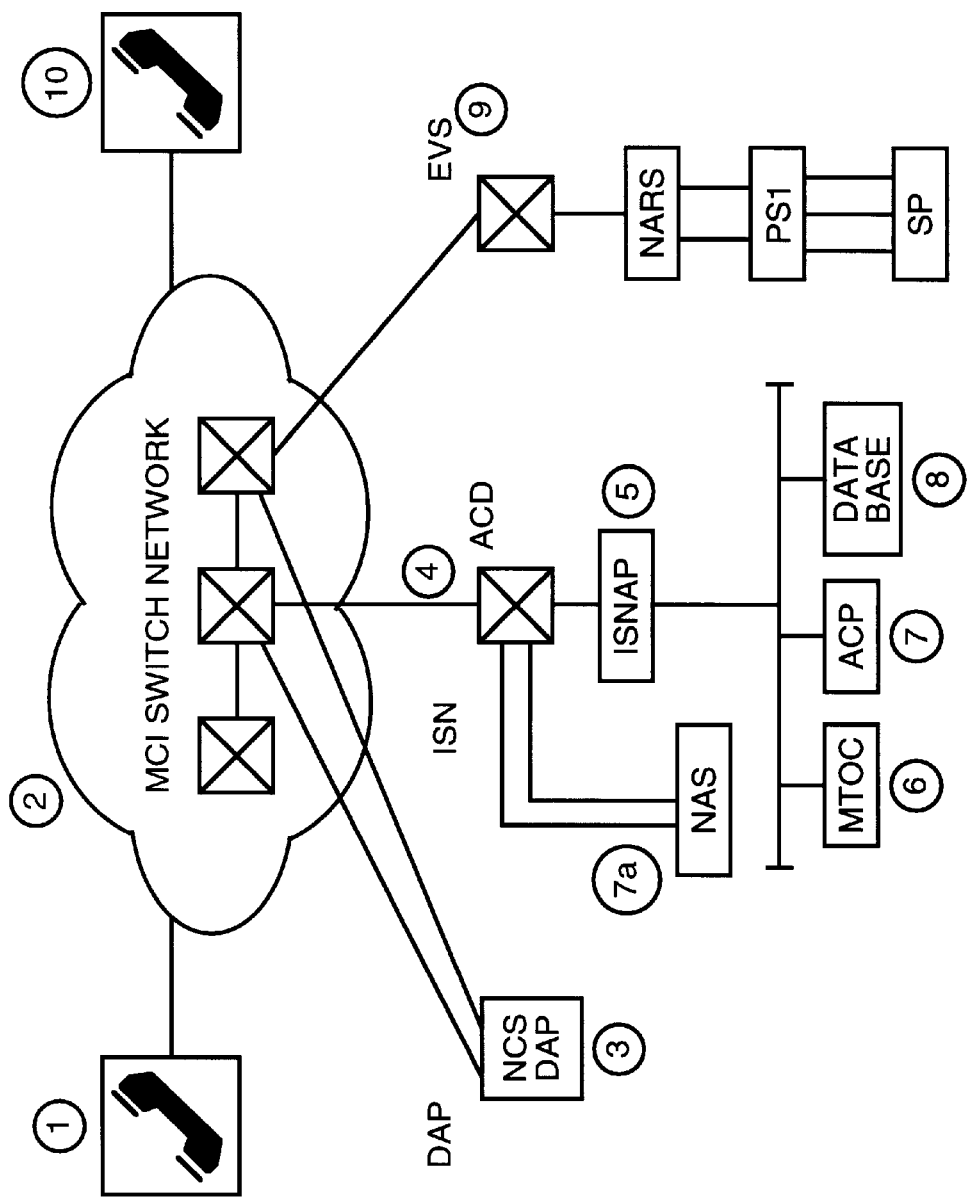
FIG. 1B illustrates an environment requiring comprehensive testing of a communication network such as an Integrated Services Network (ISN) in accordance with a preferred embodiment.

The problem which motivated the development of a preferred embodiment in accordance with this invention was how to define an architecture to perform efficient and comprehensive testing of every conceivable network element FIG. 1B illustrates an Intelligent Network in accordance with a preferred embodiment. The MCI Intelligent Network is comprised of a large number of components. Major components of the MCI Intelligent Network include the MCI Switching Network 2
Network Control System (NCS)/Data Access Point(DAP) 3
ISN—Intelligent Services Network 4
EVS—Enhanced Voice Services 9

MCI Switching Network

The MCI switching network is comprised of special purpose bridging switches 2. These bridging switches 2 route and connect the calling and the called parties after the call is validated by the intelligent services network 4. The bridging switches have limited programming capabilities and provide the basic switching services under the control of the Intelligent Services Network (ISN) 4.

Network Control System/Data Access Point (NCS/DAP)

The NCS/DAP 3 is an integral component of the MCI Intelligent Network. The DAP offers a variety of database services like number translation and also provides services for identifying the switch ID and trunk ID of the terminating number for a call.

The different services offered by NCS/DAP 3 include:
Number Translation for 800, 900, VNET Numbers;
Range Restrictions to restrict toll calling options and advanced parametric routing including Time of Day, Day of Week/Month, Point of Origin and percentage allocation across multiple sites;
Information Database including Switch ID and Trunk ID of a terminating number for a given call;
Remote Query to Customer Databases;
VNET/950 Card Validation Services; and
VNET ANI/DAL Validation Services.

Intelligent Services Network (ISN) 4

The ISN 4 includes an Automatic Call Distributor (ACD) for routing the calls. The ACD communicates with the Intelligent Switch Network Adjunct Processor (ISNAP) 5 and delivers calls to the different manual or automated agents. The ISN includes the ISNAP 5 and the Operator Network Center (ONC). ISNAP 5 is responsible for Group Select and Operator Selection for call routing. The ISNAP communicates with the ACD for call delivery to the different agents. The ISNAP is also responsible for coordinating data and voice for operator-assisted calls. The ONC is comprised of Servers, Databases and Agents including Live Operators or Audio Response Units (ARU) including Automated Call Processors (ACP)s, MTOCs and associated NAS 7. These systems communicate with each other on an Ethernet LAN and provide a variety of services for call processing.

The different services offered by the ONC include:
Validation Services including call-type identification, call verification and call restrictions if any;
Operator Services, both manual and automated, for customer assistance;
Database Services for a variety of database lookups;
Call Extending Capabilities;
Call Bridging Capabilities;
Prompt for User Input; and
Play Voice Messages.

Enhanced Voice Services (EVS) 9

Enhanced Voice Services offer menu-based routing services in addition to a number of value-added features. The EVS system prompts the user for an input and routes calls based on customer input or offers specialized services for voice mail and fax routing. The different services offered as a part of the EVS component of the MCI Intelligent Network include:
Play Customer Specific Voice Messages;
Prompt for User Input;
User Input based Information Access;
Call Extending Capabilities;
Call Bridging Capabilities;
Audio Conference Capabilities;
Call Transfer Capabilities;
Record User Voice Messages;
Remote Update of Recorded Voice; and
Send/Receive Fax.

Additional Components

In addition to the above mentioned components, a set of additional components are also architected into the MCI Intelligent Network.

These components are:
Intelligent Call Routing (ICR) services are offered for specialized call routing based on information obtained from the calling party either during the call or at an earlier time. Routing is also based on the knowledge of the physical and logical network layout. Additional intelligent routing services based on time of day, alternate routing based on busy routes are also offered.

Billing is a key component of the MCI Intelligent Network. The billing component provides services for customer billing based on call type and call duration. Specialized billing services are additionally provided for value added services like the 800 Collect calls.

Fraud Monitoring component is a key component of the MCI Intelligent Network providing services for preventing loss of revenue due to fraud and illegal usage of the network.

Operational Measurements include information gathering for analysis of product performance. Analysis of response to advertising campaigns, calling patterns resulting in specialized reports result from operational measurements. Information gathered is also used for future product planning and predicting infrastructure requirements.

Usage Statistics Reporting includes gathering information from operational databases and billing information to generate reports of usage. The usage statistics reports are used to study call patterns, load patterns and also demographic information. These reports are used for future product plans and marketing input.

Intelligent Network System Overview

The MCI Call Processing architecture is built upon a number of key components including the MCI Switch Network, the Network Control System, the Enhanced Voice Services system and the Intelligent Services Network. Call processing is entirely carried out on a set of general purpose computers and some specialized processors thereby forming the basis for the MCI Intelligent Network. The switch is a special purpose bridging switch with limited programming capabilities and complex interface. Addition of new services on the switch is very difficult and sometimes not possible. A call on the MCI Switch is initially verified if it needs a number translation as in the case of an 800 number. If a number translation is required, it is either done at the switch itself based on an internal table or the request is sent to the DAP which is a general purpose computer with software capable of number translation and also determining the trunk ID and switch ID of the terminating number.

The call can be routed to an ACD which delivers calls to the various call processing agents like a live operator or an ARU. The ACD communicates with the ISNAP which does a group select to determine which group of agents are responsible for this call and also which of the agents are free to process this call.

The agents process the calls received by communicating with the NIDS (Network Information Distributed Services) Server which are the Validation or the Database Servers with the requisite databases for the various services offered by ISN. Once the call is validated by processing of the call on the server, the agent communicates the status back to the ACD. The ACD in turn dials the terminating number and bridges the incoming call with the terminating number and executes a Release Link Trunk (RLT) for releasing the call all the way back to the switch. The agent also generates a Billing Detail Record (BDR) for billing information. When the call is completed, the switch generates an Operation Services Record (OSR) which is later matched with the corresponding BDR to create total billing information. The addition of new value added services is very simple and new features can be added by additional software and configuration of the different computing systems in the ISP. A typical call flow scenario is explained below.

A Call Flow example illustrates the processing of an 800 Number Collect Call from phone 1 in FIG. 1B to phone 10. The call is commenced when a calling party dials 1-800-COLLECT to make a collect call to phone 10 the Called Party. The call is routed by the Calling Party's Regional Bell Operating Company (RBOC), which is aware that this number is owned by MCI, to a nearest MCI Switch Facility and lands on an MCI switch 2.

The switch 2 detects that it is an 800 Number service and performs an 800 Number Translation from a reference table in the switch or requests the Data Access Point (DAP) 3 to provide number translation services utilizing a database lookup.

The call processing is now delegated to a set of intelligent computing systems through an Automatic Call Distributor (ACD) 4. In this example, since it is a collect call, the calling party has to reach a Manual or an Automated Operator before the call can be processed further. The call from the switch is transferred to an ACD 4 which is operational along with an Intelligent Services Network Adjunct Processor (ISNAP) 5. The ISNAP 5 determines which group of Agents are capable of processing the call based on the type of the call. This operation is referred to as Group Select. The agents capable of call processing include Manual Telecommunications Operator Console (MTOC)s 6 or Automated Call Processors (ACP)s 7 with associated Network Audio Servers (NAS)s 7a. The ISNAP 5 determines which of the Agents is free to handle the call and routes the voice call to a specific Agent.

The Agents are built with sophisticated call processing software. The Agent gathers all the relevant information from the Calling Party including the telephone number of the Called Party. The Agent then communicates with the database servers with a set of database lookup requests. The database lookup requests include queries on the type of the call, call validation based on the telephone numbers of both the calling and the called parties and also call restrictions, if any, including call blocking restrictions based on the called or calling party's telephone number. The Agent then signals the ISNAP-ACD combination to put the Calling Party on hold and dial the called party and to be connected to the Called Party. The Agent informs the called party about the Calling Party and the request for a Collect Call. The Agent gathers the response from the Called Party and further processes the call.

If the Called Party has agreed to receive the call, the Agent then signals the ISNAP-ACD combination to bridge the Called Party and the Calling Party.

The Agent then cuts a BDR which is used to match with a respective OSR generated by the switch to create complete billing information. The ISNAP-ACD combination then bridges the Called Party and the Calling Party and then releases the line back to the switch by executing a Release Trunk (RLT). The Calling Party and the Called Party can now have a conversation through the switch. At the termination of the call by either party, the switch generates a OSR which is matched with the BDR generated earlier to create complete billing information for the call. If the Called Party declines to accept the collect call, the Agent signals the ACD-ISNAP combination to reconnect the Calling Party which was on hold back to the Agent. Finally, the Agent informs the Calling Party about the Called Party's response and terminates the call in addition to generating a BDR.

MCI Intelligent Network is a scaleable and efficient network architecture for call processing and is based on a set of intelligent processors with specialized software, special purpose bridging switches and ACD's. The Intelligent Network is an overlay network coexisting with the MCI Switching Network and is comprised of a large number of specialized processors interacting with the switch network for call processing. One embodiment of Intelligent Network is completely audio-centric. Data and fax are processed as voice calls with some specialized, dedicated features and value-added services.

In another embodiment, the Intelligent Network is adapted for newly emerging technologies, including POTS-based video-phones and internet telephony for voice and video. The following sections describe in detail the architecture, features and services based on the emerging technologies. A preferred embodiment performs testing on software and hardware components of a telecommunications network such as the one presented in FIG. 1B.

Figure 2:
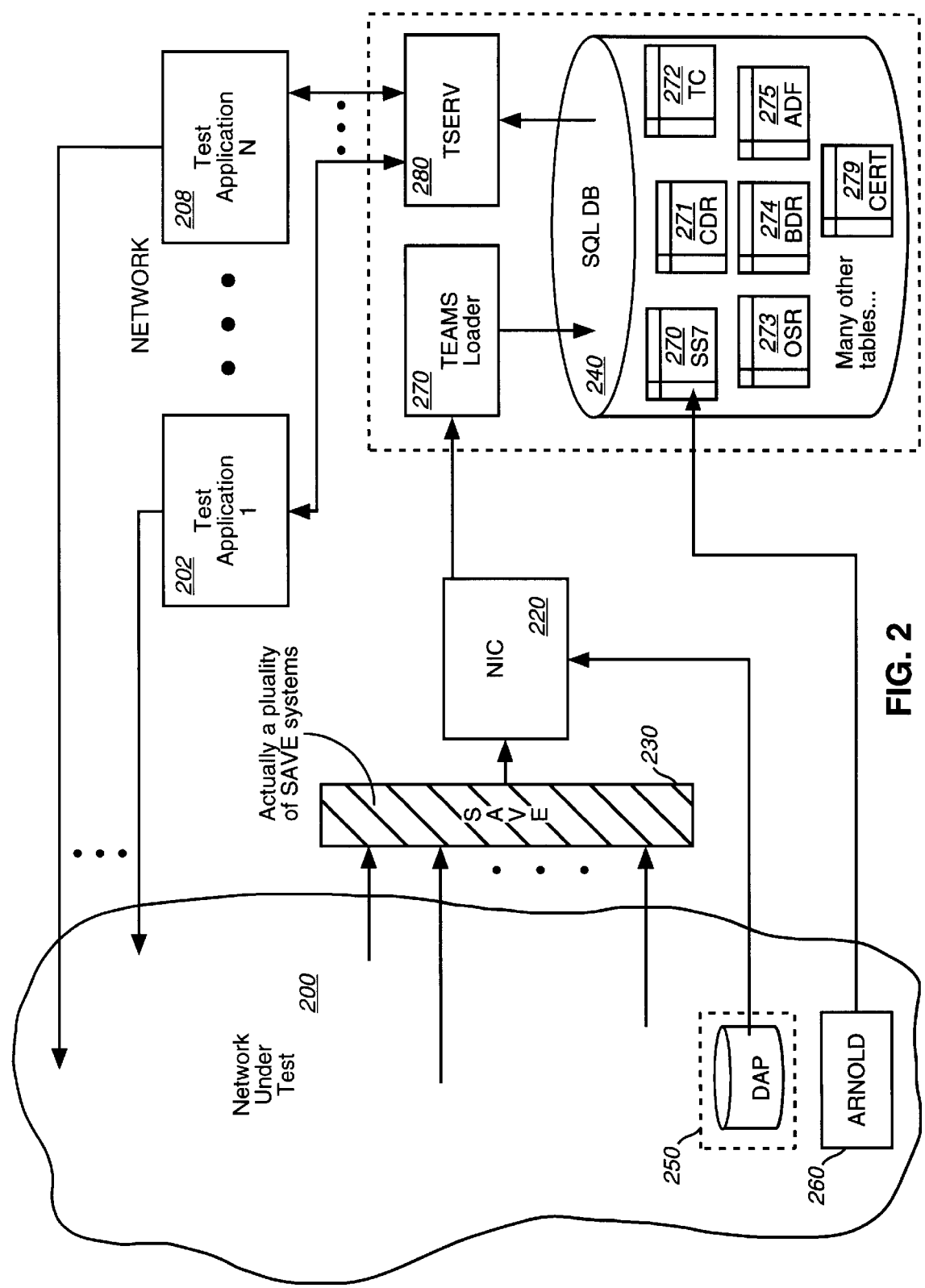
FIG. 2 depicts a Telecommunications System test Platform in accordance with a preferred embodiment.

FIG. 2 depicts a preferred embodiment of a Telecommunications System test Platform. The entity to test is a Network Under Test 200 (e.g. an ISN) for example an Integrated Services Digital Network (ISDN), Common Channel Signaling 7 (CCS7, SS7 for short), or any other type of ISN. Software and hardware entities in the network must be verified for proper operation. Various Test Applications (202–208) have been developed to perform testing.

These applications typically have a specialization in the hardware and/or software of a network that is to be tested. Conventional test applications have typically evolved different methodologies and test processes to achieve objectives. The preferred embodiment provides a single system test platform by which any number and type of test applications can perform testing.

Entities in the network under test communicate critical event data to a Network Informnation Concentrator (NIC) 220—a server. A specialized hardware interface between network entities, referred to as Save 230, allows communicating the critical event data (e.g. billing information) to the NIC 220, which in turn facilitates entry of the event data into a centralized database 240. The Save element is typically a fault redundant (i.e. two processors) computers (e.g. Stratus Polo) which provide translation between a network element and the NIC 220.

The single SAVE 230 box in FIG. 2 can be a plurality of SAVE systems for the network. While there is typically a single SAVE system per network element, there can be multiple network elements connected to a single SAVE system provided the elements are located together. A network element is connected to a Save system through an FTAM or X.25 protocol. A particular Save system talks TCP/IP to the NIC 220.

The centralized database is preferably an SQL database, and is referred to as a Structured Query Language DataBase (SQL DB) 240. In a SS7 embodiment, entities such as a DAP server 250, and ARNOLD 260(a SP emulation developed facilitating test of signaling aspects), may communicate critical test data directly to the SQL DB 240.

The NIC 220 synthesizes event data into a suitable form and enters transactions into a FIFO queue. A Test Execution and Automation Management System (TEAMS) Loader process 270 developed to manage the SQL DB 240, feeds from the NIC 220 queue with appropriate communications (e.g. TCP/IP) and enters the events into tables (270–279) of the SQL DB 240. All appropriate events in the network under test are logged into the SQL DB 240 either directly, or through the NIC 220, for all test cases that are performed.

The TEAMS Loader 270 filters out all records from the NIC 220 which are not of interest. In one embodiment, the originating trunk group of a test case is utilized to determine which records are of interest. A table of trunk groups that are not related to current test cases can also be maintained in the SQL DB 240 to indicate which records to discard. Typically products developed in-house insert events directly into the SQL DB 240 and products developed by vendors interface through the NIC 220. A preferred embodiment implementing the Save 230 processing was specifically developed to interface vendor records into the NIC 220 process, and the TEAMS loader 270 was specifically developed to efficiently interface the NIC 220 to the SQL DB 240.

The SQL DB 240 contains many tables of many types of records. FIG. 2 depicts a few examples, perhaps the most recognizable by those skilled in the related arts which are discussed below.

SS7 (270): SS7 signaling events from signaling entities in the network under test and logs them.

CDR (271): Call Detail Records, for example of the billing event variety, communicated by switches through the NIC.

TC (272): Test Cases that are used by various Test Applications. The Test Generation System (TGS) is utilized to build generic test cases, each of which can be used by any of the test applications. Each test case (TC) contains:

1) a reference number (i.e. test case number), 2) a human readable section of the test case for tester utilizing many types of test applications, 3) the generic test script for performing test cases with porting means to various test applications (see RIC-96-049), and 4) an anticipated test results section.

The anticipated result section contains a representation of all anticipated records from the network under test (e.g. SS7, CDRs, OSRs, etc.). The representations are models (i.e. wildcarded) for matching actual records from the network. Specific fields of the record which are only dependent on the particular element which reported the record are not necessarily specified with anticipated results. The fields that show that a test case passed or failed are explicitly defined in anticipated results for matching. There is additional data maintained in the SQL DB for accomplishing test case versioning.

OSR (273): Operator Service records, communicated by OS entities, or ACDs (automatic call distributors), in the network through the NIC.

BDR (274): Billing Detail Records, communicated by an ARU, VRU, MTOC, or ATOC in the network through the NIC.

ADF (275): Abstract Data Format records communicated from translation entities which access a DAP in the network, for example to determine routing of an 800 number.

CERT (279): Certification data is maintained for all executed test cases to assure acceptance of test case results by qualified owners/representatives of entities in the network under test.

With reference back to FIG. 2, a TEAMS Server (TSERV) 280 process provides a client interface (client API, e.g. with TCP-IP) to all test applications (202–208). Test applications access their view (i.e. generic TC definition is customized for request by particular test application type) of a test case through TSERV 280 when ready to perform a test case. Upon completion of a test case, or a batch of test cases, the particular test application 208 couples to TSERV 280 to obtain test case results. A test application is typically executed on a personal computer coupled to an originating switch through a circuit, or trunk (e.g. by means of a test unit like SAGE, AMERITEC, DIALOGIC, etc). Calls are typically automatically initiated (i.e. numbers are dialed automatically. The dialed digits and network configuration uniquely defines the particular test that is appropriate to perform, and the type of test case as detailed below.

Anticipated test case results (i.e. anticipated events logged by applicable entities in the network under test) are stored as part of a test case. When invoked by a test application (through a client API) for test case results, TSERV 280 compares all events logged in the SQL DB 240 for a particular test case with anticipated test case results, and renders a disposition. The test application 209 is returned to with a disposition describing whether the test case produced the anticipated results, or what portions of the test case were in conflict. TSERV 280 manages an archive of test case results in the CERT table. A certification application interfaces to the CERT data appropriately. A preferred embodiment assumes the system contains: a primitive CERT table containing a pass/fail status and information for identifying failure(s) along with the test case reference number, and that users can browse the CERT table with a basic database query tool.

TSERV 208 utilizes time information to correlate associated records. A preferred embodiment utilizes time-point validation and time synchronization of systems, and logs events to a SQL DB 240. Time synchronization and consistency for processing, and tracked events are provided in a preferred embodiment of the invention.

Preferably, the TEAMS loader 270 and TSERV 280 processes are executing on the same system which contains the SQL DB 240 that enables database transactions to be performed locally (the FIG. 2 dashed line indicates a single system, for example a DEC Alpha computer system).

The system also provides validation and synchronization of all network entities that must cooperate for comprehensive testing which is referred to as time point validation. A preferred embodiment is directed to an integrated system for capturing timepoints associated with critical events in a phone call from a test application perspective (particularly the events important to correct billing) and comparing those timepoints with actual results from the tested network. Timepoints refer to time information for key milestones in the progress of call processing. Time information of applicable network elements is first assured to be synchronized, or appropriately translated for consistency. The test application timepoints are gathered and compared to billing records associated with the test case (e.g. call), and used to produce an accurate test case result.

Timepoints are date/time stamps of key milestones in the progress of call processing. Timepoint testing of billing records is essential to assure that customers are being billed accurately. In the past, timepoint testing has been performed manually, and client test applications have not been integrated for automated timepoint validation. Automation of timepoint testing to validate billing records is needed to shorten test time and improve results.

Test elements developed for in-house applications are interconnected by means of a Local Area Network (LAN) and are time synchronized using a time protocol (e.g. Network Time Protocol Standard) to assure consistency. The time (e.g. Mar. 27, 1997, 10:03AM) on one system is always the same time on all other systems managed with the time protocol and connected via the LAN. Test elements, for example telephony elements in the network under test, consists of many types of equipment, many different vendors for that equipment, different geographical locations, and other variables. The varieties produce different times on particular systems. Time information may be in different time zones, different formats, different units, etc. It is important to be able to correlate data in the SQL DB together with a common date/time reference.

TIME LOADER PROCESSING IN ACCORDANCE WITH A PREFERRED EMBODIMENT

In general there are a synchronized set of network elements and an unsynchronized set of network elements. A Time Loader (TL) process periodically accesses elements of the unsynchronized set of elements and updates records in a Time table of the SQL DB. The network element identifier, the time as known by the network element identifier, and the same time as known by the Time Loader (TL) process is maintained to the Time table. The difference in the TL time and the network element time is added to (or subtracted from) tracked records in the SQL DB which were saved by the particular network element when TSERV gathers correlated records for test case results.

It is important that the TL periodically collects time information because network elements in the unsynchronized set may have unusual and significant time changes for reasons such as post-failure time set, clock inaccuracies, etc. The TL assures most current time correlation.

The TL accesses systems of the unsynchronized set of network elements (e.g. by logging in as a system administrator) and retrieves the element date/time. The TL associates the retrieved time with the same time as known by the TL (its time).

In one embodiment as described above, three field records are maintained in the Time table, namely, the network element identifier (e.g. RES#), the TL time, and the network element time (at same TL time). The Time Loader process has hard coded process knowledge: A) the list of network elements to be logged on, B) the associated login parameters for each element, C) the method for retrieving time information from each element, D) how to translate the time (for each element) into a form suitable for the Time table so that TSERV performs only simple arithmetic.

While hard coding the process knowledge provides a quick implementation, this is not a good coding practice. In an alternative embodiment, the TL is configured with a flat ASCII file which contains multiple network element configurations, the number of which is equivalent to the number of network elements to be managed in the unsynchronized set. Each network element configuration therein provides process knowledge at TL startup which the TL parses and uses to determine how to perform its job for each network element. This allows isolation of the process knowledge from the processing itself and allows dynamic maintaining of changing requirements (e.g. add/remove) for network elements in the unsynchronized set.

In yet another embodiment, isolation of how the TL should perform its job is maintained completely in the Time table of the SQL DB. Time table maintained process knowledge would consist of one or more rows in the Time Table, each row for a particular network element in the managed unsynchronized set. Each row may contain the following fields:

Network element identifier (e.g. RES#), network element time, TL time, login parameters (multiple fields here), translation indicator (may be multiple fields here for time type (e.g. GMT), format, units, etc, to indicate if and how to do translation), command for time retrieval, time descriptor (may be multiple fields for how to get time information from command response (e.g. offset, length, etc)). In this embodiment, all fields would be maintained to the Time table by an administrator and the Time Loader would retrieve its process knowledge from the Time table, and update the TL time and network element time fields appropriately to the Time table.

An Alternative Embodiment of the Time Loader for a Particular Network Element 1) Login to element
2) Retrieve current date/time stamp and associate Time Loader date/time same instant in time
3) If units need translation then perform translation to common format
4) If format needs modification then convert to correct format
5) Update Time table with element date/time, associated Time Loader date/time Test applications are typically PC applications that interface with a serial connection to a Network Test Interface Unit (NTIU), for example a SAGE unit, AMERITEC unit, or IDACOM unit. A command to the NTIU manages coordinating milestones of an automated telephone call. The NTIUs are typically connected to a switch with a T1 trunk. Test applications utilize two NTIUs because test applications may terminate calls to the application as well as originate calls from the application. FIG. 2 described a test application interface with a TSERV processor that is responsible for retrieving test cases and determining results of test cases.

A plurality of timepoints (TPs) are provided by test applications for each test case (as the test application views the TP for the automatically executed test case based on network interaction (e.g. responses)), the number of timepoints dependent on the type of test and type of test application. A timepoint data structure in accordance with a preferred embodiment consists of the following fields:

1) Timepoint milestone identifier (e.g. TPn)
2) Time Offset (from a start date/time stamp)
3) Confidence factor (e.g. # seconds tolerance of error between network element TP time and test application TP time)

Thus, the time point collection aspect in accordance with a preferred embodiment from the test application perspective is:
TEST APP: Test Case (TC) #34
TC start of call date/time stamp
TC end of call date/time stamp
  TPa: 1 second, CF=1 second
  .
  .
  .
  TPb: 3 seconds, CF=1 second
  TPn: K seconds, CF=1 second Each test case which is executed (identified by test case number) has a call start time, call end time, and a set of appropriate time points (depends on test case) which are offsets from the call start time. Each offset has a confidence factor (typically 1 second) which allows a tolerance for determining if timepoints as determined by records saved to the SQL DB from the network under test match timepoints as viewed by the test application. Time data maintained by the Time Loader is critical in performing SQL DB record searches and timepoint matching.

The test application passes as parameters to TSERV when requesting results of a test case the timepoint information gathered by the test application for the particular test case. TSERV uses the test application timepoints to validate records saved to the SQL DB by the network under test. TSERV uses the Time table data to retrieve appropriate records in the SQL DB from the network under test, and to align timepoints for proper comparison.

OSR Billing Validation Example in Accordance With A Preferred Embodiment

OSR billing is verified on an ISN platform in accordance with a preferred embodiment. Along with TP tracking within a test application, additional test application ability includes being able to allow timed call execution events. For example: Stay at operator position for 45 seconds; After ACM, wait 50 seconds before sending ANM; Leave call in answered state for 4 minutes.

For SS7 operator blind transfer calls that originate and terminate directly to a test application, near perfect accuracy can be calculated for all five OSR timepoints. Specifically, TP1 (Call Orig Time) can be found at call origination (IAM); TP4 (operator answer) is determined when ANM is received; TP5 (operator release) can be estimated for blind transfer calls by receipt of a terminating IAM; TP6 (answer time) is the time the terminating ANM is sent. And TP7 (disconnect) is the time the REL message is sent.

This is the most accurate scenario because all call events can be measured. Other call scenarios do not have the same accuracy. For example, on an inband or non-AOSM terminations, answer is determined by triple checking the existence of pre-defined tones at pre-defined levels. The amount of time to detect answer after answer is received may vary by several seconds.

To account for call scenarios for which timepoints can not be calculated exactly a timepoint confidence factor is included in the protocol. For example, if answer occurs on an inband termination and inband terminations can only be timed accurately to a level of three seconds, the TP6 event time is sent with a confidence factor of three.

Test Application TPs in the OSR Billing Embodiment

1. TP1 (Call origination—go off hook):
For all call types, the TP1 event time is captured at call origination. For SS7, this is immediately following the transmission of the IAM. For inband calls, this is the time the originating SAGE is placed off-hook. The estimated confidence factor is 1 second.

2. TP2 (First digit dialed):
The time of when the first digit is dialed on a call.

3. TP3 (Last digit dialed):
The time of when the last digit is dialed on a call.

4. TP4 (Operator Answer):
For SS7 origination, the TP4 event time is set at receipt of ANM with a confidence factor of 1 second. Initial implementation may not provide a TP4 event time for inband origination (Confidence Factor 0). For some inband origination, it may be possible to poll the originating SAGE for receipt of hardware supervision. However, in several call types such as card timeout, hardware answer does not indicate operator answer. Additionally, a new polling process to determine hardware answer may negatively impact existing test cases. Implementations for inband test cases occur where possible.

5. TP5 (Operator Release):

Operation of the TP5 time varies by call type. A new test case field ("Blind Transfer y/n") is used to determine operation.

a. SS7 Blind Transfer Termination:

For blind transfer calls which terminate SS7 back to AOSM, the TP5 event can be determined by receipt of an inbound IAM with a confidence of one or two seconds.

b. Inband and SS7 Conference Call Terminations:

o MTOC processed conference call terminations:

For MTOC processed conference calls, the TP5 event is determined at the time the last keystroke is entered on the MTOC console. The estimated confidence factor is three seconds.

o ARU processed conference Terminations:

For ARU processed conference calls, The TP5 event can not be determined. The confidence factor isset to 0.

6. TP6 (Call Answer):

Determination of the TP6 event occurs differently for blind transfer and conference calls.

a. SS7 Blind Transfer Termination:

For blind transfer calls that terminate SS7 back to AOSM, the TP6 event can be determined by transmission of the ANM message. The confidence factor for this event is 1 second.

b. Inband Blind Transfer Terminations:

For this termination type, answer is determined by verification of voice cut-through. This equates to receipt of pre-defined tones at pre-defined levels in combination with receipt of hardware supervision. Currently, answer is triple checked to prevent indications of false answer. The expected confidence factor of this termination type is 4–8 seconds. This may be improved if testing finds the delay between answer and interpretation of answer to be a consistent time value.

c. Inband and SS7 Conference Terminations:

On conference calls, The TP6 event is written after hardware answer at operator release. Like inband blind transfer terminations, this type of termination is determined by voice cut-through and verification. Again, the confidence factor may be as great 4–8 seconds.

7. TP7 (Disconnect Timepoint):

In most cases the TP7 event is determined by actual release. For SS7 calls this is the transmission of a REL message. For inband calls, it is the time the SAGE is returned on-hook. These events can be determined with a confidence of 1 second. For operator disconnect calls, this event is determined by issuance of a "Disconnect" script command. In this case the confidence factor is estimated to be 3–6 seconds.

Details of TSERV In Accordance With A Preferred Embodiment

TSERV is called for TC view (per test application) retrieval when performing a test case TSERV is called by a test application with timepoint information as parameters to determine test case results. The logic flows in sequential processing as shown below.

1) TC handle (i.e. #) is used to identify the TC;
2) Time info in network under test records tracked is skewed according to Time table information for properly retrieving correlated records for a TC;
3) Time information along with the confidence factor verifies timestamps of 'network under test' records (e.g. billing); and
4) Disposition is rendered according to timepoints and any 'network under test' record inconsistencies.

With reference now to FIG. 3A, other records that appear in respective tables of the SQL DB are defined. Thus, a single test case can contain many records and record types in the anticipated result section. FIG. 3B describes a simple example of an anticipated result section of a test case.

Figure 4:
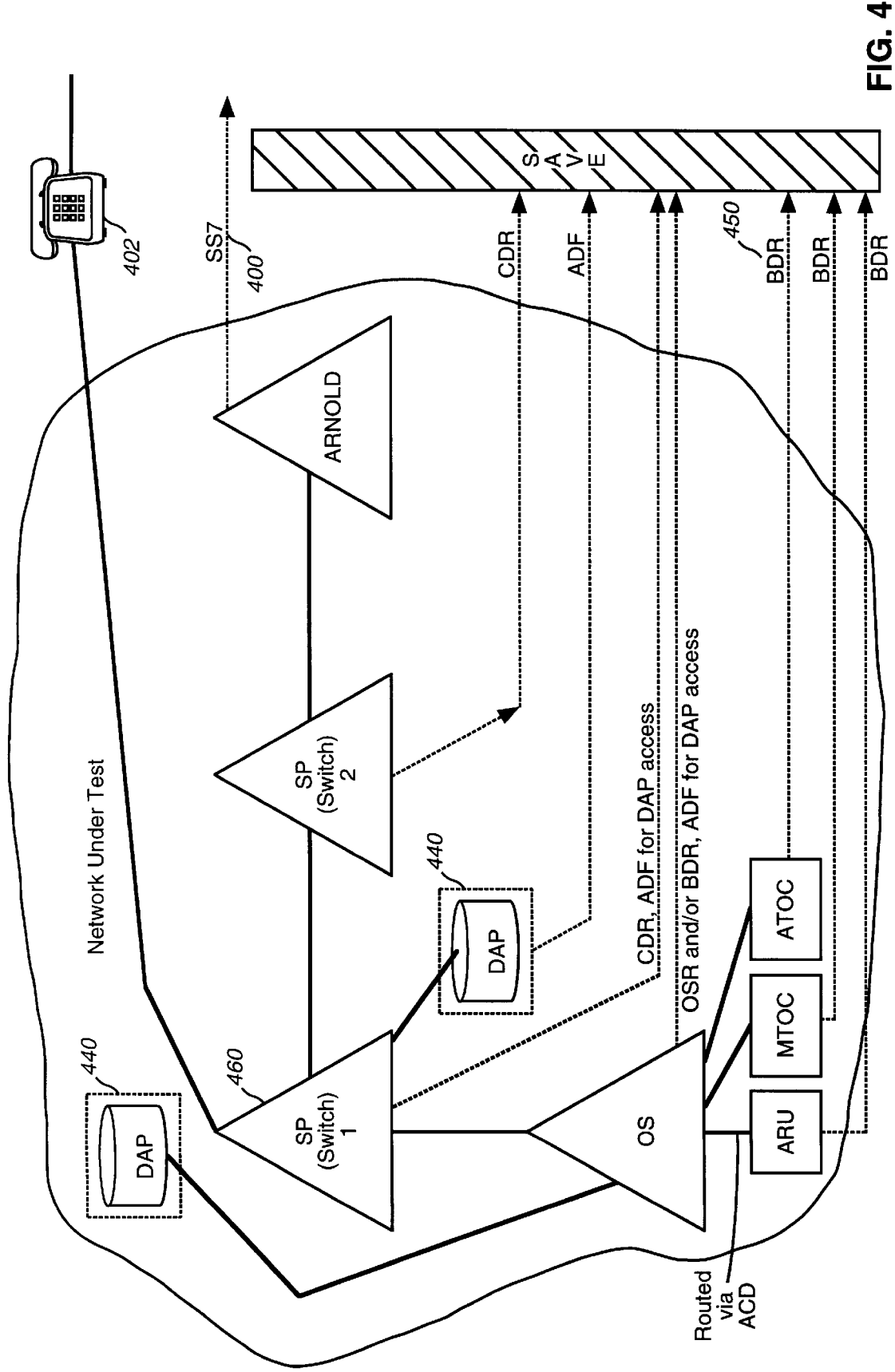
FIG. 4 illustrates an SS7 test environment in accordance with a preferred embodiment.

FIG. 4 illustrates an SS7 400 test environment in accordance with a preferred embodiment. With reference now to FIG. 4, a simple example of an SS7 400 test environment is demonstrated. A test application appears to an originating Switch One to be a connected telephone 402. Switches involved in the path of a call store CDRs into the SQL DB. An ADF record is logged when the DAP 440 is accessed (by the DAP server and/or the entity interfacing to the DAP server), for example, to determine termination for a dialed 800 number. For test cases that utilize Operator Services (OS), OS logs OSRs and/or BDRs 450 depending on the type of OS. If an OS routes a call to an ARU, MTOC, or ATOC, the entity logs a BDR 450. Routing to an ARU is typically through an Automated Call Distribution (ACD) and then to a PC which executes the ARU. With reference to the signaling aspect of a test case, switches are SPs driven by STPs (Signaling Transfer Points). A preferred embodiment emulates an SP and logs SS7 message records directly to the SQL DB.

Pseudo-Code In Accordance With A Preferred Embodiment

To assist one of ordinary skill in the programming art to implement a preferred embodiment without undue experimentation, pseudo-code is presented below which describes the detailed logic in accordance with aspects of the invention.

TEAMS Loader
    Establishes session with NIC upon startup; can be terminated at any time
    Loop until terminated
        Get next entry(s) from NIC FIFO queue; implicit wait
        Decode call record(s) and extract key fields
        Access trunk group filter table
        Discard record(s) if filter table indicates record(s) not of interest
        Insert remaining (if any) call record(s) into SQL DB
        Purge obsolete SQL DB call records
    Endloop
ARNOLD Loader
    {Arnold has a similar loader process assumed in FIG. 2}
    Establishes session with ARNOLD upon startup; can be terminated at any time
    Loop until terminated
        Get next SS7 message entry(s) from ARNOLD FIFO queue; implicit wait
        Decode SS7 message and extract key fields
        Insert SS7 message into SQL DB
        Purge obsolete SS7 SQL DB records
    Endloop
TSERV
    Client APIs:
        Retrieve Test Case:
            Particular test application invokes TSERV with test application type and test case number
            Retrieve from SQL DB the test case by test case number
            Handle any error (e.g. not found)
            Format test script according to test application type Return appropriate specific test script from generic test case to calling application Retrieve Test Case Result:

A particular test application invokes TSERV for test case result (assume 1 TC for pseudo-code simplicity) with test case number, start time, end time, and timepoint information as parameters Retrieve from SQL DB the test case by test case number Handle any error . . .

Loop for all anticipated records

Retrieve next anticipated record from test case anticipated results section

Retrieve from SQL DB the matching record according to start time, end time, etc

If (not found) then log error else validate record (and timepoint info) and log results EndLoop Query SQL DB for records during start time, end time, etc which may be present and should not be Log any errors thereof Enter result data and disposition (pass/fail) into CERT table Return pass/fail status to calling test application //End of Pseudo-code//

Figure 5:
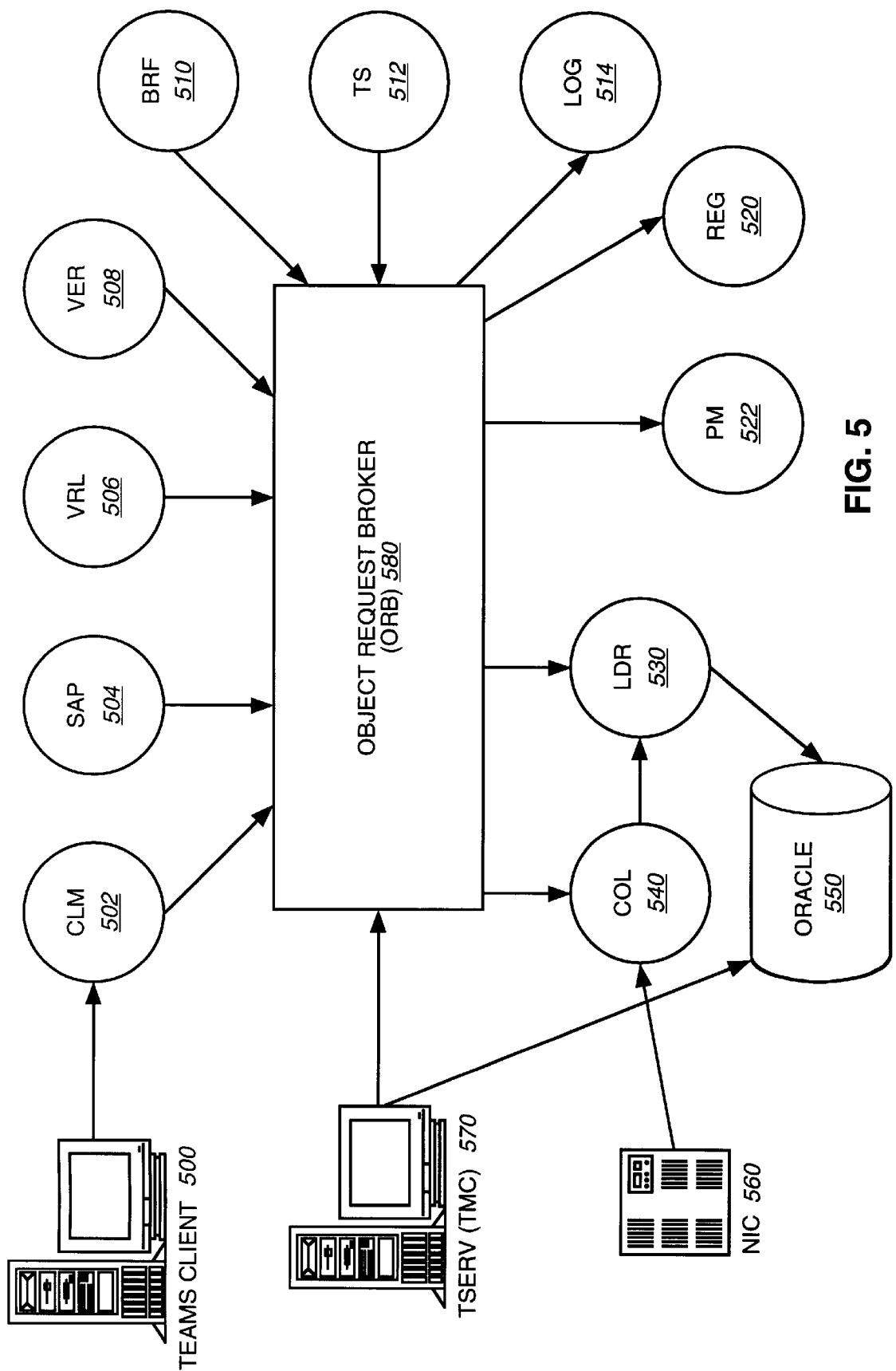
FIG. 5 is an architecture diagram in accordance with a preferred embodiment.

FIG. 5 is an architecture diagram in accordance with a preferred embodiment. With reference now to FIG. 5, the detail of the actual TSERV software processes is depicted. A detailed description of the processing in the software processes is provided below, so a brief introduction of the modules is appropriate. A client 500 requiring the invocation of a test initiates the request through the Client Manager (CLM) 502 which accesses the Object Request Broker (ORB) 580. The ORB 580 provides access through a CORBA compliant interface to applications such as Subscribe and Publish (SAP) 504, Verification Request Loader (VRL) 506, Verifier (VER) 508, Billing Record Finder (BRF) 510, Time Server (TS) 512, Logger (LOG) 514, Registry (REG) 520, Process Manager (PM) 522, Loader (LDR) 530 and the Collector (COL) 540. The Tserv Management Console (TMC) 570 also accesses the ORB 580 to obtain access to the aforementioned applications and couples with the Oracle SQL DB 550 to obtain information. Finally, the Network Interface Controller (NIC) 560 interfaces to the Collecter (COL) 540. The detail of each of these modules and their interrelationship is provided below in accordance with a preferred embodiment.

Figure 6:
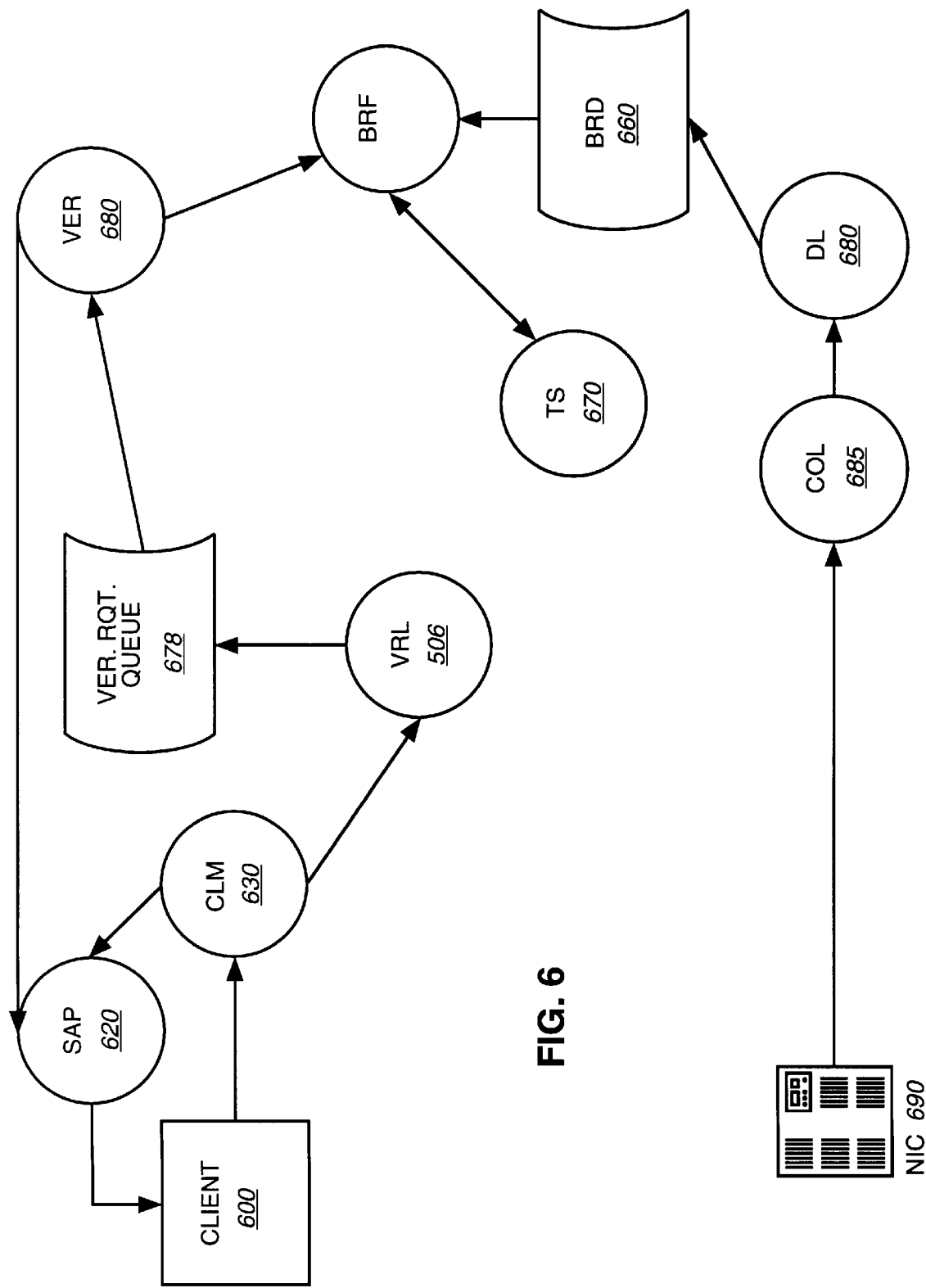
FIG. 6 illustrates the logical flow of activities and interaction between the processes that are presented in FIG. 5 in accordance with a preferred embodiment.

FIG. 6 illustrates the logical flow of activities and interaction between the processes that are presented in FIG. 5 in accordance with a preferred embodiment. A client 600 requests the client manager 630 to initiate a test. The client manager 630 in turn submits configuration and control information utilizing the object request broker to the subscribe and publish application 620, and verification requests, records and searches to the verification request loader 675. The subscribe and publish application 620 returns verification results, billing records and error messages 610 to the client 600. The verification request loader 675 forwards its requests to the verification request queue 678 to ultimately be transmitted to the verification application 640 which verifies results, matches billing records and identifies errors 622 and transmits the request to the subscribe and publish application 622 or submits search requests to the billing record finder application 650.

The billing record finder 650 submits time requests to the time server 670 to obtain device time, or receives matched billing records from the billing record database 660. The Network Interface Controller (NIC) 690 transmits a billing data stream to the collector 685 which forwards a set of queued records to the database loader 680. The database loader 680 is responsible for storing records in the billing record database 660. The detailed processing and interrelationship of each of these applications is discussed below.

TEAMS SERVER ARCHITECTURE

This document contains the design for the Test Execution Automation Management System (TEAMS) Server (TServ).

TServ 1.0 provides two high-level functions:

1. Collection and loading of billing and Switch Event Records (SER).
2. Verification of switch and Intelligent Services Network test cases.

In addition to providing these functions, a TServ Management Console (TMC) serves as a means to manage TServ. TServ collects billing records that are generated by switches and other devices. These billing records are parsed and loaded into a RDBMS. The billing records is received over a TCP/IP interface from the Network Information Concentrator (NIC). These records are parsed and filtered according to dynamic parsing and filtering rules. The selected records are then stored in a store-forward file. The database load process reads these records and loads them into the RDBMS. The store-forward files are deleted as the records are loaded into the RDBMS. Certain fields from the billing record are used as columns in the billing record table. These columns are used to narrow the search for billing records.

These columns include time point 1, time point 7, OTG, TTG etc. A process to purge old billing records executes periodically and deletes any rows that are too old and are not being saved for certification purposes. The definition of "too old" is configurable.

The verification server receives requests from clients to verify a test case. Each message from a client is stored in a verification queue table located in the RDBMS. The verification server uses this table to track the progress of each request. Once a message is received, an acknowledgment is sent back to the client. Once the message is processed (e.g. a test case is verified) a message is sent back to the client. At any time, a client can query the verification queue table to determine the status of a request.

Borrowing a concept used in the Windows NT operating system, a preferred embodiment utilizes a "registry." The registry contains all Tserv 1.0 configurable parameters as well as system counters. Configurable parameters include TCP/IP addresses, file locations and database names. System counters include counts of messages received from the NIC, number of client messages received and the number of billing records loaded. The registry is stored in the RDBMS. This simplifies processing for the operator console client access.

In order to make the system flexible in terms of billing specification changes, a parser object is utilized. This parser object is data driven and not dependent upon any one billing specification. The parsing rules are stored in the RDBMS. Upon initialization, the parser reads the specification. Whenever the specification changes, the parser is notified to re-read those changes. No system downtime is needed to change or add a billing specification.

Since different types of tests are run in the NSIL lab each day, a dynamic filter is needed. This filter is used to filter unwanted billing records received from the NIC. The user is able to adjust the filter anytime using the TServ 1.0 management console (TMC).

Server

A preferred embodiment utilizes DEC hardware and Digital UNIX version 3.2 g or higher with an Oracle Relational Data Base Management System (RDBMS) with an Oracle parallel server and Oracle parallel query and a Digital Object Request Broker (ORB) to implement the server environment. Each client is a Windows NT Workstation with a Digital Object Request Broker, Runtime License; Oracle SQL/NET and Object DataBase Control (ODBC) drivers for querying the server. A Client Manager (CLM) manages the interface between the clients and the server.

Client Manager (CLM)

The Client Manager provides the interface between the various client platforms and a TEAMS server in accordance with a preferred embodiment. The TEAMS server uses CORBA as its inter-process communication mechanism. It was determined early in the design that communications between the TEAMS server and the clients would be via TCP/IP sockets and that all commands and responses between the two should be in plain ASCII format for easy debugging.

General Design

Each client requests two sessions with the CLM. The first of these is for the client to send commands and to receive responses. It is called the "Command Session". All command-response transactions across this session are synchronous, that is, the command must receive its expected response before it can continue with another command.

The second of the two sessions is also a socket. This socket, called the "Subscribe-and-Publish" session, flows in one direction only—from TEAMS to the client. All asynchronous data that may be of interest to a client is made available on this session, for example verification request completion, logon/logoff of other users, system errors, broadcast messages and the like. The command set associated with the CLM is defined later in this document.

Session Management

Sessions are managed according to the following algorithm:
Program Initialization
Create socket
bind( ) socket to socket name (so that clients can find it)
listen( ) for connect requests
accept ( ) the connect request
make a new Session object with the new session
put the session list into list of sessions
create a new thread for the session and begin to process commands
go to listen for more connections

Public Access

Interface 1—The TCP/IP Sockets interface to the Client Interface Manager. These commands are transmitted in ASCII. They can either be sent from the command line prompt offered by the CLM process, or can be sent from a PC-based client via Winsock. Commands are case insensitive.

Each of these commands has an associated privilege, each user is assigned a privilege level, and each command is checked against the user's privilege level to make sure that she is authorized to execute the command.

Command—arguments—description

1) Control the Registry
GET REG <key> Display data associated with this registry key
SET REG <key> <data> Set registry item
ADD REG <key> <data> Add item to the registry
DEL REG <key> Delete item from registry
GETRANGE REG <key> <key> Get range of registry values
DUMP REG Dump registry to screen
DUMP REG <tofile> Dump registry to file
LOAD REG <fromfile> Load reg from file
LOCK REG <key> <pid> Lock registry item to <pid>
UNLOCK REG <key> Unlock registry item
CLEAR REG Wipe out registry
2) Control the Log file
LOG <string> Write string to log
GET LOG TAIL <lines> Tail the log file
GET LOG HEAD <lines> Show first lines of log file
GET LOG TIME <time> <time> Show log between time points
3) Initiate and Control Verification Requests
GET VREQ ID Get a new verification request ID
GET VREQ STAT ID=<id> Get status of a verification request
GET VREQ QUE Show info about the verification queue
PUT VREQ ID=<int> TESTCASE=<testcase>
PUT VREQ ID=<int> MAXRECS=<int>
PUT VREQ ID=<int> TIME=(YMDHMS,YMDHMS)
PUT VREQ ID=<int> TEMPLATE=<template#> OVERRIDE=<string>
PUT VREQ ID=<int> TEMPLATE=<pseudoSQL> OVERRIDE=<string>
EXEC VREQ ID=<int>
4) Search for Billing Records
GET BILLREC <maxrows> <equation> <parmfilename> <timeout>
5) Miscellaneous
GET TIME Show system time
PING <process_name> Ping a process to see if it is up
SESSIONS Display current CLMD sessions
LOGIN <user> <password> Log in to the system
EXIT logoff and exit
6) Control the Subscribe and Publish Channels
CONFIG FILTER USER=<string>
CONFIG FILTER USER=(string,string,string)
CONFIG FILTER MESSAGE=ALL
CONFIG FILTER PROCESS=(string,string,string)
CONFIG FILTER CLEAR
PUT SAP "message"
Interface 2—CORBA Methods for the Teams Console to Use

```
interface clm
{
// getErr gets errors associated with a verification request
struct error {
attribute long sessionID; // session ID of client
attribute long requestID; // request number
attribute long errorCode; // number of error
typedef sequence<string>tokenVals; //replacement values
};
error getErr( );
```

-continued

```
// sessionData is provides information about the sessions that are
currently being controlled by the CLM.
struct sessionData
{
string name;
string userID;
string curCmd;
string idleTime; // hhmmss
};
sequence<sessionData> getSessionInfo( );
};
```

Inputs/Outputs

Any inputs (ex.: files, tables, etc.) or outputs (ex. files, reports, etc.) go here. Includes formats.

Subscribe and Publish (SAP)

The SAP is used to provide asynchronous communication to the execution clients (e.g. AOSM and ITP).

SAP—General Design

The SAP process is a "news clearing house" for the TEAMS system. It addresses the following requirements:

1) Need for TEAMS processes to return request results to the requesting client minutes or hours after the request was first queued. An example of this kind of behavior is the Verification Server. It receives a clients' verification request via the CLM, and at some undetermined later time, returns the results of the verification request to the client via the SAP.
2) Need to be able to broadcast a message to all connected clients. If a client is configured to receive a certain kind of message, the client receives it. A good candidate for this kind of broadcast message is a "login/logoff" message, one that informs all the clients that so-and-so is now on the system. Certain error messages are candidates for broadcasting as well.
3) Need to communicate with clients via TCP/IP. In the case of the SAP, messages are sent via the UDP datagram protocol.
4) Need for clients to communicate with other clients. While not specifically a requirement, this is a capability that is inherent in the SAP.
5) Need to filter messages to clients. Some clients may want to receive all possible messages, some other clients may want just a subset of the available messages.

In addition to the obvious capability of returning request results to the requesting client, a number of future client applications can be made possible by the SAP. A scrolling window on a manager's PC can give him some idea of the state of testing laboratory-wide. TEAMS system shutdown-pending messages can be broadcast to all users. Daily plans for use of the system can be broadcast and displayed. Heartbeat messages can be broadcast from the TEAMS server. All of those types of client applications can help everyone be aware of the status of the testing effort and improve efficiency of the testing laboratory.

Though the SAP is built on a connection-less datagram protocol, the concept of a session is still maintained, as the SAP must maintain state information about the clients that are subscribed to it.

Public Access

There are two public inputs into the SAP. The first public access is a UDP socket, defined by the IP number (or DNS name) and well-known port number of the machine on which the SAP resides. Messages sent to this socket are re-sent to all sockets registered to receive messages.

Not all messages sent to the SAP input socket are intended for re-distribution. Out-of-band control messages (such as "subscribe", "unsubscribe", and "filter") allow a client to control the state of her session.

The second input is the CORBA version of the first. A CORBA method must be declared public for any CORBA-enabled program to access the SAP, send it a message, and have that message sent over the "publish" mechanism. The message formats are identical with those of the SAP input socket. Details of the message processing in accordance with a preferred embodiment are presented in the appendix provided at the end of the patent application. Messages to be output from the SAP are human-readable and are encoded in such a way as to make parsing them easy for automatic processing on the client side.

Inputs/Outputs

Inputs
  Message template file.
  Messages received by the SAP for re-distribution are generally in the format of:
  1) integer message code
  2) zero to many values.
  Based on the message code, a record is retrieved from the message template file. The message template record is an ASCII text message with symbols that are replaced by the values included in the input message. Once this symbol substitution takes place, the human-readable message is sent to the clients registered to receive it.
Outputs
  Registry Usage
  The following is a list of the registry items used by the SAP:
Item Name
Data Type
Description
\SAP\SESSIONS\AUTO_START_SESSION\name
\SAP\SESSION\AUTOSTART_SESSION\ip
\SAP\SESSION\AUTOSTART_SESSION\port
\SAP\SESSIONS\user_name

Verification Request Loader (VRL)

The Verification Request Loader (VRL) services requests for verification of test cases by placing the requests on the verification request queue and providing unique request numbers to be used for future reference by clients.

General Design

This service resides on an Object Bus and clients may access it through the VerReq class. The VerReq class inherits from the CORBA, Process Management and CLog class.

The logic flows as presented below.

Initialize
Create dispatch loop
While Not Exit
If client request
Switch client request
Case getRequestNumber;
increment request number
return request number to client
Case executeVerification
populate a row of request queue
set status in the row of request queue to pending
if no request number provided, then increment request number

```
return request number
Case executeRecordSearch
populate a row of request queue
set status and request type to pending and record search
respectively
return
Case abortVerification
set status of record in request queue to "abort"
return
default
check for process management requests
end switch
end if
If log request
call log_it
end while
```

Public Access

Class VerReq is a CORBA class which provides the CLM with a means to build a request for a billing record search or a verification request.

```
//
// The verReq interface defines a public interface to allow a client
// to place a verification request on the request queue.
//
interface CVerReq
{
// creates a request to verify a testcase
exception NotFound{ };
short executeVerification(in long requestID)
raises (NotFound);
// gets a unique verification request id
long getRequestID( );
// requests a record search
short executeRecordSearch (in long requestID);
// allows user to abort a verification
short abortVerification (in long requestID);
// data below this point
attribute string tc_section;
attribute long tc_number;
readonly attribute long requestID;
attribute long sessionID; // session ID of client
attribute string CertID;
typedef sequence<CertID> CertIDs;
// search info
attribute string searchCriteria;
struct searchInf {
// the following two items allow a template to be associated with a
billing record
long template_id;
long recordID; // ID in the billing record database
// There are a number of override variables in the
// templates for search and compare. The characters are
// not known at testcase creation time and are overridden
// at the time of the verification request.
// example: [0]{7}29@3
string overrideVars; // overrides the following
// %, wildcard character
// {, 1st char of originating switch
// }, last char of originating switch
// [, 1st char of terminating switch
// ], last char of originating switch
// @, AOSM platform used (0–9)
// $, bridging switch
string sqlStr; // can be used to override template search
};
typedef sequence<searchInf> searchInfo;
};
```

Inputs/Outputs

Inputs

All inputs are handled via the VerReq class listed in the Public Access section.

Outputs

The primary output of the system is the Verification Request queue defined in the database description.

Registry Usage

The following is a list of the registry items used by the VerReq:

Verifier (VER)

| Item Name | Data Type | Description |
|---|---|---|
| \SQL_retries | integer | The number of times a SQL command retried |
| \SQL_delay | integer | Time between a retry. |
| \VRL\next_request | integer | Next verification request ID. |
| \VRL\COUNT\num_ver_req | integer | Counts of verification requests |
| \VRL\COUNT\num_bill_searches | integer | Counts billing record searches |
| \VRL\COUNT\misc_req | integer | Number of requests other than verification requests & billing searches. |
| \VRL\COUNT\errored_req | integer | Requests with errors |
| \VRL\COUNT\good_req | integer | Requests successfully queued |

The Verifier reads requests from the verification request queue and based on the request type, either verifies the test case or initiates a request to match billing records from the record finder.

General Design

Verification requests require proper template(s), request (s) to the Billing Record Finder and comparisons of the record with the template information. The verification results are returned to the client via a CORBA class.

The following sections describe the major functions that the verifier must perform and how they are performed.

Get Next Request

When a verification thread is idle it checks a global variable to determine if there are pending requests. If there are requests, then it utilizes a SQL search to find the oldest, highest priority message with a status of pending. The verifier reads the message and sets the status to processing.

Template Acquisition

The verification thread uses the testcase section, testcase number, resource type and resource id as inputs to search for template(s) for the test case.

Locating templates is complicated by the following issues:

templates for multiple platforms templates for multiple loads multiple versions of templates for the same platform and the same load Also, there is not a one to one correspondence between a template and a platform/load. This happens when a new software load is released, but the existing template does not have to change for that release, or when the same template is used for multiple templates.

When there isn't a platform match, the platform ranking table is used to find next platform. Likewise, if a software load is not located, then the software load ranking table is used to find the next load to try. If no matches are found, then the CLM is notified that no matching template could be found.

The following logic describes the basic algorithm for finding a template:

```
found=false
// note: these two operations are done only once
get platform ranking
get software load ranking
select templates based on:
testcase section # // input
testcase # // input
resource type // input—sometimes is not applicable because
template has 'any' in this field
resource id // input
while NOT found
if get next highest rank platform is found
if there are matches found
while NOT found
if get next highest software load is found
if there are matches found
template id=the highest numbered version
found=TRUE
end if
else
// no templates found for the platform
break;
end if
end while
end if
else
error—template could not be found
break
end if
end while
```

Compare Fields

Comparison is accomplished by comparing the fields in the template with the fields in the recObj. The comparison operator is described in the template. Both the template and the recObj classes use lists of classes to represent individual fields that are used for the actual comparison.

Reporting

Reporting verification results, billing record search results, and error conditions are accomplished by setting the results up in a structure and sending them to the SAP via the CORBA interface. Verification results include the session id, test case section and number and, for each template, template number and version, a copy of the record object and the selection criteria. Also, for each template, all failed fields are stored with the field name, expected and actual values, compare operator, failure ID and problem code.

Billing record search results include the session id, request id and matching records. The records include both a stringified copy of the record, as well as, a pointer to the record in the database.

Error conditions are reported to the CLM in a structure format including the session id, request id, error code and token values. The token values are used in the CLM for string replacement into the main text of the message.

Thread Management

There is a management thread that is used for maintaining variables and CORBA communication. Since the Object-Broker is single threaded, only one thread can use the CORBA interface. In the verifier, the management thread contains the CORBA information.

The basic flow of the management thread is:
Initialize

```
While not stop
If requests for CORBA calls
make a request and return information
end if
If CORBA inputs
service request—these are base functions such as
   reinitialize, stop,
dump_variables
end if
sleep
end while
```

Certification Loading

When a testcase that is marked for certification passes verification, the pertinent data must be stored and saved with the certification as a whole. This includes archival information. A copy of the record from the verification request queue is saved along with pointers to the record and template. Also, any failed fields (with known problem codes) are saved.

Billing Record Searches

Matching billing records to identify a template is accomplished by forwarding a request to the Billing Record Finder, receiving the response and returning the record(s) to the client via the CLM. Verify assigns a request id to each request so they can be matched with responses.

Public Access

Verification requests and billing record searches are requested via the verification request queue. No other services are provided by this server.

Data

The verification request queue.

Methods

There are no public methods that the verifier serves. The verifier accesses methods which are served by the CLM, Logger and Registry.

Inputs/Outputs

Inputs
  The verification request queue is used to make requests. The verifier reads the oldest priority record that has a status of pending and updates the status of the record to processing.
Database Tables
  The database contains the following tables that are utilized in accordance with a preferred embodiment.
verification_request_queue
device_load_view
template_view
Outputs
  The CLM interface defines the outputs for verification results and billing record search results, as well as error conditions for processing related to getting the above results.
Updated Database Tables
  The database contains the following tables that are updated in accordance with a preferred embodiment.
verification_request_queue
vreq_x_billing_x_template
verification_data
verify_x_cert
cert_x_archive
billing_recs_archive_keys
billing_recs_archived vreq_x_billing_x_template_hist
verification_history
verification_data_history
Registry Usage The following is a list of the registry items used by the verifier.

| Item Name | Data Type | Description |
|---|---|---|
| \VER\MaxConcurVer | integer | Maximum number of concurrent verifications. |
| \SQL_retries | integer | The unmber of times a SQL command is retried |
| \SQL_delay | integer | Time between a retry. |
| \VER\sleep_time | integer | Time to sleep on CORBA loop |
| \VER\COUNT\ver_requests | integer | Verification requests |
| \VER\COUNT\search_requests | integer | Billing record searches |
| \VER\COUNT\passed_ver | integer | Passing verifications |
| \VER\COUNT\failed_ver | integer | Failing verifications |
| \VER\COUNT\passed_search | integer | Billing Searches Located |
| \VER\COUNT\failed_search | integer | Billing Searches Not Located |
| \VER\COUNT\total_request | integer | Total requests |
| \VER\COUNT\errored_request | integer | Requests which had errors |

Billing Record Finder (BRF)

The Billing Record Finder (BRF) determines whether billing records meet a user supplied selection criteria, and returns a list of selected records that will not exceed a maximum number specified.
General Design
   NOTE: All exceptions raised by BRF contain a field for the request id.
Logic Flow is as Follows:
   Initialize execution and retrieve registry variables.
   Execute main processing loop waiting on events:
CASE event Find Billing Record:
Communicate with LDR to determine if records for this time and device have been loaded into the database, If not, then raise a NotReady exception.
Retrieve record id from database for indicated record type.
Retrieve list of key fields for the specified record type.
Parse selection criteria for key fields and build WHERE clause for dynamic query.
If syntax error encountered
Raise InvalidSelection exception
Exit returning empty list and error code
If no keys fields are selected
Raise SelectAllInvalid exception indicating that all records is searched and request is not be processed (NOTE: The specification of a key field does not necessarily result in a valid search. If the expression as a whole would evaluate to all records being searched, then any key field involved is ignored and the search is rejected for performance reasons.
For example, the expression (Key_Field== value1|||| raw_data_field== value2) would result in all records being searched and hence the request is rejected.).
Exit returning empty list and error code
   Formulate appropriate SQL query from key fields
Pass SQL query and tablename to record retrieval routine to retrieve all records matching key field selection criteria
If no records found
Raise NotFound exception
Exit returning empty list and error code
If maximum number of records desired !=0
While not end of records and record count <=maximum number desired
call filter routine passing entire selection criteria and record
   if filter return == TRUE
add record to record list
increment record counter
Else
While not end of records
call filter routine passing entire selection criteria and record
   if filter return ==TRUE add record to record list
If maximum records desired !=0
If record count ==maximum number desired and not end of records
Raise TooManyRecs exception
Exit returning selected record list and error code
Else
Exit returning selected record list to caller
Else
Exit returning selected record list to caller
Case Event of Process Request:
   Service event request. See Process Manager description above for a description.
Public Access
   A. FindRecord
   Given a selection criteria, FindRecord reads the record database matching records against the criteria given. Records are selected up to the maximum given. Errors are returned as appropriate.
CORBA::Long CBillRecFndr::FindRecord(
   CORBA::String,
   CORBA::Long,
   CORBA::Long,
   CORBA::String,
   CORBA::String,
   CORBA::String,
   CORBA::Sequence,
   CORBA::Environment)
FindRecord takes the following as input parameters:
   CORBA string representing the selection criteria the record must meet
   CORBA long (integer) maximum number of records to return. If==0, then all selected records is returned
   CORBA long (integer) request id
   CORBA string representing the record type
   CORBA string representing the end timepoint for the search
   CORBA string representing the device id
Find Record returns the following as output parameters:
   CORBA sequence (array) of selected record ids
   CORBA environment structure containing success or error information
Find Record returns the following value from the FindRecord method:
   CORBA long (integer) number of records selected, zero on error.
Registry Usage
   The following is a list of the registry items used by the BRF:
   DB/SelectTablename is a string variable which specifies the tablename in which data records are stored.
   BRF/LogLevel is an integer variable that specifies the log message level that is sent to the logger. Default is L_SEV.
   BRF/In is an integer variable that specifies the number of requests received.
   BRF/Out is an integer variable that specifies the number of requests processed.
   BRF/RequestErrors is an integer variable that specifies the number of requests that ended in an error.
   BRF/TimeRequests is an integer variable that specifies the number of requests made to the time server.

Time Server (TS)

The Time Server (TS) is responsible for storing time points for various devices, clients, and servers. It also provides a mechanism to determine time differentials between devices and receive time updates for a device.

General Design

NOTE: All date/time string are in TEAMS standard format of "YYYYMMDDHHMMSS".

Logic flow is as follows:
Case request one of:
GetTime:
  Using the device id passed and a time reference, query the database for the indicated device record.
  Extract the device and server time.
  Compute time difference between time reference and server time.
  Add difference to device time.
  Return relative device time.
GetTimeDifference:
  Using the device id passed and time reference, query the database for the indicated device record.
  Extract the device time.
  Calculate the difference between time reference given and device time.
  Return time difference.
UpdateTime:
  Get server time.
  Create a device record consisting of device id, device time, and server time.
  Post to database.
QueryMMI:
  Establish socket connection with MMI server.
  Initiate request for device id to MMI.
  MMI returns the time for the device and server relative time in a string format of "MM/DD/YYYY HH:MM:SS, MM/DD/YY HH:MM:SS" where the first is the device time and the second is the server time.

Public Access
Data
  None.
Methods
  The following public methods are supported:
A. GetTime
  Given a device id and a time reference, GetTime retrieves the specified record, extracts the device time, computes the device time relative to time reference, and returns it to the caller.
  Errors are returned as appropriate.
  CORBA::Long Device::GetTime(CORBA::String,
  CORBA::String,
  CORBA::String, CORBA::Environment)
  GetTime takes the following as input parameters:
  CORBA string representing the device record to be retrieved
  CORBA string representing the date/time reference
  GetTime returns the following as output parameter:
  CORBA string representing the date/time on the device
  CORBA environment structure containing success or error information. GetTime returns the following value from the GetTime method: CORBA long error code, 0 on success.
B. GetTimeDifference
  Given a device id and a local time reference, GetTimeDifference retrieves the specified record, extracts the device time, computes the time difference, and returns it to the caller. Errors are returned as appropriate.
  CORBA::Long Device::GetTimeDifference
  (CORBA::String,
  CORBA::String,
  CORBA::String, CORBA::Environment)
  GetTimeDifference takes the following as input parameters:
  CORBA string representing the device id record to be retrieved
  CORBA string representing the local time reference
  GetTimeDifference returns the following as output parameter:
  CORBA string representing the time difference between device and local time CORBA environment structure containing success or error information GetTimeDifference returns the following value from the GetTimeDifference method:
  CORBA long error code, 0 on success.
C. UpdateTime
  Given a device id and a date/time reference, UpdateTime creates the specified record adding the server time field, and posts the record to the database. Errors are returned as appropriate.
  CORBA::Long Device::UpdateTime(CORBA::String,
  CORBA::String,
  CORBA::Environment)
  UpdateTime takes the following as input parameters:
  CORBA string representing the device id record to be retrieved
  CORBA string representing the device time
  UpdateTime returns the following as output parameter:
  CORBA environment structure containing success or error information
  UpdateTime returns the following value from the UpdateTime method: CORBA long error code, 0 on success.

Collector (COL)

The Collector (COL) receives data blocks from the Network Information Concentrator (NIC), parses the records from the block, sets up the record in database format, and forwards the records on to the Store Forward (STF) application for database storage.

General Design
  Logic flow is as follows:
  Initialize program. Reads Registry variables and initializes record filter.
  Retrieve number of NIC connections desired from Registry.
  For each connection:
  Retrieve NIC client name (i.e. T2000, ICIS, FMS, etc.) from Registry.
  Retrieve NIC IP address and port number from Registry for NIC client name specified.
  For each connection Establish TCP/IP connection with NIC.
  Register connection with and receive confirmation from NIC.
  While (not instructed to quit)
  Case:
  Check each NIC client for data to read.
  If data to read Read 2 bytes of data from NIC to retrieve block byte length n.
  Read n bytes of data from NIC.
  Set data block pointer==NIC common header length-2.
  Parse NIC block.
  Retrieve number of data records in block.
  Set up filter object.
  While (still have records to process) Retrieve a record.

If (record meets filter criteria)
If (record is SER)
If (time change (type 1, 2, 3, 9))
Retrieve device id from client header
Execute update time request to time server
Write message to STF to have record stored.
ORB Event:
Case ORB Event of:
ProcessStop:
Set while loop to terminate.
DumpCurrentState:
Gather information on variables and counters to return to caller.
Reinitialize:
Reread Registry for new variable values.
Drop TCP/IP connection.
Post registry variable values to Registry.
Cleanup and exit.
Public Access
Data
No public data members.
Methods
No public data methods.

Loader (LDR)

The main function of the Loader is to get records from the Store Forward and load them into the Oracle database.

General Design

The Loader continually checks for files in the Store Forward. If the Loader finds a record, then it obtains the record from the Store Forward. After getting the record from the Store Forward the Loader loads the record into the Oracle database.

Loader program flow:

```
While ( A_OK ) {
If ( Files_in_Stf > 0 ) {
RetrieveRec( Stf_Record record )
num_rec_in++
loadRecord( Stf_Record record )
num_recs_out++
}
}
Public Access
Data
int status
bool LD_OK
Methods
int loadRecord( Stf_Record record )
```

Logger (LOG)

The logger is a part of the Teams facilities. The logger provides a means for processes to output status reports. There are 5 levels of logging that a process can use. These levels are defined as follows:

enum error_levels {L_DEB, L_INF, L_WAR, L_SEV, L_FAT}. L_DEB=debug, L_INF=informational, L_WAR=warning, L_SEV=severe, L_FAT=fatal.

Each process starts with a default level as defined in the Registry.

General Design

```
Logger program flow
While (Up_and_Running) {
Read Registry for initialization
Get message from client
Check size of log file
if (current file >= MAXFILESIZE) {
Create roll over log file.
move old log file to new roll over log file
create new current log file
file size counter = 0
write message to new current log file increment file size counter
}
else {
write message to current log file increment file size counter
}
}
Public Access
Data
None
Private:
fstream output_log;
fstream log_size;
RWCString logfile;
long file_size;
Methods
WriteLogMessage( in string hostname
, in string process_name
, in long process_id
, in long line_num
, in string message
, in short level )
```

Inputs/Outputs

Inputs

On startup the logger reads two variables from the Registry to determine the size of the log file. MaxLogLines determine how many lines the log file may contain. LogFileSize is the size of the current log file. LogFileSize is incremented each time a process writes to the log file. On shutdown the Logger writes to the Registry to update the LogFileSize variable.

Outputs

The logger writes all output to a file. The location and name of the file is stored in the Registry. This file contains all the output from processes using the logger. When the log file reaches a size as defined in the Registry, the logger closes the log file and moves the file to a new name with the form of Teams.YYYY_MM_DD_HH:MM:SS.log. The logger then commences writing log messages to the new log file. The logger continues to write to the Registry to assist in keeping track of the size of the log file.

Registry Usage

The registry utilizes the following entries for the following purposes.

LOG/LogDir—Directory of the log files.
LOG/FileName—Name of the log file.
LOG/MaxLogLines—The maximum number of lines in a log file.
LOG/LogFileSize—Size of the current log file when logger was last utilized.

Log Display Server (LDS)

The Log Display Server (LDS) retrieves segments of the log file based on limited selection criteria passed.

General Design

Logic flow is as follows:
Get a list of available log files.
Read the output database tablename from the Registry.
For each log file and while record counter <=maximum lines to return Check last modification date to determine if it is older than start date.
If not, then while not end of file
Read a record
Check record against the following criteria:
Field 1 (Date) >=StartDate and <=EndDate
Field 2 (Time) >=StartTime and <=EndTime
Field 9 (Debug Level) >=DubegLevelGiven
If provided (i.e. not empty string)
Field 5 (Program Name)==ProgramNameGiven
Field 8 (Error Code)==ErrorCodeGiven
If match
Write record to database table
Increment record counter
If record counter==maximum lines to return and still files to process
Determine if lines returned on achieving maximum should be from head or tail of log
If head
Delete current records from database
Work backwards from most current file until maximum lines achieved
Else (tail)
Do nothing, records needed are already in database
Raise LogTooMany exception
Return database tablename to caller.
Cleanup and exit.
Public Access
  A. GetLogData
CORBA::String CLogRetrieve::GetLogData
  (CORBA::String startDate,
CORBA::String startTime,
CORBA::String stopDate,
CORBA::String stopTime,
CORBA::Long level,
CORBA::String progName,
CORBA::String errCode,
CORBA::Environment ev)
  GetLogData takes the following as input parameters:
CORBA string representing the start date from which to retrieve log records
CORBA string representing the start time from which to retrieve log records
CORBA string representing the stop date from which to retrieve log records
CORBA string representing the stop time from which to retrieve log records
CORBA long (integer) debug level to return
CORBA string representing the program name desired for log records
CORBA string representing the specific error code desired for log records
CORBA environment structure for exception handling
  GetLogData returns the following value from the Get-LogData method:
CORBA string representing the database table name where the log records can be retrieved.

Inputs/Outputs

Inputs
  Log files as found in the log file location specified by the registry variable LogFileLoc. All log files start with the characters "teams."
Outputs
  Temporary database file containing the selected log records, that are deleted by requester upon completion of a request.

Registry (REG)

General Design
  The Registry manages data that is stored in a keyword-value tree-structured organization. It is based on the design of the Windows NT Registry. Registries serve as a repository for configuration values, counters, flags, license data, debug information, file names, and any such low-volume data that must be easy to access by any process on the system.
  A good way to understand the TEAMS Registry is to look at the Windows NT Registry.
  On the TEAMS server, the Registry is implemented as a server process. Requests for service against the Registry server are handled by public methods advertised on the CORBA object bus.
Public Access
  The Registry is implemented as a CORBA process and is accessed through the methods defined in the following IDL.

```
interface Reg
{
struct RegVal
{
string name;
integer itemType // string, float, int, etc
string value;
integer length;
};
void Load(in string filename);
void Dump( in string filename );
// note: wildcard values are acceptable for the
// following...
sequence<RegVar> getValue( in string Key );
void AddKey( in string Key );
void DeleteKey( in string Key );
void LockKey( in string Key );
void UnlockKey( in string Key );
void AddValue( in string Key, in RegVal );
void IncrementValue( in string Key );
void ModifyValue( in string Key, in RegVal )
void DeleteValue( in string Key, in RegVal );
};
```

Inputs/Outputs

Any inputs (ex.: files, tables, etc.) or outputs (ex. files, reports, etc.) go here. Includes formats.
Inputs
  Registry can be initialized by reading an ASCII file of keys and values. The format of the file is
  1) Fully qualified key
  2) value name
  3) value type
  4) value
  Example:
  \SAP\SESSION\NAME JOEUSER S "Raul J. Spiffarino"
  \SAP\SESSION\IP IP S "225.78.99.34" and so forth.
Outputs
  The values in the Registry can be dumped to a file in the same format as the INPUT file.

Process Manager (PM)

The Process Manager (PM) is a collection of scripts and classes that allow a user to query the status of the system and processes as well as modify process behavior.
General Design
  System Query:
  Statistics on CPU utilization, disk utilization, and total uptime of the system are desired. Script is executed as follows:

Call appropriate system calls to retrieve system statistics.
If no error
Call obbseta to set the return values for the console.
Clean up and exit with successful status of 0.
Else
Exit with error code 10700.

The ProcessMgr class provides the ability for the console and processes to stop, start, reinitialize, and interrogate status. See the following Public Access section for further information.

Public Access
Data
No public data members.
Methods
The following public methods are supported:

A. Start

The Start method issues the appropriate system call to start the named program.
CORBA::Long ProcessMgr::Start(CORBA::String, CORBA::Sequence<ProgStruct>, CORBA::Environment)
Start takes the following as input parameters:
CORBA string representing the program name to be executed. If empty string, start all programs is assumed.
Start returns the following as output parameters:
CORBA sequence (array) of ProgStruct structures containing the process name, process id, and nodename CORBA environment structure containing success or error information
Start returns the following value from the Start method:
CORBA long (integer) status, zero if successful.

B. Stop

The Stop method issues the appropriate system call to stop the named program.
CORBA::Long ProcessMgr::Stop( CORBA::String, CORBA::Environment)
Stop takes the following as input parameters:
CORBA string representing the program name to be stopped. If empty string,
stop all programs is assumed.
Stop returns the following as output parameter:
CORBA environment structure containing success or error information
Stop returns the following value from the Stop method:
CORBA long (integer) status, zero if successful.

C. ProcessInit

The ProcessInit method is utilized by the executing program upon startup to perform tasks that are common to all programs, regardless of task. It is responsible for pulling the Registry variables, environment variables, and other global information into the process as well as output of startup messaging to the logger.
CORBA::Long ProcessMgr::ProcessInit (CORBA::Environment)
ProcessInit returns the following as output parameter:
CORBA environment structure containing success or error information
ProcessInit returns the following value from the ProcessInit method:
CORBA long (integer) status, zero if successful.

D. ProcessClose

The ProcessClose method notifies a process to discontinue execution. It is utilized by the executing program upon receipt to perform tasks that are common to all programs for cleanup and graceful exit. It is responsible for posting changed Registry variables, environment variables, and other global information out of the process as well as output of shutdown messaging to the logger.
CORBA::Long ProcessMgr::ProcessClose (CORBA::Environment) ProcessClose returns the following as output parameter: CORBA environment structure containing success or error information ProcessClose returns the following value from the ProcessClose method: CORBA long (integer) status, zero if successful.

E. Reinitialize

The Reinitialize method notifies a process to reinitialize a value to its initial state.
CORBA::Long ProcessMgr::Reinitialize (CORBA::Environment) Reinitialize returns the following as output parameter:
CORBA environment structure containing success or error information
Reinitialize returns the following value from the Reinitialize method:
CORBA long (integer) status, zero if successful.

F. DumpCurrentState

The DumpCurrentState method notifies a process to report information on its current state.
CORBA::Long ProcessMgr::DumpCurrentState (CORBA::Long, CORBA::Long, CORBA::Long, CORBA::Long, CORBA::Long, CORBA::String, CORBA::Environment)
DumpCurrentState returns the following as output parameters:
CORBA long (integer) representing the process id
CORBA long (integer) representing the current state (suspended, running) of the process
CORBA long (integer) representing the current debug level of the process
CORBA long (integer) representing the number of messages received
CORBA long (integer) representing the number of messages sent
CORBA string representing the nodename of the process
CORBA environment structure containing success or error information
DumpCurrentState returns the following value from the DumpCurrentState method:
CORBA long (integer) status, zero if successful.

G. GetSystemStatistics

GetSystemStatistics is the UNIX script that returns CPU utilization, disk utilization, and system uptime to the caller.
CORBA::Long ProcessMgr::GetSystemStatistics (CORBA::Long, CORBA::String, CORBA::Long)
GetSystemStatistics returns the following as output parameters:
CORBA long (integer) representing the CPU utilization percentage
CORBA string representing the length of time the system has been available in DDDHHMMSS format
CORBA long (integer) representing the disk utilization percentage GetSystemStatistics returns the following value from the GetSystemStatistics method:
CORBA long (integer) status, zero if successful.

H. Increment

The Increment method allows a process to increment input or output counters for the process.
CORBA::Long ProcessMgr::Increment(CORBA::Char *counter_name, CORBA::Environment)
Increment takes the following as input parameter:
CORBA string pointer representing the counter name to be incremented.

Increment returns the following as output parameters:
CORBA environment structure containing success or error information
Increment returns the following value from the Increment method:
CORBA long (integer) status, zero if successful.

Inputs/Outputs

Inputs
All user inputs are via menu options and dialog boxes.
The TMC interfaces with the ORB at startup to accept:
list of server processes and associated data (proc IDs, state)
The TMC interfaces with the server OS (via a script executed by the ORB) to accept:
list of nodes and associated data (node id, uptime, disk usage, CPU usage)
The TMC interfaces with the server Base Process objects to accept:
list of process specific registry variables and associated values
process status (state, message counts, logging level)
The TMC interfaces with the Time Server object to accept:
current server time
The TMC interfaces with the CLM object to accept:
list of sessions and associated data (session name, user id, current command, idle time)
The TMC interfaces with the Registry object to accept:
complete list of registry variables and associated values
The TMC interfaces with the Log Display object to accept:
name of temporary log data table Outputs The user may output various database views to a printer or to disk files. Disk filenames must be specified by the user. Formats are text (which has a default extension of .txt) and comma delimited (CSV) (which has a default extension of .csv). Text files contains ASCII data in a line-to-line correspondence with the view; columns separated by tabs. CSV files contain ASCII data in a line-to-line correspondence with the view; columns separated by commas. CSV files is Excel importable.
The TMC interfaces with the ORB to issue:
process start commands
The TMC interfaces with the server base process objects to issue:
reinitialize commands
process stop commands
The TMC interfaces with the Time Server object to issue:
set time command (containing new time)
The TMC interfaces with the Registry object to issue:
add variable command (containing: name, type, value)
modify variable command (containing: name, value)
delete variable command (containing: name)
load command (containing: filename)
clear command
The TMC interfaces with the Log Display object to request:
log data (containing: start date/time, stop date/time, level, program name, error code)
Registry Usage
The following is a list of the registry items used by the TMC.

TMC/Logon Attempt Limit—places a finite limit on the number of user logon attempts allowed
TMC/SQL Retries—limits on database SQL execution retries
TMC/SQL delay time between each SQL retry attempt
TMC/BSpec DB Table Name—name of the parent billing spec database table
TMC/Devices DB Table Name—name of the parent device database table
TMC/Filter DB Table Name—name of the parent filter database table
TMC/Paging DB Table Name—name of the parent paging database table
TMC/PSpec DB Table Name—name of the parent parsing spec. database table
TMC/Users DB Table Name—parent user database table
TMC/VQ DB Table Name—parent verification queue database table Janitor (JAN)

The janitor periodically cleans up old records in the database.
General Design
The basic flow is to sleep for a period of time and then, using SQL, identify records to be deleted and then remove them. The tables that the janitor operates on are the billing records received, device time, and verification request queue. Any rows which are locked, is not be removed by the janitor.
Public Access none Inputs/Outputs Inputs
The database name and table names is acquired from the registry.
Outputs
Updated Database Tables
verification_request_queue
vreq_x_billing_x_template
verify_x_cert
verification_data
device_time_change_history
billing_recs_received_keys
billing_recs_received
Registry Usage
The following is a list of the registry items used by the janitor:
/JAN/ sleep_time is an integer variable that determines how much time should pass between clean up sessions by the janitor.
/JAN/bill_rec_dispose_time is an integer indicating the time after which its ok to delete rows from the billing records received.
/JAN/ver_req_dispose_time is an integer inicating the date after which its ok to delete rows from the verification request queue.
/JAN/dev_time_dispose_time is an integer inicating the date after which its ok to delete rows from the device time change history table.
/DB/database_name is a string variable indicative of the name of the database to perform janitor operations
These are classes that are used by TServ to implement the test services in accordance with a preferred embodiment.

Parser (RecObj)

General Design
The parser simplifies extraction and use of bit-stuffed fields in records. The goals of the parser are to:

1) Abstract away all details about field and record formats into a centralized, easily maintained repository.
2) Make all record structures self-describing and self-documenting
3) Reduce the time required to accommodate changes in data structures (especially switch records)
4) Make these changes transparent to the programs, i.e. changes in switch records do not imply changes in program code.
5) Provide an easy way to dump the contents of records to the screen or to a printer
6) Provide a data-dictionary capability for "parse-able" data, including reporting and validation capabilities.
7) Maintain an up-to-date specification of the data formats
8) Optimize performance. To this end, all metadata is stored in memory and optimized for speed.

There are three related components that address these requirements:
1) The ParseRecObj object
2) The Memory-Based Metadata
5) The Disk-Based Metadata The Disk-Based Metadata The Disk-Based Metadata describes all of the data types, fields and all of the record formats that the parsing mechanism may encounter. In the case of the TEAMS implementation, the Disk-Based Metadata contains all of the information in the Billing Records Specifications. There are three tables:
1) Data Field Attributes
FIELD NAME (char)
FIELD_ID (int)
TYPE_ID (int)
LENGTH (int)
CONVERSION_DETAILS (flags, optional)
FIELD_DESCRIPTION (char)
Notes:
 a) The CONVERSION_DETAILS field contains flags that control dispatching of routines when special processing is required. For example, if fill characters must be removed, and a phone number right-justified, these would be specified with the Conversion-Details Flags.
 b) The type-id identifies an implicitly-defined simple data type (integer, bit, float, character, flag, TBCD, enum, dataTime). Fields are built as aggregates of these simple types.
 c) There is a row in this table for every possible field that the parsing software can recognize. One field may be referenced
2) Record Description
RECORD_NAME (char)
ENDIAN_FLAG (0=little, 1=big, some records must be converted)
RECORD_ID (int)
RECORD_DESCRIPTION (char)
Notes:
 a) There is a row of this type for each record format supported by the parser software. A new version of a record format implies a new record description.
 b) There is a one-to-one correspondence between the RECORD_NAME field and the RECORD_ID field. The RECORD_NAME field is more convenient for a human to use, but use of the RECORD_ID field in a program makes the code more efficient, as it can be used as an array index.
3) Record Format
RECORD_ID (int, keys into Record Description)
ORDINAL_NUMBER_OF_FIELD (int, order fields within record)
FIELD_ID ( int, keys into Data Field Attributes)
FIELD_NAME_ALIAS (char, optional)
COMMENT (char)
Notes:
 The Record Format table associates fields with a record format. The ORDINAL_NUMBER attribute defines the position of a particular field in the record. Exact bit position in the field is deduced from the order of the fields and the lengths of each. The name of the field may be qualified using the optional FIELD_NAME_ALIAS attribute. The COMMENT attribute is also optional and may describe dependencies between fields in the record.
 Record formats may contain previously defined record formats nested within them.
 The Disk-based Metadata is stored in a collection of ORACLE tables. Future implementations of the parser software may store metadata in a different format, for example, in a flat file with a "C"-language style notation.

Memory-Based Metadata

Memory-Based Metadata is created from the Disk-Based Metadata. It is essentially a de-normalized representation of the Disk-Based Metadata, organized so as to speed processing.

It is organized into three structures, corresponding to the three Disk-Based Metadata structures. The Record Format structure is different enough in the Memory-Based Metadata model to warrant more detail here:

```
struct RecStruct {
    int recordId;
    int fieldId;
    int bitPos;
    int bitLen;
    char* fieldNameAlias;
    char* comment;
}
```

Each record structure is defined in this memory table by a series of rows, each representing the occurrence of a field within the record. When RecStruct is constructed, the offset of each field is calculated and stored within the structure. RecordId and fieldId are also stored. These numbers are used to look up further information about each field and record. All looking-up uses array-indices rather than string-compare to optimize performance.

The ParseRecOBj class
 The Metadata is completely encapsulated inside the parser software. The interface to the parser software is through the ParseRecObj class.
 A ParseRecObj is constructed from a data record ( for example a switch Billing Detail Record). A ParseRecObj is aware of the metadata and knows how to parse the data record. A ParseRecObj has methods which the calling program can use to:
1) Ask what fields are found in a record
2) Ask what the values of each field are
3) Ask for the fields in ascii format
4) Ask for a description of any field or record
5) Ask for any information concerning a record structure or a field Public Access Data-driven parsing is offered through parseFieldOBj and parseRecObj classes, which are sub-classed from fieldObj and recObj respectively. The parsing facility is not a CORBA object: where used, it is statically or dynamically linked into the address space of whatever process is using it.

```
//
// fldObj base class
//
//
class fldObj
{
friend recObj;
public:
// get a void pointer to the computational value of the field
void* getValue( );
// get the data type code of the field
int getType( );
// get the field length in bits or bytes
int getLen(const int bits=FALSE);
// get textual name of field
const char const * getName( );
// get textual description of field
const char const * getDescription( );
// output the field value as string for stream output
char* &operator<<( fldObj& f );
// increment the fldObj number. Returns null if no more fields
fldObj &operator++( fldObj& f );
// comparison operator...compares two field values, perhaps
// from different physical records
int &operator==( fldObj&f );
private:
// constructor is only called by recObj class
fldObj( const int fieldNumber );
// field name from metadata
char name[40];
// descr name from metadata
char desc[40];
}
//
// parserFldObj - derived from fldObj with functionality added
// in for parser
//
class parserFldObj : public fldObj
{
public:
parserFldObj( const int FLD_TYPE );
// overriden constructor
parserFldObj( const int fieldNumber );
// get byte offset of field within record
int getByteOffset( );
// get bit offset of field within record
int getBitOffset( );
// test if used by certain record
bool isusedByRec( recObj r );
private:
// extract this field from the record image
int setValue( const char const * recImage, int byteOffs, int bitOffs
);
// stored data value
char value[100];
}
class RecObj
{
// create empty recObj of this type
recObj ( const int recordType );
// create empty recObj of this type
recObj( const char const * recordTypeName );
// construct and populate a recObj
// create record object of this type
recObj( const int recordType, const char const * recImage );
// populate or repopulate a recObj
populate( const char* recImage );
// object serialization...for passing objects through corba
void getGuts( int& len; objGuts& guts );
void setGuts( objGuts& guts );
// gets number of all record types known to parser
static int getNumRecordsTypes( );
// get record type
int getType( );
// get number of fields in record format
int getNumFlds( );
```

```
// get record length in bytes
int getLen( );
// get textual name of record
const char const * getName( );
// get textual description of record
const char const * getDescription( );
// these operators used in retrieving individual fields
fldObj recObj::operator [ ]( const char const * fieldName );
fldObj recObj::operator [ ]( int fieldNumber );
char* &operator<<( recObj& r );
private:
// pointers to all the relavant field objects
fldObj* f[100];
}
```

Inputs

Three ORACLE tables represent the Disk-Based Metadata:

1) RECORD_TYPES
2) RECORD_TYPE_FIELD_NAME
3) FIELDS

Outputs

Registry Usage

The Registry is not used by the parser.

Selection Criteria Language (SCL)

The Selection Criteria Language (SCL) class encapsulates all of the syntax for the language used to find billing records. This language is designed to be simple to use and understand, but flexible and powerful. Any valid keywords for a billing record may be used as part of the search.

General Design

The language is converted into a decision tree made up of objects of two types, complex and simple. Simple objects represent simple expressions which are composed of a variable, an operator and a value. They can be evaluated directly. Complex objects represent complex expressions that are a grouping of simple objects. They need the results of the simple objects for evaluation. The decision tree can be used by subclasses to evaluate against it.

Language Definition

The Selection Criteria Language is used as a interface mechanism to the Billing Record Finder (BRF). The basic format is <keyword> <operator> <matching criteria>

Keywords:

Any valid field for a given record type is a valid keyword. This implies that a client may search on any field for a record type.

Here are some example keywords.
ORIG_SW
TERM_SW
START_TIME
END_TIME
BRIDGE_SW
CALL_REC_TYPE
DIAL_DIGITS
Operators:
=—equality
>—greater than
<—less than
<=—less than or equal
>=—greater than or equal
!—negative &&—and
||—inclusive or
\—Take following character as a literal—to handle override of originating switch id. {0} would be \{0\}
Grouping:
( )—group expressions
{ }—set of legitimate values;
,—separator for groups of values
Example:
((ORIG_SW={501,203} || TERM_SW=403) && (START_TIME> 10:15 &&
END_TIME<10:17))
Public Access The SCL class uses two minor classes for expression evaluation: simple and complex. They are included in the public methods.

Data

The decision tree which is represented by a collection of simple and complex objects is available to classes which inherit the SCL class.

complex* treeRoot;
This is the root of the decision tree.
Methods
SCL(char* sclStr)
Constructor
applyOverride(char* overrideStr)

This does the replacement of the special characters which were determined at execution time.

matchNames(list of structures matchNames)

This matches input strings with strings in the SCL string. It can be used for finding key fields and indices.

generateSQL(string sqlStr stringlist keyFieldList Generates an SQL query based on the input key fields.

Simple
Indicates a simple expression.

```
Public data:
string expression; / /expression to be evaluated
string fieldName / /field for evaluation
string compareValue / /value to compare against
integer fieldType / /data type of the field
integer operator; / /operator for the expression
complex* parentObj; / /pointer to the parent object
Public Methods:
void simple(string* expression) / / constructor
bool evaluate(stringvalue);
```

Complex

Indicates a complex evaluation expression. A complex expression is defined to be any expression with an operator of type &&, ||. Also, expressions prefaced by a ! or bounded by parentheses are considered complex expressions.

```
Public data:
string expression; / /expression to be evaluated
simple* leftSimple; / /left operand if its a simple expression
complex* leftComplex; / /left operand if its complex
simple* rightSimple / /right operand if its simple
complex* rightComplex; / /right operand if its complex
integer operator; / /operator for the expression
complex* parentObj; / /pointer to the parent object
```

Error Handling

The SCL is checked for language syntax problems which is reported back to the caller. Also, the generateSQL method checks the complexity of statements.

Filter

The filter is a utility class that is used to decide if a record matchs a set of criteria or not. The filter class is inherited from the SCL class which defines the SCL language.

General Design

Upon creation, the filter accepts either an SCL statement or a filter id, which corresponds to an SCL statement, and then using the SCL class, evaluate and store the statement. If there are errors in the statement an error is returned and the object is in an invalid state.

Once the filter has been successfully created, the client is able to check record objects to see if they pass with respect to the filter. Internally, the filter applies the record object against the decision tree which was created by the SCL and each field is compared until a boolean value can be resolved.

Inputs/Outputs

Inputs

The filter needs either a filter id or an SCL string on which to filter. Additionally, the pass method requires a record object on which to operate.

Database Tables
filter
filter_specification
Outputs

The pass method returns a Boolean to indicate if a record has passed or not.

Class Diagrams
Click here for Picture
Security (Sec)
Store-Forward (Stf)

The Store Forward class acts as a holding place for records that are received from the Collector. The records remain in the Store Forward files until they can be sent to the database by the Loader. The Store Forward tracks the number of records coming in and the number of records going out. It also tracks the order in which the records enter and leave.

General Design

```
Store Forward program flow
Read Registry for initialization
While ( A_OK ) {
  If ( store_file ) {
    get record from Collector
    Files_in_StF++
    Tot_recs_in++
  }
  If ( get_file ) {
    get record from stf file
    send file to Loader
    Tot_recs_out++
    Files_in_StF--
  }
}
Public Access
Data
long Files_in_StF
Methods
int StoreRec( Stf_Record record );
int RetrieveRec( Stf_Record record );
```

Database Access (DB)

General Design

The database access is provided based on the requirements of data by various modules in the application. The following are the modules in the Teams Server application, interacting with the database.

1. Verifier (VER)
2. Collector (COL)

3. Billing Record Finder (BRF)
4. Time Server (TS)
5. Log Display server (LDS)
6. Process Manager (PM)
7. Loader (LDR)
8. TServ Management Console (TMC) Other modules such as Registry (REG), Client Manager (CLM) and Logger (LOG) do not directly interacting with database.

Secondly the database is organized in Four different ways in order to do testing. They are identified as unit test, String test, System Test and Integration test. Each test is be identified as user having independent work area to do testing.

Public Access

The database access is defined in the following application interface.

interface oracle_connections(in test_area out status);
/* test_area can be unit test or sting test or system test or integration
test */

Data

The data is be obtained by executing the functions or Procedures. If the function is successful, it returns 1, otherwise it returns 0; If the function is not successful, it can be run again and again until it is successful. If there is any system level problem, it can be notified to the administrator to take necessary actions.

Methods

Parser_Objects( )

```
{
void Parser_Read_1();
/* This is used to retrieve records(read only) from parser table 1 */
void parser_Read_2();
/* This is used to retrieve records(read only) from parser table 2 */
void parser_Read_3();
/* This is used to retrieve records(read only) from parser table 3 */
}
Loader_Objects()
{
void Write_Rec_Obj();
/* This is set of procedures to Insert/update records in multiple
tables */
void Read_Rec_Obj();
/* This is set of procedures to read records from multiple tables */
}
Console_Objects()
{
void Overall_Struc();
/* This will show different levels of data structural hierarchy */
void VER_Struc();
/* This will show different levels of data structural hierarchy for
verifier
*/
void LDR_Struc();
/* This will show different levels of data structural hierarchy for
Loader
*/
void COL_Struc();
/* This will show different levels of data structural hierarchy for
Collector
*/
void BRF_Struc();
/* This will show different levels of data structural hierarchy for
BRF */
:
:
}
Collector_Objects()
{
void Read_filters();
```

```
/* This will retrieve filter information from database */
}
Verifier_Objects()
{
VerReq_VLD()
{
void put_ver_request(in *all columns for the queue, out
success_flag)
/* Writes a row to the verification request queue */
void get_ver_request(in *all columns for the queue, out success_flag)
/* retrieves a row from the verification request queue */
void update_request_status(in request id, new status, out
success_flag)
/* updates the status of the verification request queue */
void select_requests(in status)
/* gets rows based on status, sorted by time */
}
Verify_VER()
{
void get_device_load_view (in dev_name, dev_id, resource_id,
out matching rows)
/* retrieves matching rows */
void get_template_view (in testcase_section, testcase_number,
testcase_type, resource_id
out matching rows)
/* retrieves matching rows */
}
Janitor()
{
void Remove_requests(in status_to_work_against,
out success_flag)
/* deletes rows from the database based on status */
void Remove_billing_records(in time, out log_of_records_deleted)
/* deletes billing records based on: insert time */
}
Ver_history_Cert()
{
void Archive_Billing_Record(in billing_rec_id,
out archive_rec_id /* 0, if unsuccessful */)
/* Moves a billingg record to archives */
void Archive_Ver_Request(in request_id,
out status)
/* Moves a verification request to verification history and
moves verification data to verification data history */
void Set_Ver_X_Billing_Template_Hist(in
vreq_id,template_id,archive_id,
out status)
/* Populates a row of the ver_x_billing_template_hist table */
void Set_Cert_X_Archive(in archive_id, certification_id,
out status)
/* Populates a row of the cert_x_archive table */
}
}
BRF_Objects()
{
void ExecuteSQLquery_BRF(in query_string, out records_details);
/* Executes the SQL query passed by BRF */
}
TS_Objects()
{
void Read_BRF_view(in device_name, out records);
/* Retrieves device details from BRF_view */
void Insert_device_details(in device_name,in device_time,in
server_time
out status);
/* Populates a row of the device_table */
}
LDS_Objects()
{
void Insert_Log_details(in Log_Informations, out status);
/* Populates a row of the Log_table */
}
```

TimeDate Class
General Design

```
Public Access
CTimeDate();
CTimeDate( const struct tm *timeptr );
CTimeDate( unsigned long hour, unsigned long minutes
, unsigned long seconds, RWCString dateString );
CTimeDate( RWTime time, RWDate date );
void ConvertToOracle( RWCString timeString, RWCString
timeFormat );
void Display();
long MciToDecEpoch( long );
long DecToMciEpoch( long );
long ToMciEpoch();
long ToDecEpoch();
RWCString FromMciEpoch( long seconds );
RWCString FromDecEpoch( long seconds );
void SetTime( const RWCString& time );
void SetDate( RWDate date );
void SetDate( const RWCString& date );
void AddTime( long seconds );
RWCString GetTime();
RWCString GetDate();
RWCString GetDateTime();
void operator+( long seconds );
void operator-( long seconds );
RWBoolean operator<( CTimeDate& time );
RWBoolean operator>( CTimeDate& time );
RWBoolean operator<=( CTimeDate& time );
RWBoolean operator>=( CTimeDate& time );
RWBoolean operator==( CTimeDate& time );
RWBoolean operator!=( CTimeDate& time );
```

Entity Relationship Diagrams (ERD) for the following processing features in accordance with a preferred are presented below.
Certification
Collector/Loader
Device Configuration
Execution
Filter
Parser
Security
Template
Verification

Figure 7:
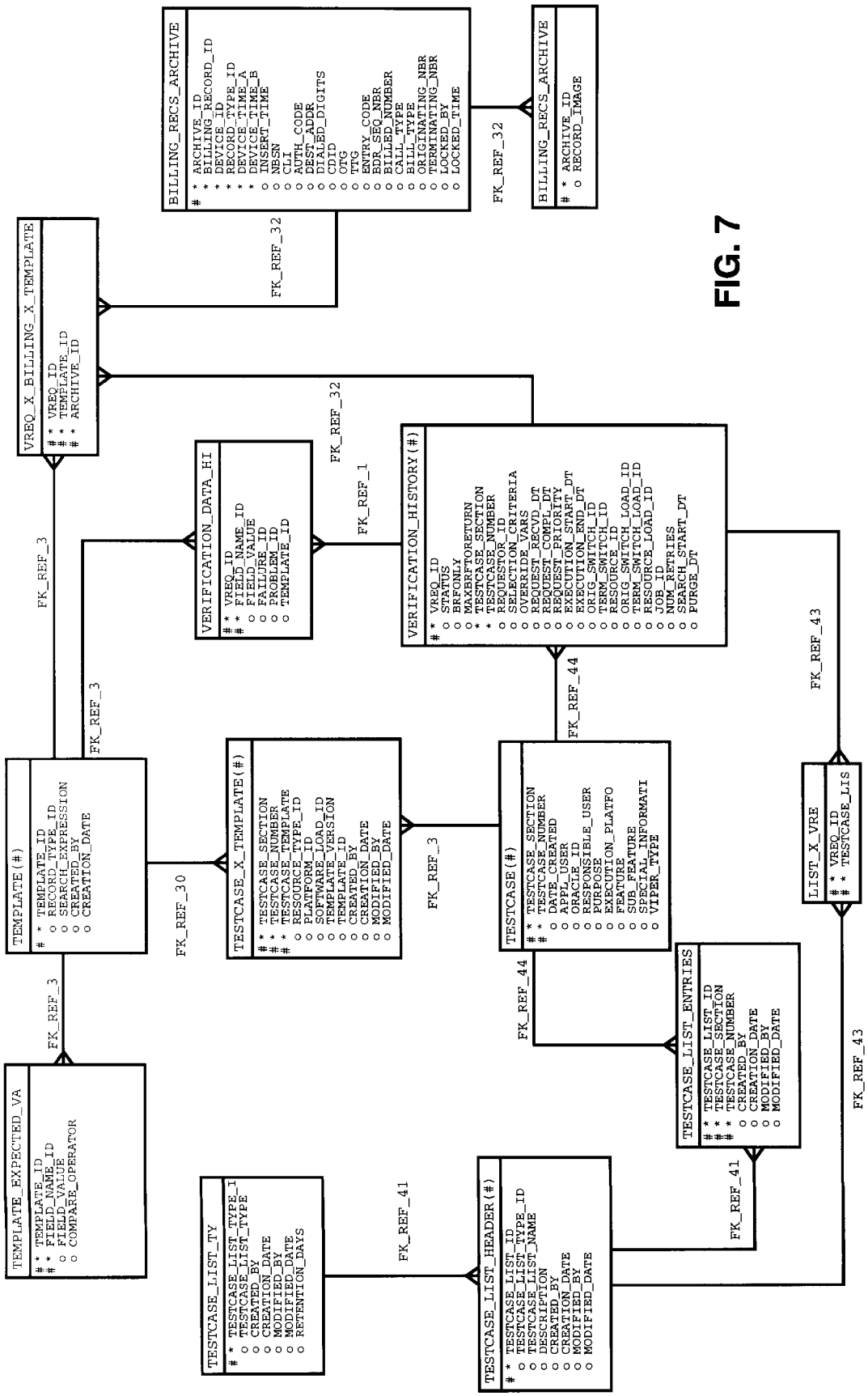
FIG. 7 illustrates a flow diagram of Certification processing in accordance with a preferred embodiment.

Certification
FIG. 7 illustrates a flow diagram of Certification processing in accordance with a preferred embodiment.

Figure 8:
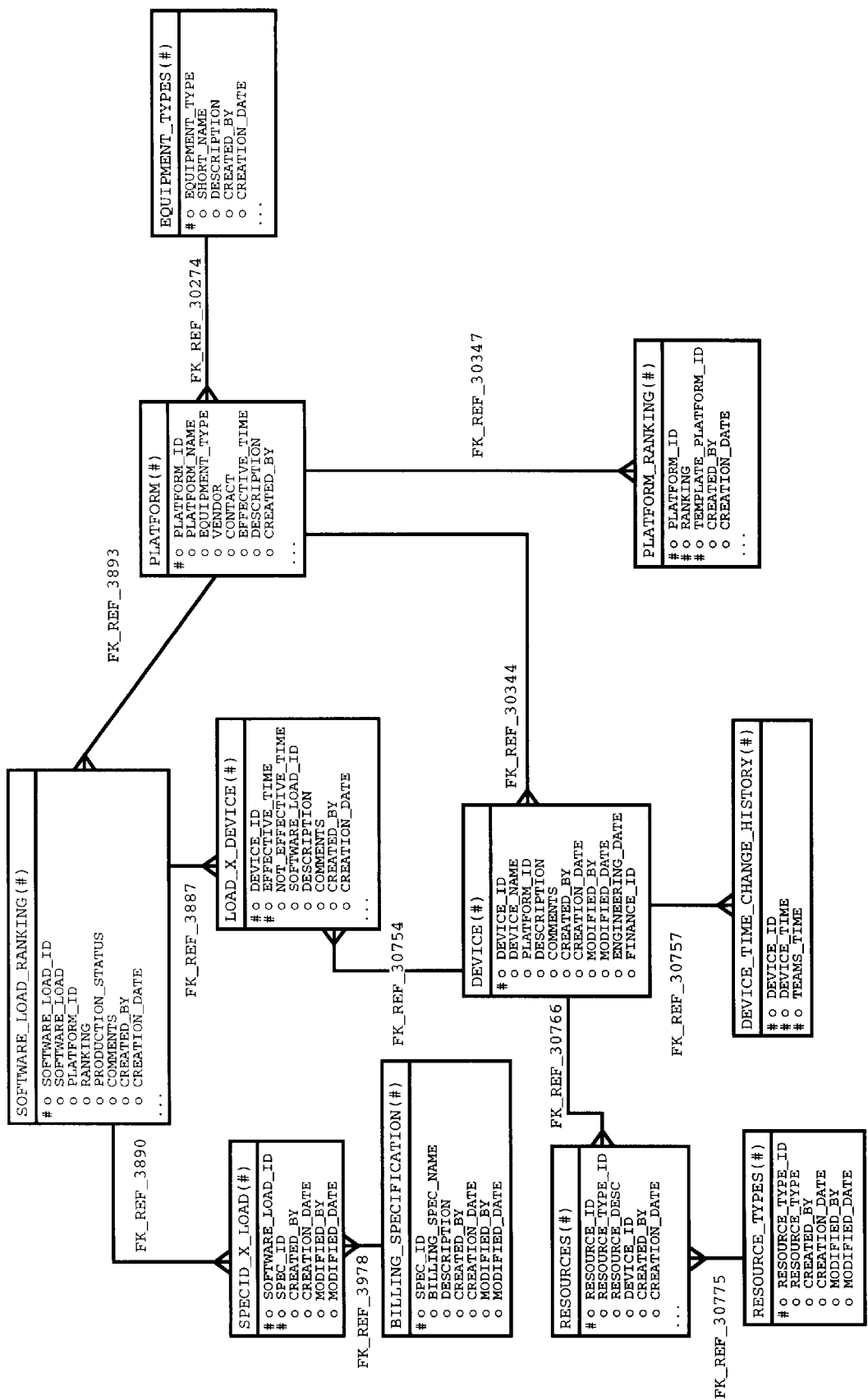
FIG. 8 illustrates a flow diagram of Collector/Loader processing in accordance with a preferred embodiment.

Collector/Loader
FIG. 8 illustrates a flow diagram of Collector/Loader processing in accordance with a preferred embodiment.

Figure 9:
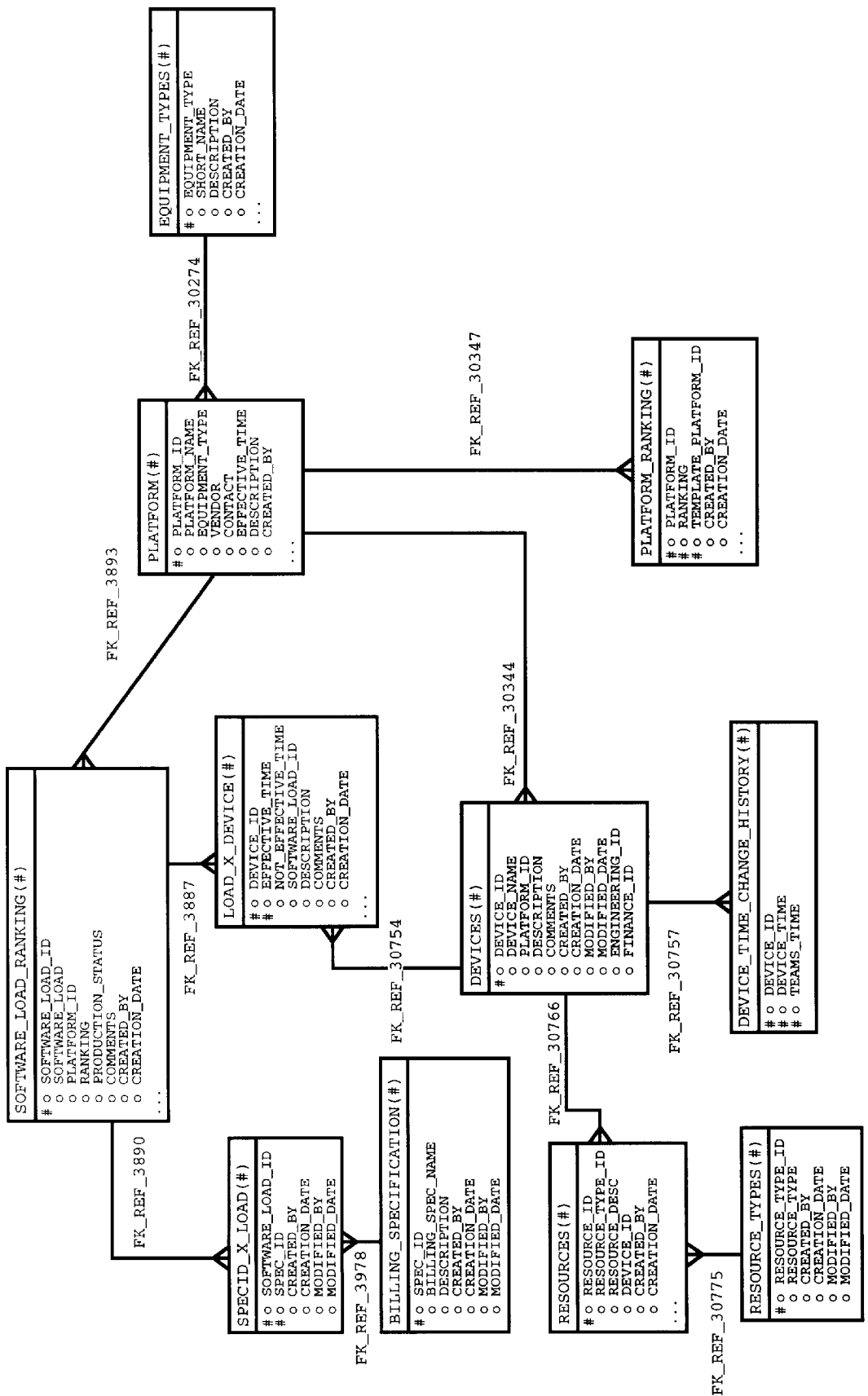
FIG. 9 illustrates a flow diagram of Device Configuration processing in accordance with a preferred embodiment.

Device Configuration
FIG. 9 illustrates a flow diagram of Device Configuration processing in accordance with a preferred embodiment.

Figure 10:
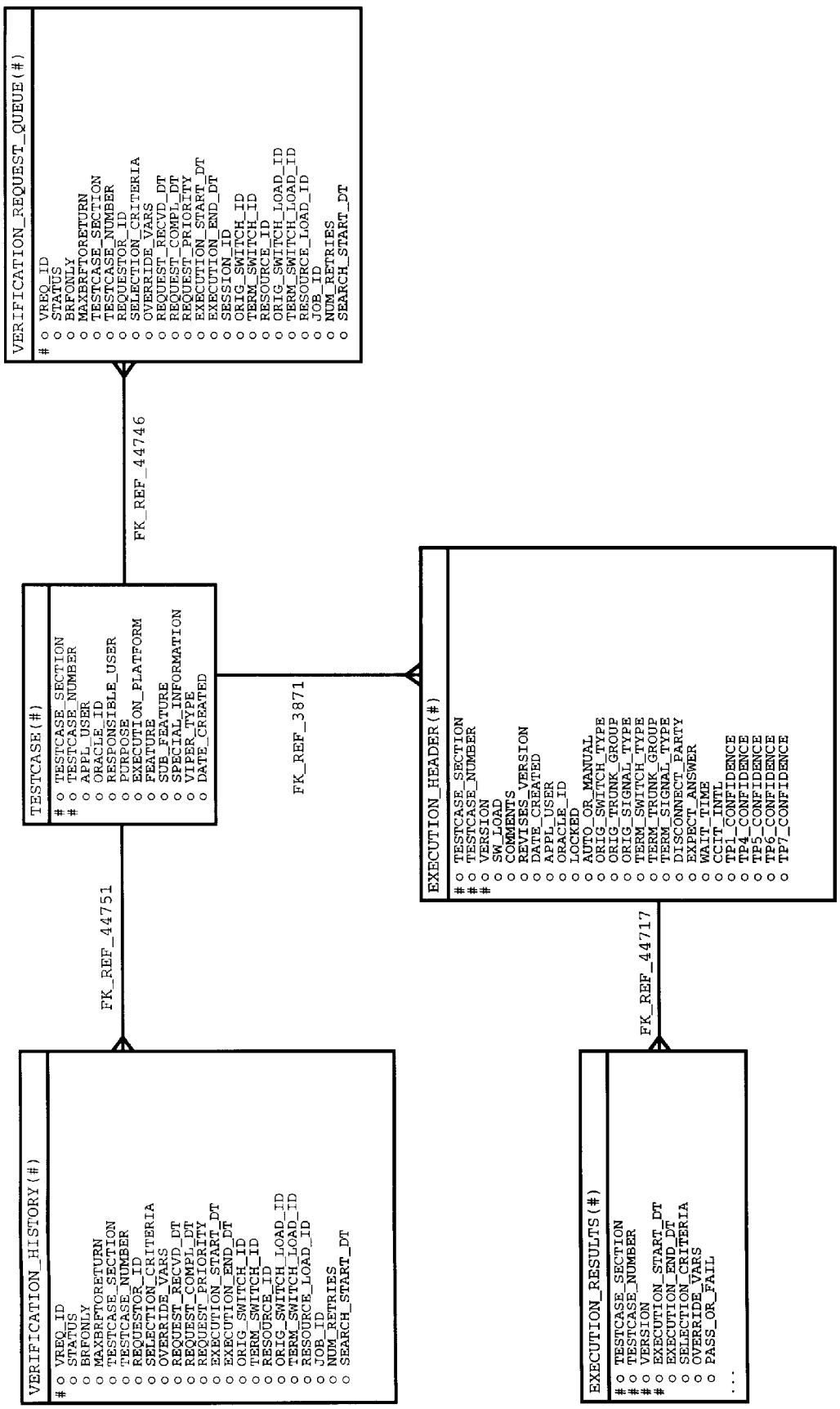
FIG. 10 illustrates a flow diagram of Execution processing in accordance with a preferred embodiment.

Execution
FIG. 10 illustrates a flow diagram of Execution processing in accordance with a preferred embodiment.

Figure 11:
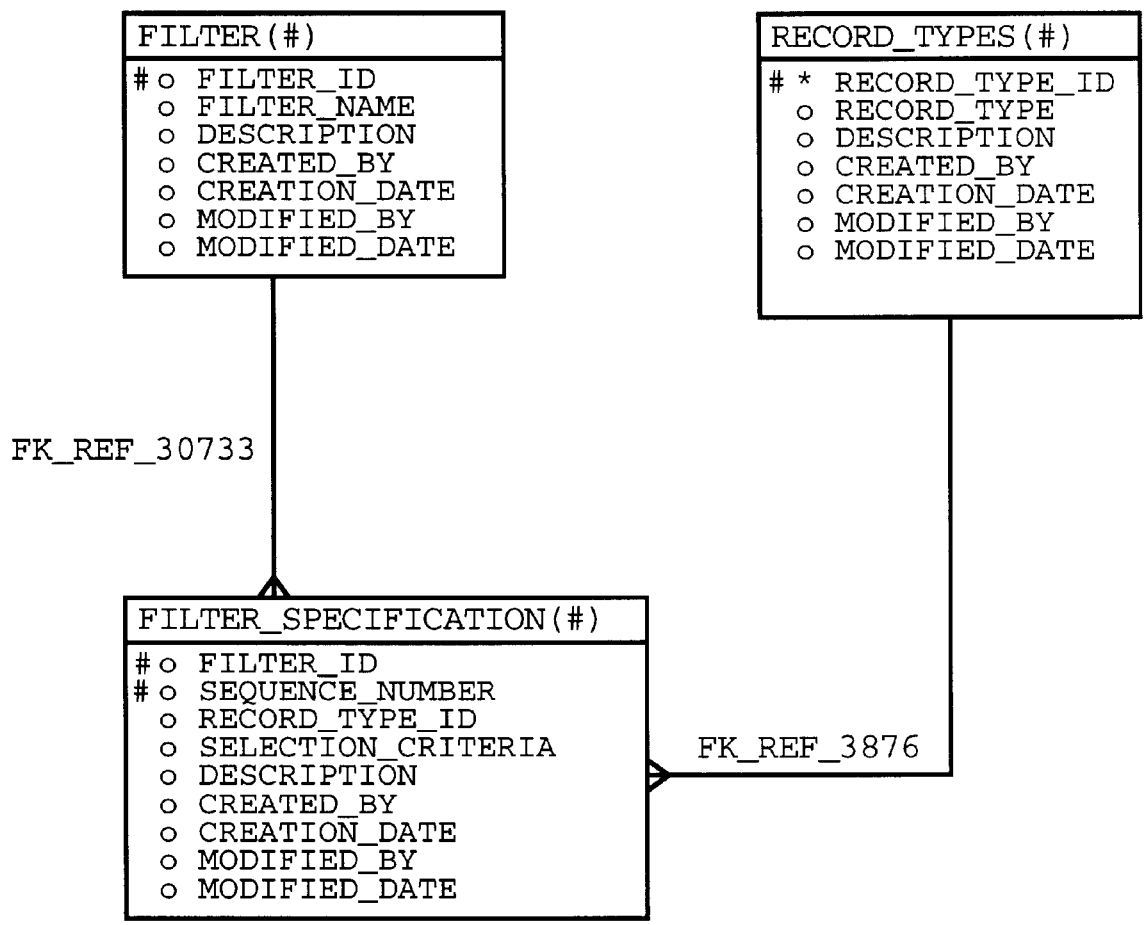
FIG. 11 illustrates a flow diagram of Filter processing in accordance with a preferred embodiment.

Filter
FIG. 11 illustrates a flow diagram of Filter processing in accordance with a preferred embodiment.

Figure 12:
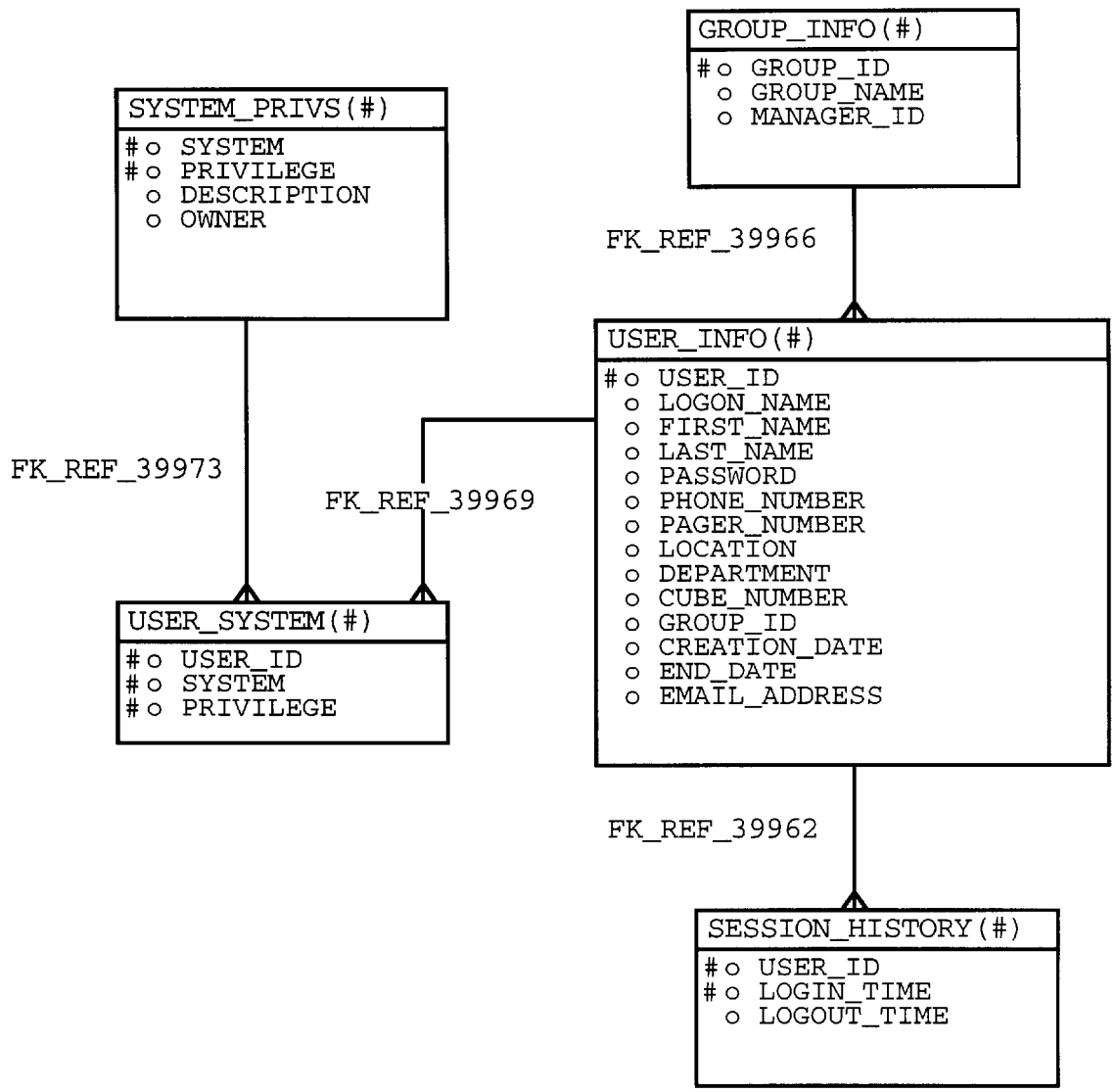
FIG. 12 illustrates a flow diagram of Parser processing in accordance with a preferred embodiment.

Parser
FIG. 12 illustrates a flow diagram of Parser processing in accordance with a preferred embodiment.

Figure 13:
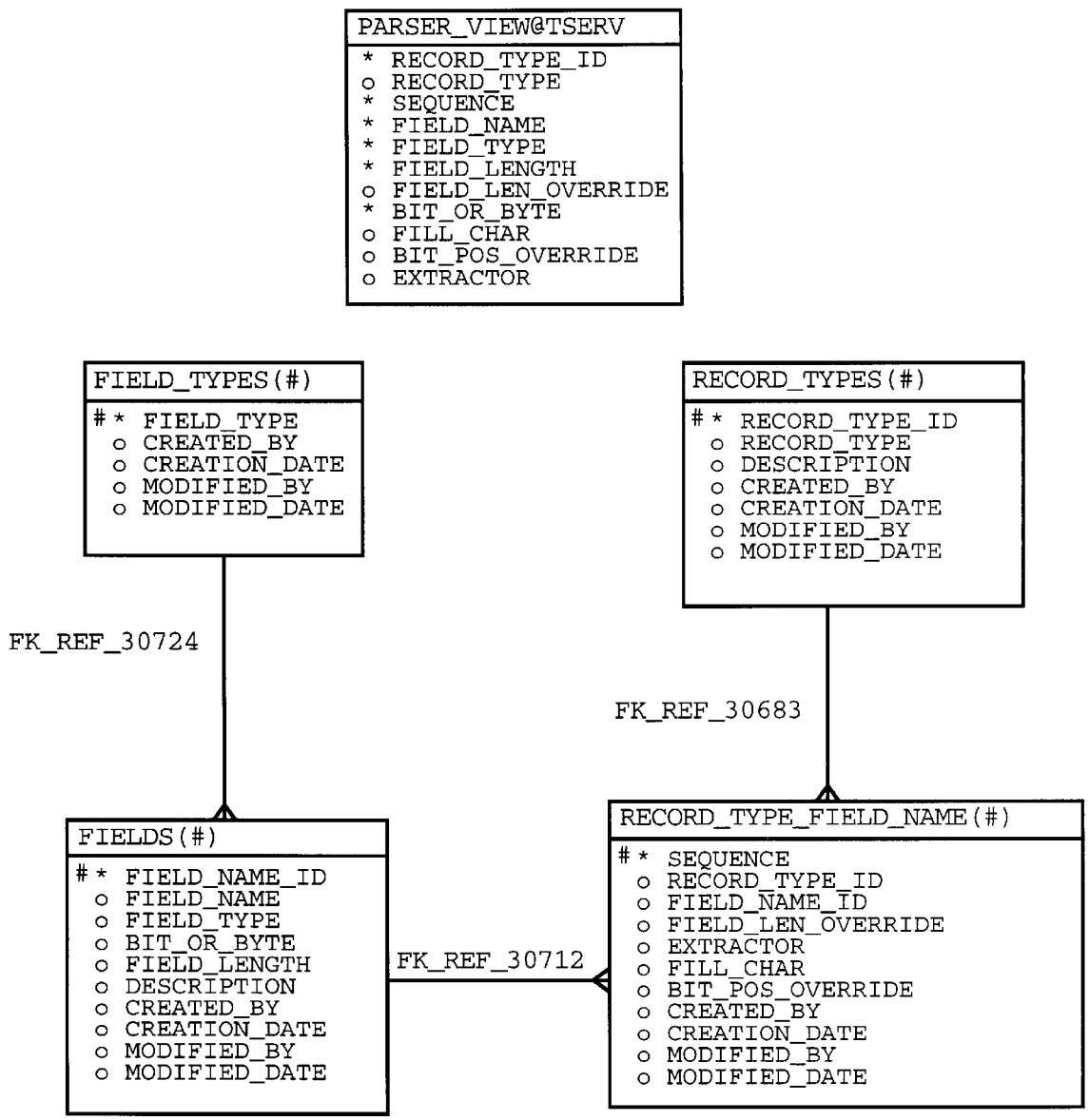
FIG. 13 illustrates a flow diagram of Security processing in accordance with a preferred embodiment.

Security
FIG. 13 illustrates a flow diagram of Security processing in accordance with a preferred embodiment.

Figure 14:
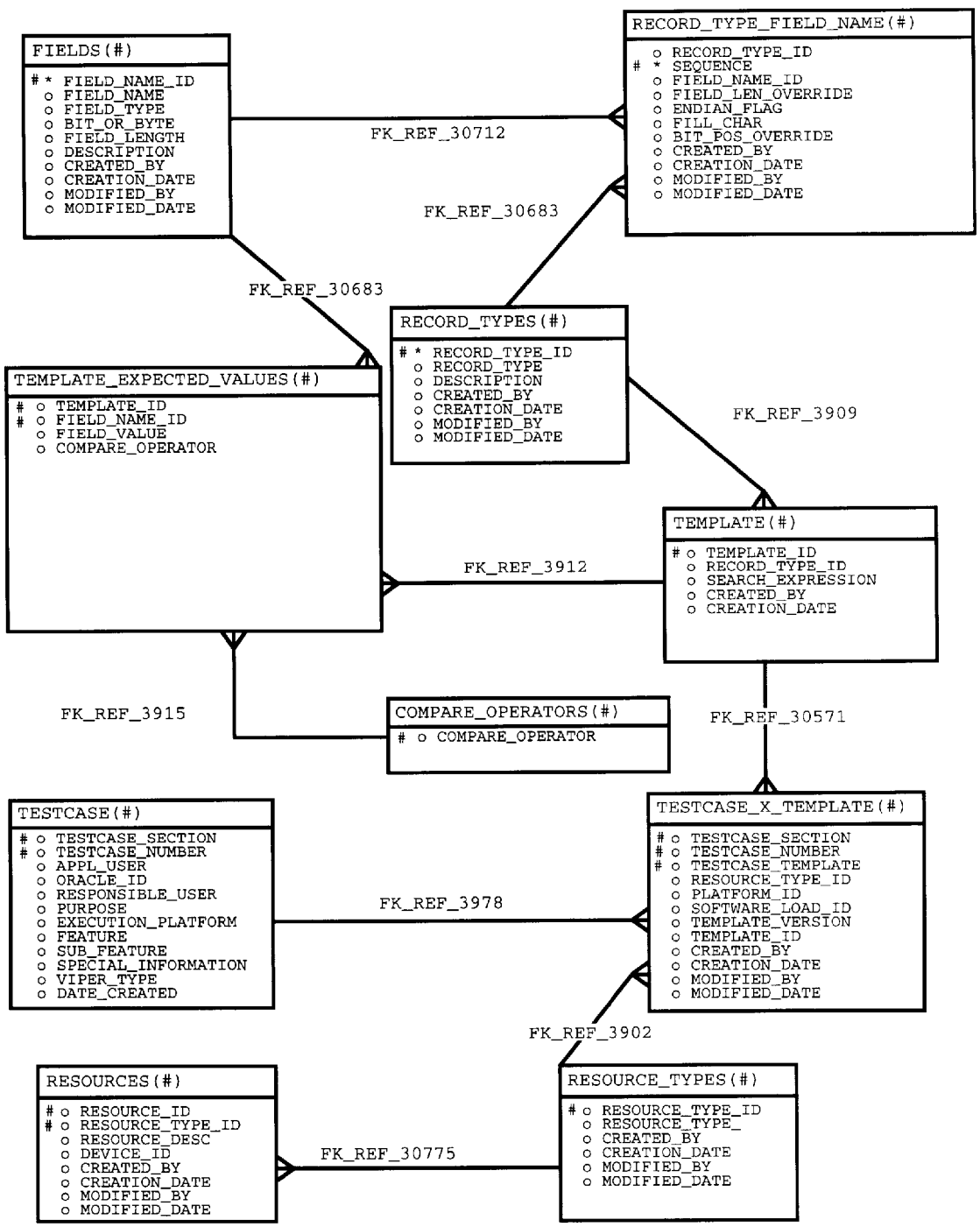
FIG. 14 illustrates a flow diagram of Parser processing in accordance with a preferred embodiment.

Template
FIG. 14 illustrates a flow diagram of Parser processing in accordance with a preferred embodiment.

Figure 15:
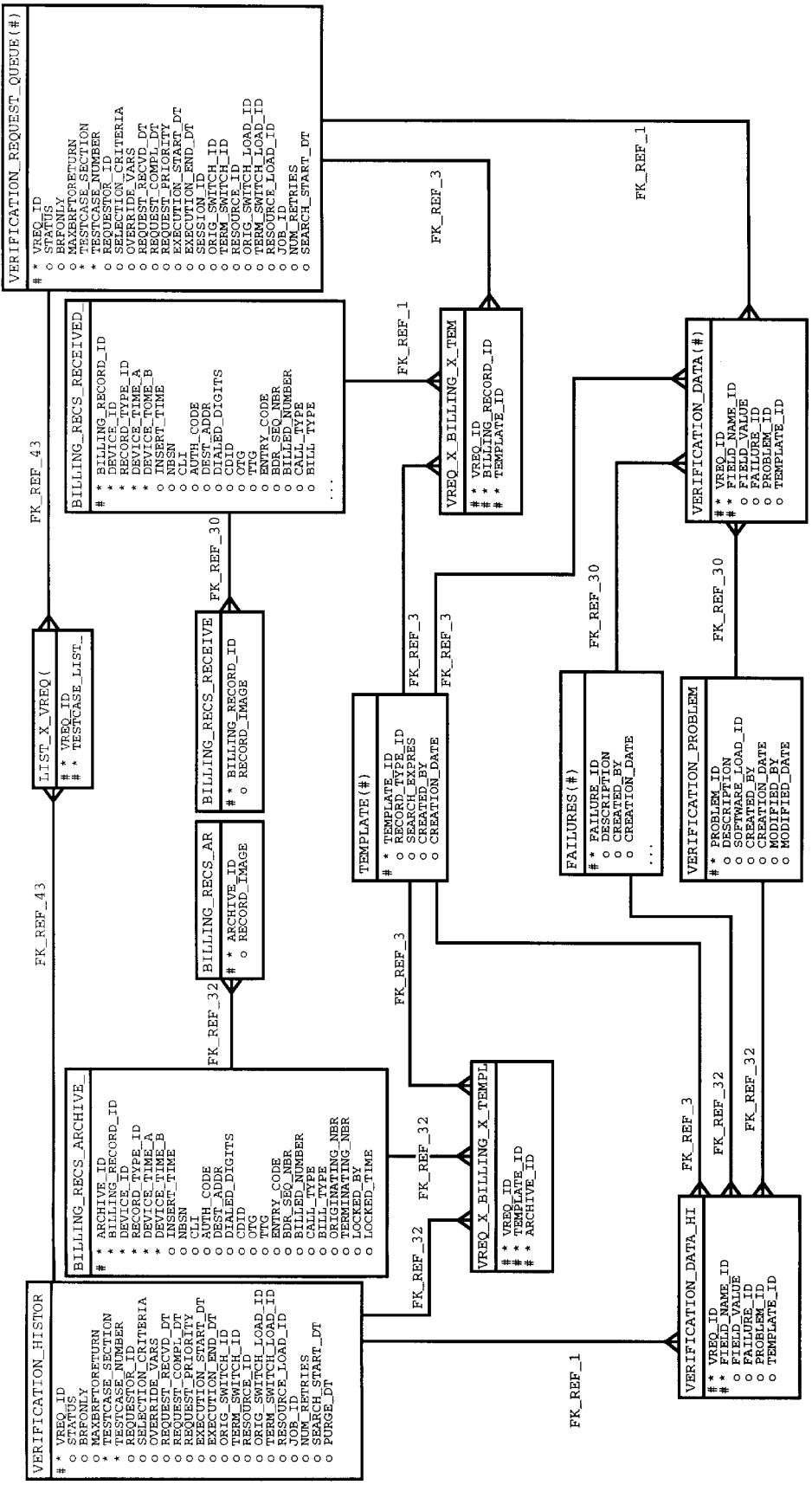
FIG. 15 illustrates a flow diagram of Verification processing in accordance with a preferred embodiment.

Verification
FIG. 15 illustrates a flow diagram of Verification processing in accordance with a preferred embodiment.

Billing_Speccification
This table has an entry for each billing specification. Example billing specs are "9.6", "9.8", etc. Also, other "billing specs" such as for BDR and for ADF may be included here.

```
Column Summary
Col. Seq Column Nulls ? Type
1 SPEC_ID NOT NULL INTEGER ()
2 BILLING_SPEC_NAME NULL VARCHAR2 (30)
3 DESCRIPTION NULL VARCHAR2 (128)
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_BILLING_SPECIFICATION SPEC_ID
BILLING_SPEC_X_RECORD_TYPES
```

This table associates a billing specification to a record type. This allows multiple billing specificaitons to use the same record type. Also, multiple record types may be present in a single billing specification.

```
Column Summary
Col. Seq Column Nulls ? Type
1 RECORD_TYPE_ID NOT NULL INTEGER ()
2 SPEC_ID NOT NULL INTEGER ()
3 CREATED_BY NULL VARCHAR2 (30)
4 CREATION_DATE NULL DATE
5 MODIFIED_BY NULL VARCHAR2 (30)
6 MODIFIED_DATE NULL DATE
Primary Key
Name Column
PK_BILLING_SPEC_X_RECORD_RECORD_TYPE_ID
TYPES
PK_BILLING_SPEC_X_RECORD_SPEC_ID
TYPES
Foreign Keys
```

-continued

FK_REF_30689
RECORD_TYPE_ID references RECORD_TYPES.RECORD_TYPE_ID
Transferable ? :True ; Mandatory ? :False ; Update Rule :Restricted
; Delete Rule :Restricted ;
CALL_RECORD_TYPES This is a table containing call record types as defined in the billing specification.

Column Summary
Col. Seq Column Nulls ? Type
1 CRID NOT NULL INTEGER ()
2 RECORD_TYPE_ID NOT NULL INTEGER ()
3 DESCRIPTION NULL VARCHAR2 (128)
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_CALL_RECORD_TYPES CRID
PK_CALL_RECORD_TYPES RECORD_TYPE_ID
Foreign Keys
FK_REF_30674
RECORD_TYPE_ID references RECORD_TYPES.RECORD_TYPE_ID
Transferable ? :True ; Mandatory ? :False ; Update Rule :Restricted
; Delete Rule :Restricted ;
COMPARE_OPERATORS This table contains a list of valid compare operators used in construction of a tamplate. Examples of compare operators may be

"=",

">", ">=", etc.

Column Summary
Col. Seq Column Nulls ? Type
1 COMPARE_OPERATOR NOT NULL CHAR (2)
Primary Key
Name Column
PK_COMPARE_OPERATORS COMPARE_OPERATOR
DB_LOAD_DIRECTOR -continued The DB_Load_Director table is used to identify the fields in the billing record which are used as key fields in the Billing_Recs_Received_Keys.

Whenever there is a change in the definition to the Billing_Recs_Received_Keys table, entries in this table must reflect t hat change.

Column Summary
Col. Seq Column Nulls ? Type
1 RECORD_TYPE_ID NOT NULL INTEGER ()
2 SEQUENCE NOT NULL INTEGER ()
3 FIELD_NAME_ID NOT NULL INTEGER ()
4 DB_TABLE_NAME NULL VARCHAR2 (32)
5 DB_COLUMN_NAME NULL VARCHAR2 (32)
6 CREATED_BY NULL VARCHAR2 (30)
7 CREATION_DATE NULL DATE
8 MODIFIED_BY NULL VARCHAR2 (30)
9 MODIFIED_DATE NULL DATE
Primary Key
Name Column
PK_DB_LOAD_DIRECTOR RECORD_TYPE_ID
PK_DB_LOAD_DIRECTOR SEQUENCE
PK_DB_LOAD_DIRECTOR FIELD_NAME_ID
Foreign Keys
FK_REF_1114
FIELD_NAME_ID references FIELDS.FIELD_NAME_ID
Transferable ? :True ; Mandatory ? : False; Update Rule : Restricted
; Delete Rule :Restricted ;
FK_REF_30701

```
RECORD_TYPE_ID references
RECORD_TYPE_FIELD_NAME.RECORD_TYPE_ID
SEQUENCE references RECORD_TYPE_FIELD_NAME.SEQUENCE
Transferable ? :True ; Mandatory ? :False ; Update Rule :Restricted
; Delete Rule :Restricted ;
FK_REF_30715
FIELD_NAME_ID references FIELDS.FIELD_NAME_ID
Transferable ? :True ; Mandatory ? :False; Update Rule :Restricted
; Delete Rule :Restricted ;
DEVICES
```

This table contains one entry for each device being tested.

```
Column Summary
Col. Seq Column Nulls ? Type
1 DEVICE_ID NOT NULL INTEGER ()
2 DEVICE_NAME NOT NULL CHAR (10)
3 PLATFORM_ID NULL INTEGER ()
4 DESCRIPTION NULL VARCHAR2 (128)
5 COMMENTS NULL VARCHAR2 (128)
6 CREATED_BY NULL VARCHAR2 (30)
7 CREATION_DATE NULL DATE
8 MODIFIED_BY NULL VARCHAR2 (30)
9 MODIFIED_DATE NULL DATE
10 ENGINEERING_ID NULL CHAR (3)
11 FINANCE_ID NULL CHAR (4)
Primary Key
Name Column
PK_DEVICES DEVICE_ID
Foreign Keys
FK_REF_30344
PLATFORM_ID references PLATFORM.PLATFORM_ID
Transferable ? :True ; Mandatory ? :False ; Update Rule :Restricted
; Delete Rule :Restricted ;
DEVICE_TIME_CHANGE_HISTORY
```

This table contains the information needed to compute the time difference between the devices being tested and the test system.

```
Column Summary
Col. Seq Column Nulls ? Type
1 DEVICE_ID NOT NULL INTEGER ()
2 DEVICE_TIME NOT NULL DATE
3 TEAMS_TIME NOT NULL DATE
Primary Key
Name Column
PK_DEVICE_TIME_CHANGE_HIS DEVICE_ID
TORY
PK_DEVICE_TIME_CHANGE_HIS DEVICE_TIME
TORY
PK_DEVICE_TIME_CHANGE_HIS TEAMS_TIME
TORY
Foreign Keys
```

-continued

```
FK_REF_30757
DEVICE_ID references DEVICES.DEVICE_ID
Transferable ? :True ; Mandatory ? :False ; Update Rule :Restricted
; Delete Rule :Restricted ;
EQUIPMENT_TYPES
```

This table contains an entry for each equipment type being tested by

TEAMS. Examples of equipment type may include "switch", "ACD",

"DXC",

"ISN", etc.

```
Column Summary
Col. Seq Column Nulls ? Type
1 EQUIPMENT_TYPE NOT NULL INTEGER ()
2 SHORT_NAME NULL CHAR (10)
3 DESCRIPTION NULL VARCHAR2 (128)
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_EQUIPMENT_TYPES EQUIPMENT_TYPE
EXECUTION_HEADER
```

```
Column Summary
Col. Seq Column Nulls ? Type
1 TESTCASE_SECTION NOT NULL VARCHAR2 (6)
2 TESTCASE_NUMBER NOT NULL NUMBER ()
3 VERSION NOT NULL NUMBER ()
4 SW_LOAD NULL VARCHAR2 (12)
5 COMMENTS NULL VARCHAR2 (200)
6 REVISES_VERSION NULL NUMBER ()
7 DATE_CREATED NULL DATE
8 APPL_USER NULL VARCHAR2 (30)
9 ORACLE_ID NULL VARCHAR2 (30)
10 LOCKED NULL VARCHAR2 (1)
11 AUTO_OR_MANUAL NULL VARCHAR2 (1)
12 ORIG_SWITCH_TYPE NULL VARCHAR2 (6)
```

13 ORIG_TRUNK_GROUP NULL VARCHAR2 (5)
14 ORIG_SIGNAL_TYPE NULL VARCHAR2 (5)
15 TERM_SWITCH_TYPE NULL VARCHAR2 (6)
16 TERM_TRUNK_GROUP NULL VARCHAR2 (5)
17 TERM_SIGNAL_TYPE NULL VARCHAR2 (5)
18 DISCONNECT_PARTY NULL VARCHAR2 (1)
19 EXPECT_ANSWER NULL VARCHAR2 (1)
20 WAIT_TIME NULL NUMBER ()
21 CCIT_INTL NULL VARCHAR2 (5)
22 TP1_CONFIDENCE NULL NUMBER ()
23 TP4_CONFIDENCE NULL NUMBER ()
24 TP5_CONFIDENCE NULL NUMBER ()
25 TP6_CONFIDENCE NULL NUMBER ()
26 TP7_CONFIDENCE NULL NUMBER ()
Primary Key
Name Column
EXECUTION_HEADER_PK TESTCASE_SECTION
EXECUTION_HEADER_PK TESTCASE_NUMBER
EXECUTION_HEADER_PK VERSION
Foreign Keys
FK_REF_3871
TESTCASE_SECTION references TESTCASE.TESTCASE_SECTION
TESTCASE_NUMBER references TESTCASE.TESTCASE_NUMBER
Transferable ? :True ; Mandatory ? :False ; Update Rule :Restricted
; Delete Rule :Restricted ;
EXECUTION_RESULTS Column Summary
Col. Seq Column Nulls ? Type
EXECUTION_END_DT NULL DATE
EXECUTION_START_DT NULL DATE
JOB_ID NULL INTEGER ()
OVERRIDE_VARS NULL VARCHAR2 (128)
PASS_OR_FAIL NULL INTEGER ()
SELECTION_CRITERIA NULL VARCHAR2 (512)
TESTCASE_NUMBER NULL NUMBER ()
TESTCASE_SECTION NULL VARCHAR2 (6)
VERSION NULL NUMBER ()
VREQ_ID NULL INTEGER ()
Primary Key
Name Column
PK_EXECUTION_RESULTS TESTCASE_SECTION
PK_EXECUTION_RESULTS TESTCASE_NUMBER
PK_EXECUTION_RESULTS VERSION
PK_EXECUTION_RESULTS EXECUTION_START_DT
Foreign Keys
FK_REF_44717
TESTCASE_SECTION references
EXECUTION_HEADER.TESTCASE_SECTION
TESTCASE_NUMBER references
EXECUTION_HEADER.TESTCASE_NUMBER
VERSION references EXECUTION_HEADER.VERSION
Transferable ? :True ; Mandatory ? :False ; Update Rule :Restricted
; Delete Rule :Restricted ;
FAILURES This table keeps a list of valid failure codes and their meaning.

Column Summary
Col. Seq Column Nulls ? Type
1 FAILURE_ID NOT NULL INTEGER ()
2 DESCRIPTION NULL VARCHAR2 (128)
3 CREATED_BY NULL VARCHAR2 (30)
4 CREATION_DATE NULL DATE
5 MODIFIED_BY NULL VARCHAR2 (30)
6 MODIFIED_DATE NULL DATE
Primary Key
Name Column
PK_FAILURES FAILURE_ID
FIELDS This table contains all of the fields used to define a record. The unique identifier, field_name_id is necessary to account for field names which are the same but may have different characteristics. For instance, CLI in a CDR is 10 characters long; however, CLI in an ECDR is 17 characters long.

Column Summary
Col. Seq Column Nulls ? Type
1 FIELD_NAME_ID NOT NULL INTEGER ()
2 FIELD_NAME NOT NULL VARCHAR2 (32)
3 FIELD_TYPE NOT NULL VARCHAR2 (32)
4 BIT_OR_BYTE NOT NULL INTEGER ()
5 FIELD_LENGTH NOT NULL INTEGER ()
6 DESCRIPTION NULL VARCHAR2 (128)
7 CREATED_BY NULL VARCHAR2 (30)
8 CREATION_DATE NULL DATE
9 MODIFIED_BY NULL VARCHAR2 (30)
10 MODIFIED_DATE NULL DATE
Primary Key
Name Column
PK_FIELDS FIELD_NAME_ID
Foreign Keys
FK_REF_30724
FIELD_TYPE references FIELD_TYPES.FIELD_TYPE
Transferable ? :True ; Mandatory ? :False ; Update Rule :Restricted
; Delete Rule :Restricted ;
Check Constraints
Name Where Validate Clause
BITBYTE BIT_OR_BYTE in (1,8)
FIELD_TYPES This table contains a list of valid field types. These are the types which are handled by the record parsing software. Changes to this table must be coordinated with the programs which do the parsing.

Column Summary
Col. Seq Column Nulls ? Type
1 FIELD_TYPE NOT NULL VARCHAR2 (32)
2 CREATED_BY NULL VARCHAR2 (30)
3 CREATION_DATE NULL DATE
4 MODIFIED_BY NULL VARCHAR2 (30)
5 MODIFIED_DATE NULL DATE
Primary Key
Name Column
PK_FIELD_TYPES FIELD_TYPE Check Constraints
Name Where Validate Clause
VALIDFIELDTYPE FIELD_TYPE in
('INTEGER','ASCII', 'ENUM','TBCD','TIME
','RECTYPE')
FILTER This table has one entry for each filter.

Column Summary
Col. Seq Column Nulls ? Type
1 FILTER_ID NOT NULL INTEGER ()
2 FILTER_NAME NULL CHAR (16)
3 DESCRIPTION NULL VARCHAR2 (128)
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_FILTER FILTER_ID
FILTER_SPECIFICATION This table is used to store the regular expression, also known as Search Criteria Language (SCL), used as the filter specification. Many filter specifications may be used in a single filter.

Column Summary
Col. Seq Column Nulls ? Type
1 FILTER_ID NOT NULL INTEGER ()
2 SEQUENCE_NUMBER NOT NULL INTEGER ()
3 RECORD_TYPE_ID NULL INTEGER ()
4 SELECTION_CRITERIA NULL VARCHAR2 (512)
5 DESCRIPTION NULL VARCHAR2 (128)
6 CREATED_BY NULL VARCHAR2 (30)
7 CREATION_DATE NULL DATE
8 MODIFIED_BY NULL VARCHAR2 (30)
9 MODIFIED_DATE NULL DATE
Primary Key
Name Column
PK_FILTER_SPECIFICATION FILTER_ID
PK_FILTER_SPECIFICATION SEQUENCE_NUMBER
Foreign Keys
FK_REF_30733
FILTER_ID references FILTER.FILTER_ID
Transferable ? :True ; Mandatory ? :False ; Update Rule :Restricted
; Delete Rule :Restricted ;
FK_REF_3876
RECORD_TYPE_ID references RECORD_TYPES.RECORD_TYPE_ID
Transferable ? :True ; Mandatory ? :False ; Update Rule :Restricted
; Delete Rule :Restricted ;
GROUP_INFO Column Summary
Col. Seq Column Nulls ? Type
1 GROUP_ID NOT NULL NUMBER ()
2 GROUP_NAME NULL VARCHAR2 (30)
3 MANAGER_ID NULL NUMBER ()
Primary Key
Name Column
PK_GROUP_INFO GROUP_ID
LIST_X_VREQ This table associates a testcase list identifier to a verification. This association allows multiple list identifiers to be used in a single verification.

Column Summary
Col. Seq Column Nulls ? Type
1 VREQ_ID NOT NULL INTEGER ()
2 TESTCASE_LIST_ID NOT NULL INTEGER ()
Primary Key
Name Column
PK_LIST_X_VREQ VREQ_ID
PK_LIST_X_VREQ TESTCASE_LIST_ID
Foreign Keys -continued

```
FK_REF_43109
VREQ_ID references VERIFICATION_REQUEST_QUEUE.VREQ_ID
Transferable ? :True; Mandatory ? :False ; Update Rule :Restricted
; Delete Rule :Restricted ;
FK_REF_43113
TESTCASE_LIST_ID references
TESTCASE_LIST_HEADER.TESTCASE_LIST_ID
Transferable ? :True ; Mandatory ? :False; Update Rule :Restricted
; Delete Rule :Restricted ;
FK_REF_43117
VREQ_ID references VERIFICATION_HISTORY.VREQ_ID
Transferable ? :True ; Mandatory ? :False ; Update Rule :Restricted
; Delete Rule :Restricted ;
LOAD_X_DEVICE
```

This table associates a software load with an instance of a device. Since different software loads can be put on a device at any given time, time parameters are included.

```
Column Summary
Col. Seq Column Nulls ? Type
1 DEVICE_ID NOT NULL INTEGER ()
2 EFFECTIVE_TIME NOT NULL DATE
3 NOT_EFFECTIVE_TIME NULL DATE
4 SOFTWARE_LOAD_ID NULL INTEGER ()
5 DESCRIPTION NULL VARCHAR2 (128)
6 COMMENTS NULL VARCHAR2 (128)
7 CREATED_BY NULL VARCHAR2 (30)
8 CREATION_DATE NULL DATE
9 MODIFIED_BY NULL VARCHAR2 (30)
10 MODIFIED_DATE NULL DATE
Primary Key
Name Column
PK_LOAD_X_DEVICE DEVICE_ID
PK_LOAD_X_DEVICE EFFECTIVE_TIME
Foreign Keys
FK_REF_30754
DEVICE_ID references DEVICES.DEVICE_ID
Transferable ? :True ; Mandatory ? :False ; Update Rule :Restricted
; Delete Rule :Restricted ;
FK_REF_3887
SOFTWARE_LOAD_ID references
SOFTWARE_LOAD_RANKING.SOFTWARE_LOAD_ID
Transferable ? :True ; Mandatory ? :False ; Update Rule :Restricted
; Delete Rule :Restricted ;
PLATFORM
```

This table contains one entry for each platform. Examples of platform include "DMS", "DEX", "AXE", etc.

```
Column Summary
Col. Seq Column Nulls ? Type
1 PLATFORM_ID NOT NULL INTEGER ()
2 PLATFORM_NAME NULL CHAR (18)
3 EQUIPMENT_TYPE NULL INTEGER ()
4 VENDOR NULL VARCHAR2 (128)
5 CONTACT NULL VARCHAR2 (128)
6 EFFECTIVE_TIME NULL DATE
7 DESCRIPTION NULL VARCHAR2 (128)
```

-continued

```
8 CREATED_BY NULL VARCHAR2 (30)
9 CREATION_DATE NULL DATE
10 MODIFIED_BY NULL VARCHAR2 (30)
11 MODIFIED_DATE NULL DATE
Primary Key
Name Column
PK_PLATFORM PLATFORM_ID
Foreign Keys
FK_REF_30274
EQUIPMENT_TYPE references
EQUIPMENT_TYPES.EQUIPMENT_TYPE
Transferable ? :True ; Mandatory ? :False; Update Rule :Restricted
; Delete Rule :Restricted ;
PLATFORM_RANKING
```

This table contains information which the verification process uses in determining the template to be applied to a verification attempt.

```
Column Summary
Col. Seq Column Nulls ? Type
1 PLATFORM_ID NOT NULL INTEGER ()
2 RANKING NOT NULL INTEGER ()
3 TEMPLATE_PLATFORM_ID NOT NULL INTEGER ()
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_PLATFORM_RANKING PLATFORM_ID
PK_PLATFORM_RANKING RANKING
PK_PLATFORM_RANKING TEMPLATE_PLATFORM_ID
Foreign Keys
FK_REF_30347
PLATFORM_ID references PLATFORM.PLATFORM_ID
Transferable ? :True ; Mandatory ? :False ; Update Rule :Restricted
; Delete Rule :Restricted ;
PROBLEM_CODES
```

This table lists all known problem codes associated with a given record type and field.

```
Column Summary
Col. Seq Column Nulls ? Type
1 PROBLEM_CODE NOT NULL INTEGER ()
2 RECORD_TYPE_ID NOT NULL INTEGER ()
3 FIELD_NAME_ID NOT NULL INTEGER ()
4 SOFTWARE_LOAD_ID NOT NULL INTEGER ()
5 PROBLEM_DESC NULL VARCHAR2 (128)
6 CREATED_BY NULL VARCHAR2 (30)
7 CREATION_DATE NULL DATE
```

8 MODIFIED_BY NULL VARCHAR2 (30)
9 MODIFIED_DATE NULL DATE
Primary Key
Name Column
PK_PROBLEM_CODES PROBLEM_CODE
PK_PROBLEM_CODES RECORD_TYPE_ID
PK_PROBLEM_CODES FIELD_NAME_ID
PK_PROBLEM_CODES SOFTWARE_LOAD_ID
Foreign Keys
FK_REF_37439
RECORD_TYPE_ID references RECORD_TYPES.RECORD_TYPE_ID
Transferable ? :True ; Mandatory ? :False ; Update Rule :Restricted
; Delete Rule :Restricted ;
FK_REF_37443
FIELD_NAME_ID references FIELDS.FIELD_NAME_ID
Transferable ? :True; Mandatory ? :False; Update Rule :Restricted
; Delete Rule :Restricted ;
RECORD_TYPES This table contains one entry for each type of record that is processed by the TEAMS server. All records defined here must be of fixed length with fixed length fields.

Column Summary
Col. Seq Column Nulls ? Type
1 RECORD_TYPE_ID NOT NULL INTEGER ()
2 RECORD_TYPE NULL VARCHAR2 (16)
3 DESCRIPTION NULL VARCHAR2 (128)
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_RECORD_TYPES RECORD_TYPE_ID
RECORD_TYPE_FIELD_NAME This table contains the fields in sequence for any record type.

Column Summary
Col. Seq Column Nulls ? Type
1 RECORD_TYPE_ID NOT NULL INTEGER ()
2 SEQUENCE NOT NULL INTEGER ()
3 FIELD_NAME_ID NOT NULL INTEGER ()
4 FIELD_LEN_OVERRIDE NULL INTEGER ()
5 EXTRACTOR NULL NUMBER (1)
6 FILL_CHAR NULL CHAR (1)
7 BIT_POS_OVERRIDE NULL INTEGER ()
8 CREATED_BY NULL VARCHAR2 (30)
9 CREATION_DATE NULL DATE
10 MODIFIED_BY NULL VARCHAR2 (30)
11 MODIFIED_DATE NULL DATE
Primary Key
Name Column
PK_RECORD_TYPE_FIELD_NAME SEQUENCE
Foreign Keys
FK_REF_30683
RECORD_TYPE_ID references RECORD_TYPES.RECORD_TYPE_ID
Transferable ? :True ; Mandatory ? :False ; Update Rule :Restricted
; Delete Rule :Restricted ;
FK_REF_30712
FIELD_NAME_ID references FIELDS.FIELD_NAME_ID
Transferable ? :True ; Mandatory ? :False ; Update Rule :Restricted
; Delete Rule :Restricted ;
Check Constraints
Name Where Validate Clause
PK_EXTRACTOR extractor in (0,1,2,3)
RESOURCES This table includes all the devices which may be part of a resource type. For instance, it would indicate that the device "RES1" (i.e. 301), may be used as a "orig_sw", a "term_sw", or a "bridging_sw."

Column Summary
Col. Seq Column Nulls ? Type
1 RESOURCE_ID NOT NULL INTEGER ()
2 RESOURCE_TYPE_ID NOT NULL INTEGER ()
3 RESOURCE_DESC NULL CHAR (18)
4 DEVICE_ID NULL INTEGER ()
5 CREATED_BY NULL VARCHAR2 (30)
6 CREATION_DATE NULL DATE
7 MODIFIED_BY NULL VARCHAR2 (30)
8 MODIFIED_DATE NULL DATE
Primary Key
Name Column
PK_RESOURCES RESOURCE_ID
Foreign Keys -continued

```
FK_REF_30766
DEVICE_ID references DEVICES.DEVICE_ID
Transferable ? :True ; Mandatory ? :False ; Update Rule :Restricted
; Delete Rule :Restricted ;
FK_REF_30775
RESOURCE_TYPE_ID references
RESOURCE_TYPES.RESOURCE_TYPE_ID
Transferable ? :True ; Mandatory ? :False ; Update Rule :Restricted
; Delete Rule :Restricted ;
RESOURCE_TYPES
```

This table contains the type of resource that is being tested. Examples of resource type may include "orig_sw", "term_sw", "any_sw", "bridging_sw", etc.

```
Column Summary
Col. Seq Column Nulls ? Type
1 RESOURCE_TYPE_ID NOT NULL INTEGER ()
2 RESOURCE_TYPE NULL CHAR (18)
3 CREATED_BY NULL VARCHAR2 (30)
4 CREATION_DATE NULL DATE
5 MODIFIED_BY NULL VARCHAR2 (30)
6 MODIFIED_DATE NULL DATE
Primary Key
Name Column
PK_RESOURCE_TYPES RESOURCE_TYPE_ID
SESSION_HISTORY
```

This table is used to record the date and time that a user logged into the system and when the user logged out of the system.

```
Column Summary
Col. Seq Column Nulls ? Type
1 USER_ID NOT NULL NUMBER ()
2 LOGIN_TIME NOT NULL DATE
3 LOGOUT_TIME NULL DATE
Primary Key
Name Column
PK_SESSION_HISTORY USER_ID
PK_SESSION_HISTORY LOGIN_TIME
Foreign Keys
FK_REF_39962
USER_ID references USER_INFO.USER_ID
Transferable ? :True ; Mandatory ? :False ; Update Rule :Restricted
; Delete Rule :Restricted ;
SOFTWARE_LOAD_RANKING
```

This table has an entry for each software load being tested by TEAMS.
Associated with each entry is a numeric ranking. This ranking indicat es which software load succeeds or preceeds another. A higher ranking indicates that this software load supercedes a software load with a lo wer ranking.

Software loads are specific to a platform.

```
Column Summary
Col. Seq Column Nulls ? Type
1 SOFTWARE_LOAD_ID NOT NULL INTEGER ()
2 SOFTWARE_LOAD NULL CHAR (18)
3 PLATFORM_ID NOT NULL INTEGER ()
4 RANKING NULL INTEGER ()
5 PRODUCTION_STATUS NULL INTEGER ()
6 COMMENTS NULL VARCHAR2 (128)
7 CREATED_BY NULL VARCHAR2 (30)
8 CREATION_DATE NULL DATE
9 MODIFIED_BY NULL VARCHAR2 (30)
10 MODIFIED_DATE NULL DATE
Primary Key
Name Column
PK_SOFTWARE_LOAD_RANKING SOFTWARE_LOAD_ID
Foreign Keys
FK_REF_3893
PLATFORM_ID references PLATFORM.PLATFORM_ID
Transferable ? :True ; Mandatory ? :False ; Update Rule :Restricted
; Delete Rule :Restricted ;
SPECID_X_LOAD
```

This table is used to associate a software load to a billing specification. A new billing specification usually requires a new software load. A new software load does not necessarily mean a new billing specification.

```
Column Summary
Col. Seq Column Nulls ? Type
1 SOFTWARE_LOAD_ID NOT NULL INTEGER ()
2 SPEC_ID NULL INTEGER ()
3 CREATED_BY NULL VARCHAR2 (30)
4 CREATION_DATE NULL DATE
5 MODIFIED_BY NULL VARCHAR2 (30)
6 MODIFIED_DATE NULL DATE
Primary Key
Name Column
PK_SPECID_X_LOAD SOFTWARE_LOAD_ID
PK_SPECID_X_LOAD SPEC_ID
Foreign Keys
FK_REF_3890
SOFTWARE_LOAD_ID references
SOFTWARE_LOAD_RANKING.SOFTWARE_LOAD_ID
Transferable ? :True ; Mandatory ? :False ; Update Rule :Restricted
; Delete Rule :Restricted ;
FK_REF_3978
SPEC_ID references BILLING_SPECIFICATION.SPEC_ID
Transferable ? :True ; Mandatory ? :False ; Update Rule :Restricted
; Delete Rule :Restricted ;
SYSTEM_PRIVS
Column Summary
Col. Seq Column Nulls ? Type
1 SYSTEM NOT NULL VARCHAR2 (30)
2 PRIVILEGE NOT NULL VARCHAR2 (10)
3 DESCRIPTION NULL VARCHAR2 (80)
4 OWNER NULL VARCHAR2 (30)
Primary Key
Name Column
PK_SYSTEM_PRIVS SYSTEM
PK_SYSTEM_PRIVS PRIVILEGE
TEMPLATE
```

This table contains one entry for each template version.

```
Column Summary
Col. Seq Column Nulls ? Type
1 TEMPLATE_ID NOT NULL INTEGER ()
2 RECORD_TYPE_ID NULL INTEGER ()
```

-continued

```
3 SEARCH_EXPRESSION NULL VARCHAR2 (128)
4 CREATED_BY NULL VARCHAR2 (30)
5 CREATION_DATE NULL DATE
Primary Key
Name Column
PK_TEMPLATE TEMPLATE_ID
Foreign Keys
FK_REF_3909
RECORD_TYPE_ID references RECORD_TYPES.RECORD_TYPE_ID
Transferable ? :True; Mandatory ? :False ; Update Rule :Restricted
; Delete Rule :Restricted ;
TEMPLATE_EXPECTED_VALUES
```

This table contains the expected values for each field in a template. In addition, a compare operator is included.

```
Column Summary
Col. Seq Column Nulls ? Type
1 TEMPLATE_ID NOT NULL INTEGER ()
2 FIELD_NAME_ID NOT NULL INTEGER ()
3 FIELD_VALUE NULL VARCHAR2 (128)
4 COMPARE_OPERATOR NULL CHAR (2)
Primary Key
Name Column
PK_TEMPLATE_EXPECTED_VALU TEMPLATE_ID
ES
PK_TEMPLATE_EXPECTED_VALU FIELD_NAME_ID
ES
Foreign Keys
FK_REF_30709
FIELD_NAME_ID references FIELDS.FIELD_NAME_ID
Transferable ? :True ; Mandatory ? :False ; Update Rule :Restricted
; Delete Rule :Restricted ;
FK_REF_3912
TEMPLATE_ID references TEMPLATE.TEMPLATE_ID
Transferable ? :True ; Mandatory ? :False ; Update Rule :Restricted
; Delete Rule :Restricted ;
FK_REF_3915
COMPARE_OPERATOR references
COMPARE_OPERATORS.COMPARE_OPERATOR
Transferable ? :True ; Mandatory ? :False ; Update Rule :Restricted
; Delete Rule :Restricted ;
TESTCASE
```

```
Column Summary
Col. Seq Column Nulls ? Type
1 TESTCASE_SECTION NOT NULL VARCHAR2 (6)
2 TESTCASE_NUMBER NOT NULL NUMBER ()
3 DATE_CREATED NULL DATE
4 APPL_USER NOT NULL VARCHAR2 (30)
5 ORACLE_ID NULL VARCHAR2 (30)
6 RESPONSIBLE_USER NULL VARCHAR2 (30)
7 PURPOSE NULL VARCHAR2 (480)
8 EXECUTION_PLATFORM NULL VARCHAR2 (4)
9 FEATURE NULL VARCHAR2 (200)
10 SUB_FEATURE NULL VARCHAR2 (200)
11 SPECIAL_INFORMATION NULL VARCHAR2 (480)
12 VIPER_TYPE NULL VARCHAR2 (10)
Primary Key
Name Column
PK_TESTCASE TESTCASE_SECTION
PK_TESTCASE TESTCASE_NUMBER
TESTCASE_LIST_ENTRIES
Column Summary
Col. Seq Column Nulls ? Type
1 TESTCASE_LIST_ID NOT NULL INTEGER ()
2 TESTCASE_SECTION NOT NULL VARCHAR2 (6)
3 TESTCASE_NUMBER NOT NULL NUMBER ()
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
```

```
-continued

Name Column
PK_TESTCASE_LIST_ENTRIES TESTCASE_LIST_ID
PK_TESTCASE_LIST_ENTRIES TESTCASE_SECTION
PK_TESTCASE_LIST_ENTRIES TESTCASE_NUMBER
Foreign Keys
FK_REF_41553
TESTCASE_LIST_ID references
TESTCASE_LIST_HEADER.TESTCASE_LIST_ID
Transferable ? :True ; Mandatory ? :False ; Update Rule :Restricted
; Delete Rule :Restricted ;
FK_REF_44741
TESTCASE_SECTION references TESTCASE.TESTCASE_SECTION
TESTCASE_NUMBER references TESTCASE.TESTCASE_NUMBER
Transferable ? :True ; Mandatory ? :False ; Update Rule :Restricted
; Delete Rule :Restricted ;
TESTCASE_LIST_HEADER
```

```
Column Summary
Col. Seq Column Nulls ? Type
1 TESTCASE_LIST_ID NOT NULL INTEGER ()
2 TESTCASE_LIST_TYPE_ID NULL INTEGER ()
3 TESTCASE_LIST_NAME NULL VARCHAR2 (20)
4 DESCRIPTION NULL VARCHAR2 (128)
5 CREATED_BY NULL VARCHAR2 (30)
6 CREATION_DATE NULL DATE
7 MODIFIED_BY NULL VARCHAR2 (30)
8 MODIFIED_DATE NULL DATE
Primary Key
Name Column
PK_TESTCASE_LIST_HEADER TESTCASE_LIST_ID
Foreign Keys
FK_REF_41557
TESTCASE_LIST_TYPE_ID references
TESTCASE_LIST_TYPES.TESTCASE_LIST_TYPE_ID
Transferable ? :True ; Mandatory ? :False ; Update Rule :Restricted
; Delete Rule :Restricted ;
TESTCASE_LIST_TYPES
```

```
Column Summary
Col. Seq Column Nulls ? Type
1 TESTCASE_LIST_TYPE_ID NOT NULL INTEGER ()
2 TESTCASE_LIST_TYPE NULL VARCHAR2 (20)
3 CREATED_BY NULL VARCHAR2 (30)
4 CREATION_DATE NULL DATE
5 MODIFIED_BY NULL VARCHAR2 (30)
6 MODIFIED_DATE NULL DATE
7 RETENTION_DAYS NULL NUMBER (4)
Primary Key
Name Column
PK_TESTCASE_LIST_TYPES TESTCASE_LIST_TYPE_ID
TESTCASE_X_TEMPLATE
```

Association table for testcase, template, resource_types, platform and
software_load_ranking. This table is used to determine which templates to use in a verification request.

Column Summary
Col. Seq Column Nulls ? Type

1 TESTCASE_SECTION NOT NULL VARCHAR2 (6)
2 TESTCASE_NUMBER NOT NULL NUMBER ()
3 TESTCASE_TEMPLATE NOT NULL INTEGER ()
4 RESOURCE_TYPE_ID NULL INTEGER ()
5 PLATFORM_ID NULL INTEGER ()
6 SOFTWARE_LOAD_ID NULL INTEGER ()
7 TEMPLATE_VERSION NOT NULL INTEGER ()
8 TEMPLATE_ID NULL INTEGER ()
9 CREATED_BY NULL VARCHAR2 (30)
10 CREATION_DATE NULL DATE
11 MODIFIED_BY NULL VARCHAR2 (30)
12 MODIFIED_DATE NULL DATE
Primary Key
Name Column
PK_TESTCASE_X_TEMPLATE TESTCASE_SECTION
PK_TESTCASE_X_TEMPLATE TESTCASE_NUMBER
PK_TESTCASE_X_TEMPLATE TESTCASE_TEMPLATE
Foreign Keys
FK_REF_30571
TEMPLATE_ID references TEMPLATE.TEMPLATE_ID
Transferable ? :True ; Mandatory ? :False ; Update Rule :Restricted
; Delete Rule :Restricted ;
FK_REF_3902
RESOURCE_TYPE_ID references
RESOURCE_TYPES.RESOURCE_TYPE_ID
Transferable ? :True ; Mandatory ? :False ; Update Rule :Restricted
; Delete Rule :Restricted
FK_REF_3978
TESTCASE_SECTION references TESTCASE.TESTCASE_SECTION
TESTCASE_NUMBER references TESTCASE.TESTCASE_NUMBER
Transferable ? :True ; Mandatory ? :False ; Update Rule :Restricted
; Delete Rule :Restricted ;
USER_INFO Column Summary
Col. Seq Column Nulls ? Type 1 USER_ID NOT NULL NUMBER ()
2 LOGON_NAME NULL VARCHAR2 (30)
3 FIRST_NAME NULL VARCHAR2 (30)
4 LAST_NAME NULL VARCHAR2 (30)
5 PASSWORD NULL VARCHAR2 (32)
6 PHONE_NUMBER NULL VARCHAR2 (20)
7 PAGER_NUMBER NULL VARCHAR2 (30)
8 LOCATION NULL VARCHAR2 (3)
9 DEPARTMENT NULL VARCHAR2 (4)
10 CUBE_NUMBER NULL VARCHAR2 (12)
11 EMAIL_ADDRESS NULL VARCHAR2 (50)
12 GROUP_ID NULL NUMBER ()
13 CREATION_DATE NULL DATE
14 END_DATE NULL DATE
Primary Key
Name Column
PK_USER_INFO USER_ID
Foreign Keys
FK_REF_39966
GROUP_ID references GROUP_INFO.GROUP_ID
Transferable ? :True ; Mandatory ? :False ; Update Rule :Restricted
; Delete Rule :Restricted ;
USER_SYSTEM Column Summary
Col. Seq Column Nulls ? Type 1 USER_ID NOT NULL NUMBER ()
2 SYSTEM NOT NULL VARCHAR2 (30)
3 PRIVILEGE NOT NULL VARCHAR2 (10)
Primary Key
Name Column
PK_USER_SYSTEM USER_ID Column Summary
Col. Seq Column Nulls ? Type PK_USER_SYSTEM SYSTEM
PK_USER_SYSTEM PRIVILEGE
Foreign Keys
FK_REF_39969
USER_ID references USER_INFO.USER_ID
Transferable ? :True ; Mandatory ? :False ; Update Rule :Restricted
; Delete Rule :Restricted ;
FK_REF_39973
SYSTEM references SYSTEM_PRIVS.SYSTEM
PRIVILEGE references SYSTEM_PRIVS.PRIVILEGE
Transferable ? :True ; Mandatory ? :False ; Update Rule :Restricted
; Delete Rule :Restricted ;
VERIFICATION_DATA Verification data contains information regarding failed fields. The failed fields are those in which the actual resultes did not match the expected values.

The user may specify that certain failures are expected and is assigned a problem code.

Column Summary
Col. Seq Column Nulls ? Type

1 VREQ_ID NOT NULL INTEGER ()
2 FIELD_NAME_ID NOT NULL INTEGER ()
3 FIELD_VALUE NULL VARCHAR2 (128)
4 FAILURE_ID NULL INTEGER ()
5 PROBLEM_ID NULL INTEGER ()
6 TEMPLATE_ID NULL INTEGER ()
Primary Key
Name Column
PK_VERIFICATION_DATA VREQ_ID
PK_VERIFICATION_DATA FIELD_NAME_ID
Foreign Keys
FK_REF_1113
VREQ_ID references VERIFICATION_REQUEST_QUEUE.VREQ_ID
Transferable ? :True ; Mandatory ? :False ; Update Rule :Restricted
; Delete Rule :Restricted ;
FK_REF_30292
FAILURE_ID references FAILURES.FAILURE_ID
Transferable ? :True ; Mandatory ? :False ; Update Rule :Restricted
; Delete Rule :Restricted ;
FK_REF_30655
PROBLEM_ID references
VERIFICATION_PROBLEM_CODES.PROBLEM_ID
Transferable ? :True ; Mandatory ? :False ; Update Rule :Restricted
; Delete Rule :Restricted ;
FK_REF_3933
TEMPLATE_ID references TEMPLATE.TEMPLATE_ID
Transferable ? :True ; Mandatory ? :False ; Update Rule :Restricted
; Delete Rule :Restricted ;
VERIFICATION_DATA_HISTORY This table is an archive of the verification_data table.

Column Summary
Col. Seq Column Nulls ? Type

1 VREQ_ID NOT NULL INTEGER ()
2 FIELD_NAME_ID NOT NULL INTEGER ()
3 FIELD_VALUE NULL VARCHAR2 (128)
4 FAILURE_ID NULL INTEGER ()
5 PROBLEM_ID NULL INTEGER ()
6 TEMPLATE_ID NULL INTEGER ()
Primary Key
Name Column Column Summary
Col. Seq Column Nulls ? Type PK_VERIFICATION_DATA_HIST VREQ_ID
ORY
PK_VERIFICATION_DATA_HIST FIELD_NAME_ID
ORY
Foreign Keys
FK_REF_1111
VREQ_ID references VERIFICATION_HISTORY.VREQ_ID
Transferable ? :True ; Mandatory ? :False ; Update Rule :Restricted
; Delete Rule :Restricted ;
FK_REF_32082
FAILURE_ID references FAILURES.FAILURE_ID
Transferable ? :True ; Mandatory ? :False ; Update Rule :Restricted
; Delete Rule :Restricted ;
FK_REF_32085
PROBLEM_ID references
VERIFICATION_PROBLEM_CODES.PROBLEM_ID
Transferable ? :True ; Mandatory ? :False ; Update Rule :Restricted
; Delete Rule :Restricted ;
FK_REF_3936
TEMPLATE_ID references TEMPLATE.TEMPLATE_ID
Transferable ? :True ; Mandatory ? :False ; Update Rule :Restricted
; Delete Rule :Restricted ;
VERIFICATION_HISTORY This table is an archive of the verification request queue.

Column Summary
Col. Seq Column Nulls ? Type

1 VREQ_ID NOT NULL INTEGER ()
2 STATUS NULL INTEGER ()
3 BRFONLY NULL INTEGER ()
4 MAXBRFTORETURN NULL INTEGER ()
5 TESTCASE_SECTION NOT NULL VARCHAR2 (6)
6 TESTCASE_NUMBER NOT NULL NUMBER ()
7 REQUESTOR_ID NULL NUMBER ()
8 SELECTION_CRITERIA NULL VARCHAR2 (512)
9 OVERRIDE_VARS NULL VARCHAR2 (128)
10 REQUEST_RECVD_DT NULL DATE
11 REQUEST_COMPL_DT NULL DATE
12 REQUEST_PRIORITY NULL INTEGER ()
13 EXECUTION_START_DT NULL DATE
14 EXECUTION_END_DT NULL DATE
15 ORIG_SWITCH_ID NULL INTEGER ()
16 TERM_SWITCH_ID NULL INTEGER ()
17 RESOURCE_ID NULL INTEGER ()
18 ORIG_SWITCH_LOAD_ID NULL INTEGER ()
19 TERM_SWITCH_LOAD_ID NULL INTEGER ()
20 RESOURCE_LOAD_ID NULL INTEGER ()
21 JOB_ID NULL INTEGER ()
22 NUM_RETRIES NULL INTEGER ()
23 SEARCH_START_DT NULL DATE
24 PURGE_DT NULL DATE
Primary Key
Name Column
PK_VERIFICATION_HISTORY VREQ_ID
Foreign Keys
FK_REF_44751
TESTCASE_SECTION references TESTCASE.TESTCASE_SECTION
TESTCASE_NUMBER references TESTCASE.TESTCASE_NUMBER
Transferable ? :True ; Mandatory ? :False ; Update Rule :Restricted
; Delete Rule :Restricted ;
VERIFICATION_PROBLEM_CODES Problem codes are assigned whenever tehre is a known problem yet the tester wishes to pass the test. This table is a list of all valid pro blem codes.

Column Summary
Col. Seq Column Nulls ? Type

1 PROBLEM_ID NOT NULL INTEGER ()
2 DESCRIPTION NULL VARCHAR2 (128)
3 SOFTWARE_LOAD_ID NULL INTEGER ()
4 CREATED_BY NULL VARCHAR2 (30)
5 CREATION_DATE NULL DATE
6 MODIFIED_BY NULL VARCHAR2 (30)
7 MODIFIED_DATE NULL DATE
Primary Key
Name Column
PK_VERIFICATION_PROBLEM_C PROBLEM_ID
ODES
VERIFICATION_REQUEST_QUEUE This table keeps track of all current verification requests received from the clients. Updates are made to this table as progress is made on completing the verification.

Column Summary
Col. Seq Column Nulls ? Type

1 VREQ_ID NOT NULL INTEGER ()
2 STATUS NULL INTEGER ()
3 BRFONLY NULL INTEGER ()
4 MAXBRFTORETURN NULL INTEGER ()
5 TESTCASE_SECTION NOT NULL VARCHAR2 (6)
6 TESTCASE_NUMBER NOT NULL NUMBER ()
7 REQUESTOR_ID NULL NUMBER ()
8 SELECTION_CRITERIA NULL VARCHAR2 (512)
9 OVERRIDE_VARS NULL VARCHAR2 (128)
10 REQUEST_RECVD_DT NULLDATE
11 REQUEST_COMPL_DT NULL DATE
12 REQUEST_PRIORITY NULL INTEGER ()
13 EXECUTION_START_DT NULL DATE
14 EXECUTION_END_DT NULL DATE
15 SESSION_ID NULL INTEGER ()
16 ORIG_SWITCH_ID NULL INTEGER ()
17 TERM_SWITCH_ID NULL INTEGER ()
18 RESOURCE_ID NULL INTEGER()
19 ORIG_SWITCH_LOAD_ID NULL INTEGER ()
20 TERM_SWITCH_LOAD_ID NULL INTEGER ()
21 RESOURCE_LOAD_ID NULL INTEGER ()
22 JOB_ID NULL INTEGER ()
23 NUM_RETRIES NULL INTEGER ()
24 SEARCH_START_DT NULL DATE
Primary Key
Name Column
PK_VERIFICATION_REQUEST_Q VREQ_ID
UEUE
Foreign Keys
FK_REF_44746
TESTCASE_SECTION references TESTCASE.TESTCASE_SECTION
TESTCASE_NUMBER references TESTCASE.TESTCASE_NUMBER
Transferable ? :True ; Mandatory ? :False ; Update Rule :Restricted
; Delete Rule :Restricted ;
VREQ_X_BILLING_X_TEMPLATE This association table is used to link verification requests with a billing record.

This allows multiple billing records to be associated with a single verification request. Also, the template identifier is included so th at a template is associated with a verification request.

This table is populated by the verification process. When template identifiers are found, rows are inserted. When the billing records are found, the rows are updated.

Column Summary
Col. Seq Column Nulls ? Type

1 VREQ_ID NOT NULL INTEGER ()
2 BILLING_RECORD_ID NOT NULL INTEGER ()
3 TEMPLATE_ID NOT NULL INTEGER ()
Primary Key
Name Column
PK_VREQ_X_BILLING_X_TEMPL VREQ_ID
ATE
PK_VREQ_X_BILLING_X_TEMPL BILLING_RECORD_ID
ATE
PK_VREQ_X_BILLING_X_TEMPL TEMPLATE_ID
ATE
Foreign Keys
FKREF_1112
BILLING_RECORD_ID references
BILLING_RECS_RECEIVED_KEYS.BILLING_RECORD_ID
Transferable ? :True ; Mandatory ? :False ; Update Rule :Restricted
; Delete Rule :Restricted ;
FK_REF_3930
TEMPLATE_ID references TEMPLATE.TEMPLATE_ID
Transferable ? :True ; Mandatory ? :False ; Update Rule :Restricted
; Delete Rule :Restricted ;
FK_REF_3978
VREQ_ID references VERIFICATION_REQUEST_QUEUE.VREQ_
ID
Transferable ? :True ; Mandatory ? :False ; Update Rule :Restricted
; Delete Rule :Restricted ;
VREQ_X_BILLING_X_TEMPLATE_HIST This table is an archive of the vreq_x_billing_x_template association table.

Column Summary
Col. Seq Column Nulls ? Type

1 VREQ_ID NOT NULL INTEGER ()
2 TEMPLATE_ID NOT NULL INTEGER ()
3 ARCHIVE_ID NOT NULL INTEGER ()
Primary Key
Name Column
PK_VREQ_X_BILLING_X_TEMPL VREQ_ID
ATE_H
PK_VREQ_X_BILLING_X_TEMPL TEMPLATE_ID
ATE_H
PK_VREQ_X_BILLING_X_TEMPL ARCHIVE_ID
ATE_H
Foreign Keys
FK_REF_32072
VREQ_ID references VERIFICATION_HISTORY.VREQ_ID
Transferable ? :True ; Mandatory ? :False ; Update Rule :Restricted
; Delete Rule :Restricted ;
FK_REF_32079
ARCHIVE_ID references.
BILLING_RECS_ARCHIVE_KEYS.ARCHIVE_ID
Transferable ? :True ; Mandatory ? :False ; Update Rule :Restricted
; Delete Rule :Restricted ;
FK_REF_3984
TEMPLATE_ID references TEMPLATE.TEMPLATE_ID
Transferable ? :True ; Mandatory ? :False ; Update Rule :Restricted
; Delete Rule :Restricted ;

While the invention is described in terms of preferred embodiments in a specific system environment, those skilled in the art will recognize that the invention can be practiced, with modification, in other and different hardware and software environments within the spirit and scope of the appended claims.

Appendix

FATCAT Protocol

1. Introduction

This document describes the protocol between a FATCAT Test Driver (the controller) and the FATCAT Test Objects (the ARU and the Manual Operator Console).

2. Protocol Features

The FATCAT protocol provides the following features:

The phone call connecting and disconnecting at the Test Objects is communicated to the Test Driver.

The Test Driver can synchronize with the Test Object's current state. This ensures that input is sent only when the Test Object is ready for it (otherwise the Test Object discards it), and that originator disconnect is performed by the Test Driver at the fight time.

Various data, such as the Billing detail record, can be sent from the Test Objects to the Test Driver and saved by the Test Driver.

Current versions of the Test Objects can be considered to be functioning properly if (1) data from previous versions that should be the same as data from the current versions is the same, and (2) the Test Objects get all the way through the expected sequence of states.

3. Message Descriptions

There are the following messages:
1. ARU TESTMODE
2. ARU Beginning of Call
3. ARU End of Call
4. ARU Header Info
5. ARU Logrec
6. ARU Transfer
7. Manual Console TESTMODE
8. Manual Console Beginning of Call
9. Manual Console End of Call
10. Manual Console Header Info
11. Manual Console Logrec
12. Manual Console Synch Notify
13. Manual Console Synched
14. Manual Console State Query
15. Manual Console State Query Response . . . and Acks for each An ARU TESTMODE message (sent from Test Driver to ARU) tells the ARU what mode to be in (None, Read, Create, or Read/Create (aka Both)) and specifies which ARU port to use.

An ARU Beginning of Call message (sent from ARU to Test Driver) specifies that call processing has begun at the ARU.

An ARU End of Call message (sent from ARU to Test Driver) specifies that call processing has ended at the ARU and whether the call has been transferred to a Manual Console. This is not the same as the call disconnecting, for further call processing can occur after that (such as the creation of the BDR).

An ARU Header Info message (sent from ARU to Test Driver) passes ARU information to the Test Driver for inclusion in the logfile header.

An ARU Logrec message (sent from ARU to Test Driver) contains a logfile record. The Test Driver writes this logfile record to the output logfile.

An ARU Transfer message specifies that the call has been transferred to a Manual Console.

A Manual Console TESTMODE message (sent from Test Driver to Manual Console) tells the Manual Console what mode to be in (None, Read, Create, or Read/Create (aka Both)).

A Manual Console Beginning of Call message (sent from Manual Console to Test Driver) specifies that call processing has begun at the Manual Console.

A Manual Console End of Call message (sent from Manual Console to Test Driver) specifies that call processing has ended at the Manual Console. This is not the same as the call disconnecting, for further call processing can occur after that (such as the creation of the BDR).

A Manual Console Header Info message (sent from Manual Console to Test Driver) passes Manual Console information to the Test Driver for inclusion in the logfile header.

A Manual Console Logrec message (sent from Manual Console to Test Driver, and from Test Driver to Manual Console) contains a logfile record. The Manual Console obtains synch info or a keystroke from a received logfile record. The Test Driver writes a received logfile record to the output logfile.

A Manual Console Synch Notify message (sent from Test Driver to Manual Console) instructs the Manual Console to send a Manual Console Synched message when the Manual Console is synchronized.

A Manual Console Synched message (sent from Manual Console to Test Driver) specifies that the Manual Console is synchronized.

A Manual Console State Query message (sent from Test Driver to Manual Console) prompts the Manual Console to send back a Manual Console State Query Response message.

A Manual Console State Query Response message (sent from Manual Console to Test Driver) gives the current script state of the Manual Console.

4. Message Flows

These messages are sent from the Test Driver to the ARU:
1. ARU TESTMODE.

These messages are sent from the ARU to the Test Driver:
1. ARU Beginning of Call.
2. ARU End of Call.
3. ARU Header Info.
4. ARU Logrec.
5. ARU Transfer.

These messages are sent from the Test Driver to the Manual Console:
1. Manual Console TESTMODE.
2. Manual Console Logrec.
3. Manual Console Synch Notify.
4. Manual Console State Query.

These messages are sent from the Manual Console to the Test Driver:
1. Manual Console Beginning of Call.
2. Manual Console End of Call.
3. Manual Console Header Info.
4. Manual Console Logrec.
5. Manual Console Synched.
6. Manual Console State Query Response.

5. Message Format Summary

The general message format is as follows:

| Field | Type | Len | Value | Description |
| --- | --- | --- | --- | --- |
| NIDS Header | 8 bytes | 8 | Any | FATCAT uses the NIDS client library to send IP messages. The NIDS client library places its own 8-byte header on the front of each message. This header is not used by FATCAT and is not included in the message length. |
| Length | Unsigned Integer | 2 | 5..n | Message length. Does not include length of NIDS header. At least 5 since that is the size if there is no data field. |
| Sequence Number | Unsigned Integer | 2 | 1..n | Message sequence number, starting at 1 and increasing by 1 for each new message. |
| Type | Unsigned Char | 1 | See "*" below. | Message type. This specifies the kind of message. Not used for Testmode messages since they can occur outside the context of a call and would prevent the user from rebooting or switching to a different Test Object or a different Test Driver. |
| Data (optional) | Bytes | 0..n | Any | This field is optional, and contains any additional data. This includes synch info, BDRs, etc. |

*The Type field has the following values by message type:

| Message | Regular | Ack |
| --- | --- | --- |
| ARU Testmode | 0x01 | 0x81 |
| ARU Beginning of Call | 0x02 | 0x82 |
| ARU End of Call | 0x03 | 0x83 |
| ARU Header Info | 0x04 | 0x84 |
| ARU Logrec | 0x05 | 0x85 |
| ARU Transfer | 0x06 | 0x86 |
| Manual Console Testmode | 0x41 | 0xC1 |
| Manual Console Beginning of Call | 0x42 | 0xC2 |
| Manual Console End of Call | 0x43 | 0xC3 |
| Manual Console Header Info | 0x44 | 0xC4 |
| Manual Console Logrec | 0x45 | 0xC5 |
| Manual Console Synch Notify | 0x46 | 0xC6 |
| Manual Console Synched | 0x47 | 0xC7 |
| Manual Console State Query | 0x48 | 0xC8 |
| Manual Console State Query Response | 0x49 | 0xC9 |

Bit 7 set (0x80) indicates an Ack.

Bit 6 set (0x40) indicates the Manual Console; clear indicates the ARU.

6. Message Format Detail

The format of each message is as follows (the 8-byte NIDS header is not shown):

| Message Type | Length | Sequence Number | Type | Data |
| --- | --- | --- | --- | --- |
| ARU Testmode | 8 | 0 | 0x01 | Byte: 0 = None, 1 = Read, 2 = Create, 3 = Both. Unsigned Int: ARU port number |
| ARU Testmode Ack | 5 | 0 | 0x81 | None |
| ARU Beginning of Call | 5 | 1 | 0x02 | None |
| ARU Beginning of Call Ack | 5 | 1 | 0x82 | None |
| ARU End of Call | 5 | >1 | 0x03 | None |
| ARU End of Call Ack | 5 | Same | 0x83 | None |
| ARU Header Info | 15 | >1 | 0x04 | 10-byte character string containing ARU version. Left-justified, blank-filled, no terminating 0. Example "95.3.1" |
| ARU Header Info Ack | 5 | Same | 0x84 | None |
| ARU Logrec | >5 | >1 | 0x05 | ARU logfile record. See document "Application Log Detail Design" for formats. |
| ARU Logrec Ack | 5 | Same | 0x85 | None |
| ARU Transfer | 5 | >1 | 0x06 | None |

-continued

| Message Type | Length | Sequence Number | Type | Data |
|---|---|---|---|---|
| ARU Transfer Ack | 5 | Same | 0x86 | None |
| Manual Console Testmode | 6 | 0 | 0x41 | Byte: 0 = None, 1 = Read, 2 = Create, 3 = Both |
| Manual Console Testmode Ack | 5 | 0 | 0xC1 | None |
| Manual Console Beginning of Call | 5 | 1 | 0x42 | None |
| Manual Console Beginning of Call Ack | 5 | 1 | 0xC2 | None |
| Manual Console End of Call | 5 | >1 | 0x43 | None |
| Manual Console End of Call Ack | 5 | Same | 0xC3 | None |
| Manual Console Header Info | 15 | >1 | 0x44 | Manual Console version. Left-justified, blank-filled, no terminating 0. Example: "macd420" |
| Manual Console Header Info Ack | 5 | Same | 0xC4 | None |
| Manual Console Logrec | >5 | >1 | 0x45 | Manual Console logfile record. See document "Application Log Detail Design" for formats. |
| Manual Console Logrec Ack | 5 | Same | 0xC5 | None |
| Manual Console Synch Notify | 5 | >1 | 0x46 | None |
| Manual Console Synch Notify Ack | 5 | Same | 0xC6 | None |
| Manual Console Synched | 5 | >1 | 0x47 | None |
| Manual Console Synched Ack | 5 | Same | 0xC7 | None |
| Manual Console State Query | 5 | >1 | 0x48 | None |
| Manual Console State Query Ack | 5 | Same | 0xC8 | None |
| Manual Console State Query Response | >5 | >1 | 0x49 | Manual Console logfile record. See document "Application Log Detail Design" for formats. |
| Manual Console State Query Response Ack | 5 | Same | 0xC9 | None |

7. Sequence Numbers

Sequence numbers are used in the messages as a means of detecting duplicate messages (a normal condition) and out-of-order messages (a program error). The first message sent for each test case starts at 1, and each new message increments the sequence number by one. An Ack message uses the same sequence number as the message being acked.

Testmode messages don't use sequence numbers (1) since they are asynchronous (i.e. processed immediately upon reception), and (2) so that the user can reboot a Test Driver or Test Object or move to a different one.

8. Sending and Receiving Messages

Each message is sent repeatedly until an Ack is received. Each message is sent 6 times in the first second (once every 0.2 seconds), then once per second thereafter. The initial burst during the first second prevents a large delay between sends if the first few sends are garbled or otherwise missed, but if a full second goes by without an Ack, a send is then done only once per second to decrease the amount of network traffic.

Once an Ack is received, the send of the next message is begun immediately. Because of this, the receiver must not Ack a message until it has verified that the message is valid. The Manual Console sits in a loop during a send and doesn't do anything else, including process received messages, which means that while the Manual Console is sending it does not Ack received messages. If the Test Driver does the same thing, deadlock results. Therefore, the Test Driver must continue to process received messages while sending.

9. Synchronization

During an automated test, the Test Driver sends the same input to the Test Object that was entered by the user when the logfile was created. These inputs must be sent only when the Test Object is ready for them, otherwise the Test Object discards them. Phone digits and voice are sent via phone line to the ARU. Keystrokes are sent via IP messages to the Manual Console.

9.1. Synchronization: ARU

A single ARU state, script number, is used by the Test Driver for synchronizing the ARU. The ARU sends an ARU Script Number record to the Test Driver each time the script number changes. In Create mode, the Test Driver writes this record to the output logfile. In Read/Create mode, the Test Driver reads this record from the input logfile and waits for the ARU to send a matching record (if it hasn't already) before reading further from the input logfile.

9.2. Synchronization: Manual Console

Unlike the ARU, where synchronization is performed at the Test Driver using information sent by the ARU, the Manual Console performs its own synchronization using information sent by the Test Driver. The reason for this is largely historical (from the time when the Test Driver resided on the Manual Console), and synchronization could certainly be performed at the Test Driver for the Manual Console just as is done for the ARU. A large volume of network traffic would result, however, given the relatively large amount of information which comprises Manual Console state information.

The Manual Console states consist of Script Number, Colorkey Text, Answer Scai, and Window ID. In Create mode, the Manual Console sends changed state info to the Test Driver whenever the Manual Console receives input, the Test Driver saves this info in the output logfile. In Read/Create mode, the Test Driver sends this info back to the Manual Console, which synchronizes on it before accepting more records from the Test Driver. Note that the Test Driver sends the next record to the Manual Console regardless of whether the Manual Console is synchronized. It is up to the Manual Console not to process the record until the Manual Console is synchronized. In contrast, the Test Driver does not send anything else to the ARU until the Test Driver has determined that the ARU is synchronized.

Another important difference between Manual Console and ARU synchronization is that ARU synchronization uses every state encountered by the ARU, while Manual Console synchronization uses only those states that exist when a keystroke is processed. The ARU's is the better approach. Synching on every state is a better test, plus the Test Driver can stop the test as soon as a non-matching state is seen. On the Manual Console, because of its subset synching, neither it nor the Test Driver can know when a test is going to fail because of a state mismatch; the only recourse for the Test Driver is to time out the test.

10. Originator Disconnect

The Test Driver must synchronize with the Test Object for an originator disconnect in Read/Create mode. Since the ARU sends state info whenever it changes, the Test Driver needs no further information to determine when to disconnect from the ARU. For the Manual Console, the Test Driver must obtain the state of the Manual Console when the user disconnects in Create mode, and wait for the Manual Console to synchronize in Read/Create mode. In Create mode, the Test Driver obtains the Manual Console's state by sending a State Query message; the Manual Console sends back a State Query Response message which contains the Manual Console's state. In Read/Create mode, the Test Driver determines when the Manual Console is synchronized by sending a Synch Notify message; when the Manual Console is synchronized, it sends back a Synched message.

11. IP Sockets

The Test Objects and the Test Driver each receive messages at the following IP sockets:

| Component | Socket |
|---|---|
| Test Driver | 0x208f |
| Manual Console | 0x218f |
| ARU | 0x228f |

Having thus described our invention, what we claim as new, and desire to secure by Letters Patent is:

1. A method for testing a telecommunications network including a network information concentrator and a trunk group filter table coupled with said network, said method comprising the steps of:
   (a) retrieving an entry from the network information concentrator's queue;
   (b) parsing the entry from the network information concentrator's queue to identify a call record;
   (c) extracting key fields from the call record;
   (d) comparing entries in the trunk group filter table to the call record;
   (e) discarding the call record if the trunk group filter table entry indicates the call record is not of interest; and
   (f) inserting the call record into a database if the trunk group filter table entry indicates the call record is of interest for testing the telecommunication network.

2. The method as recited in claim 1, including the steps of:
   (a) retrieving call records from the database by matching a particular test case number;
   (b) formatting a test script based on the test case number and information stored in the database; and
   (c) executing the test script against the call records from the database to test the telecommunication network.

3. The method as recited in claim 2, including the step of handling any errors in the call records.

4. The method as recited in claim 2, including the step of logging test results in the database.

5. The method as recited in claim 2, including the step of certifying the test results.

6. The method as recited in claim 2, including the steps of:
   (a) retrieving a test case number, start time, end time, and timepoint information from the database;
   (b) retrieving call records that match the retrieved test case number and start time;
   (c) testing the telecommunication network utilizing the returned call records; and
   (d) determining appropriate corrective action utilizing test results and the database.

7. The method as recited in claim 2, including the step of logging an error in the database if no matching call records are identified.

8. A system for testing a telecommunications network including a network information concentrator and a trunk group filter table coupled with said network, said method comprising:
   (a) a database that stores call information;
   (b) logic that retrieves stored call information from the database and parses the information into one or more call records;
   (c) logic that extracts key fields from the one or more call records;
   (d) logic that compares entries in the trunk group filter table to the one or more call records and discards any call record if the trunk group filter table entry indicates the call record is not of interest; and
   (e) a database for storing the call record if the trunk group filter table entry indicates the call record is of interest for testing the telecommunication network.

9. The system as recited in claim 8, including:
   (d) logic that retrieves call records from the database by matching a particular test case number;
   (e) logic that formats a test script based on the test case number and information stored in the database; and
   (f) logic that executes the test script against the call records from the database to test the telecommunication network.

10. The system as recited in claim 9, including logic that handles any errors in the call records.

11. The system as recited in claim 9, including logic that logs test results in the database.

12. The system as recited in claim 9, including logic that certifies the test results.

13. The system as recited in claim 9, including:
    (a) logic that retrieves a test case number, start time, end time, and timepoint information from the database;
    (b) logic that retrieves call records that match the retrieved test case number and start time;
    (c) logic that tests the telecommunication network utilizing the returned call records; and
    (d) logic that determines appropriate corrective action utilizing test results and the database.

14. The system as recited in claim 9, including logic that logs an error in the database if no matching call records are identified.

15. A computer program embodied on a computer-readable medium for testing a telecommunications network including a network information concentrator and a trunk group filter table coupled with said network, comprising:
    (a) a code segment that retrieves stored call information from the database and parses the information into one or more call records;
    (b) a code segment that extracts key fields from the one or more call records;
    (c) a code segment that compares entries in the trunk group filter table to the one or more call records and discards any call record if the trunk group filter table entry indicates the call record is not of interest; and
    (d) a code segment that stores the call record if the trunk group filter table entry indicates the call record is of interest for testing the telecommunication network.

16. The computer program as recited in claim 15, including:
    (a) a code segment that retrieves call records from the database by matching a particular test case number;
    (b) a code segment that formats a test script based on the test case number and information stored in the database; and
    (c) a code segment that executes the test script against the call records from the database to test the telecommunication network.

17. The computer program as recited in claim 16, including a code segment that handles errors in the call records.

18. The computer program as recited in claim 16, including a code segment that logs test results in the database.

19. The computer program as recited in claim 16, including a code segment that certifies the test results.

20. The computer program as recited in claim 16, including:

(a) A code segment that retrieves a test case number, start time, end time, and timepoint information from the database;

(b) a code segment that retrieves call records that match the retrieved test case number and start time;

(c) a code segment that tests the telecommunication network utilizing the returned call records; and (d) a code segment that determines appropriate corrective action utilizing test results and the database.

21. The computer program as recited in claim 16, including a code segment that logs an error in the database if no matching call records are identified.

* * * * *